(12) United States Patent
Kato et al.

(10) Patent No.: US 9,733,433 B2
(45) Date of Patent: Aug. 15, 2017

(54) OPTICAL CONNECTION BOX

(71) Applicants: FUJIKURA LTD., Koto-ku, Tokyo (JP); FUJITSU LIMITED, Kawasaki-shi, Kanagawa-ken (JP)

(72) Inventors: Seiji Kato, Sakura (JP); Akihiro Yasuo, Yokohama (JP); Misao Umematsu, Kawasaki (JP)

(73) Assignees: FUJIKURA LTD., Tokyo (JP); FUJITSU LIMITED, Kawasaki-shi (JP)

( * ) Notice: Subject to any disclaimer, the term of this patent is extended or adjusted under 35 U.S.C. 154(b) by 0 days.

(21) Appl. No.: 14/489,577

(22) Filed: Sep. 18, 2014

(65) Prior Publication Data

US 2015/0078719 A1   Mar. 19, 2015

(30) Foreign Application Priority Data

Sep. 19, 2013 (JP) ................. 2013-194631
Nov. 15, 2013 (JP) ................. 2013-237416
May 7, 2014 (JP) ................. 2014-096355

(51) Int. Cl.
  *G02B 6/26* (2006.01)
  *G02B 6/42* (2006.01)
  (Continued)

(52) U.S. Cl.
  CPC ............. *G02B 6/38* (2013.01); *G02B 6/3897* (2013.01); *G02B 6/4452* (2013.01);
  (Continued)

(58) Field of Classification Search
  CPC ...... G02B 6/38; G02B 6/3897; G02B 6/4452; G02B 6/3546; G02B 6/3556
  (Continued)

(56) References Cited

U.S. PATENT DOCUMENTS 4,765,709 A    8/1988  Suillerot et al.
8,092,249 B2 * 1/2012  German ................. H04Q 1/138
                                                     439/489
(Continued)

FOREIGN PATENT DOCUMENTS

JP    62-278511 A    12/1987
JP    H06-37481 A    2/1994
(Continued)

OTHER PUBLICATIONS

JIS C 5982, JIS Handbook 8, Japanese Standards Association, 1998, 22 pages.
(Continued)

*Primary Examiner* — Robert Tavlykaev
(74) *Attorney, Agent, or Firm* — Sughrue Mion, PLLC

(57) ABSTRACT

An optical connection box includes, a plurality of first optical connectors to which a plurality of first optical paths are respectively connected, a plurality of second optical connectors that respectively include an operation unit protruding from a peripheral edge side position further from a position of the plurality of first optical connectors on a first surface of the optical connection box, and that are respectively connected to a plurality of receptacle optical connectors which are disposed in the plurality of second optical paths, a plurality of relay optical fibers in which any one of the plurality of first optical connectors is disposed in the first terminal and any one of the plurality of second optical connectors is disposed in the second terminal, and a fitting structure with respect to a substrate in which the receptacle optical connectors are disposed.

13 Claims, 32 Drawing Sheets

(51) Int. Cl.
*G02B 6/00* (2006.01)
*G02B 6/38* (2006.01)
*G02B 6/44* (2006.01)
G02B 6/35 (2006.01)
H04Q 1/02 (2006.01)

(52) U.S. Cl.
CPC .......... *G02B 6/3506* (2013.01); *G02B 6/3556* (2013.01); *G02B 6/3574* (2013.01); *G02B 6/3898* (2013.01); *H04Q 1/13* (2013.01)

(58) Field of Classification Search
USPC .................................. 385/135, 139, 134, 17
See application file for complete search history.

(56) References Cited

U.S. PATENT DOCUMENTS

| | | | | |
|---|---|---|---|---|
| 8,175,425 B2* | 5/2012 | Chen | .................... | G02B 6/3508 385/134 |
| 9,008,484 B2* | 4/2015 | Takeuchi | ............. | G02B 6/3508 385/136 |
| 9,261,654 B2* | 2/2016 | Murphy | ............... | G02B 6/3825 |
| 2002/0061102 A1 | 5/2002 | Miyazaki et al. | | |
| 2009/0047800 A1 | 2/2009 | Tabet | | |
| 2015/0098698 A1* | 4/2015 | Kewitsch | ............. | G02B 6/4452 398/45 |

FOREIGN PATENT DOCUMENTS

| | | |
|---|---|---|
| JP | 11-223733 A | 8/1999 |
| JP | 2002-223087 A | 8/2002 |
| JP | 2003-515785 A | 5/2003 |
| JP | 2005-500565 A | 1/2005 |
| WO | 01/40839 A1 | 6/2001 |

OTHER PUBLICATIONS

Communication dated Feb. 21, 2017 issued by the Japanese Patent Office in counterpart application No. 2013-194631.
Communication dated Mar. 21, 2017 issued by the Japanese Patent Office in counterpart application No. 2013-237416.

* cited by examiner

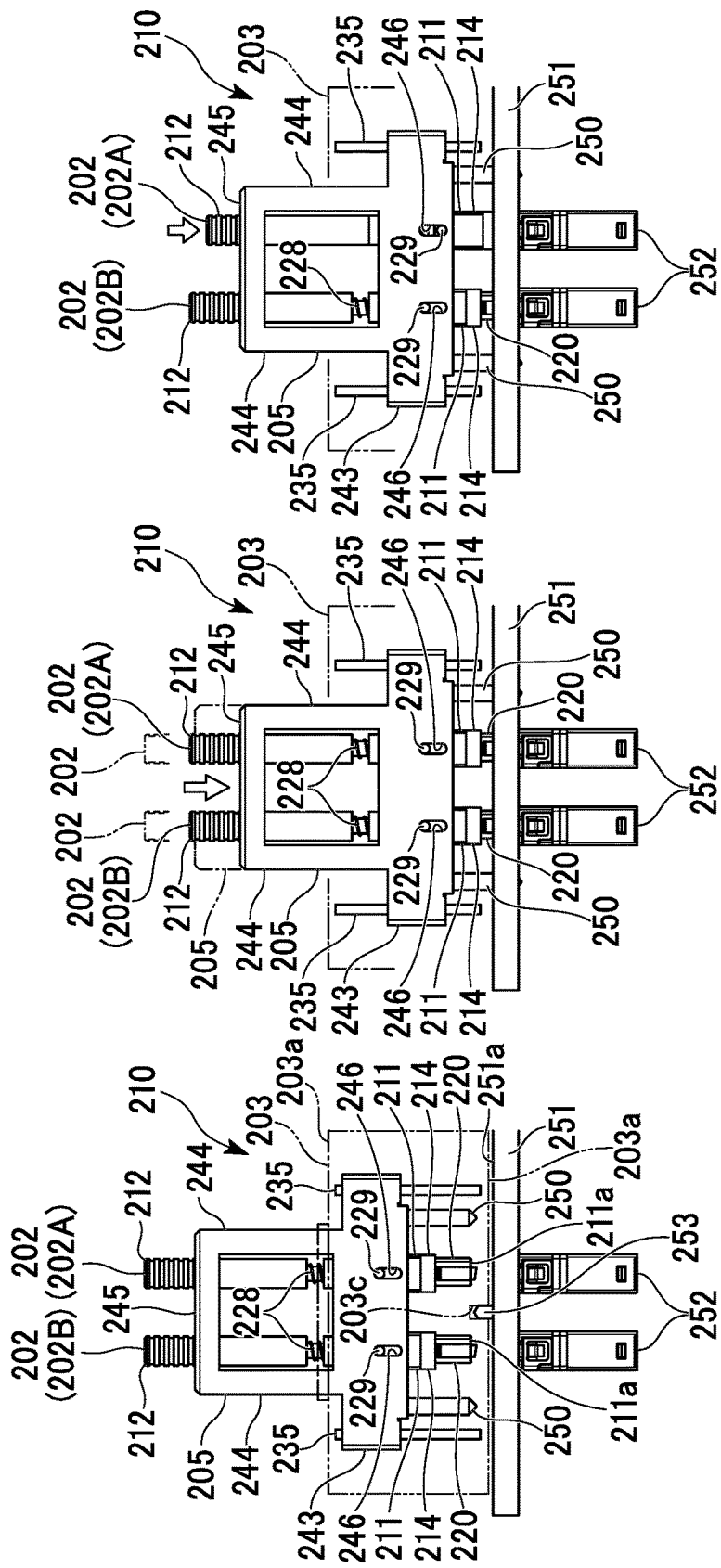

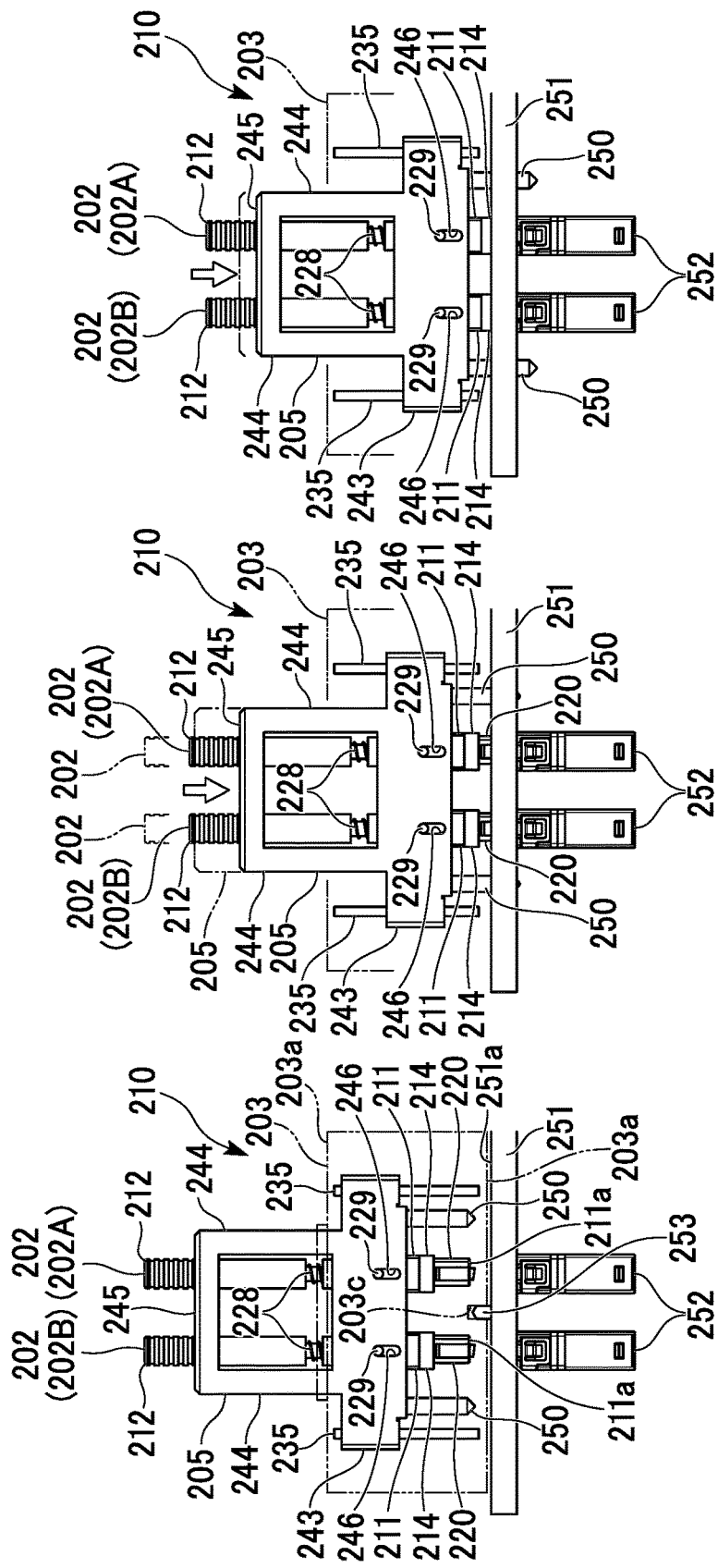

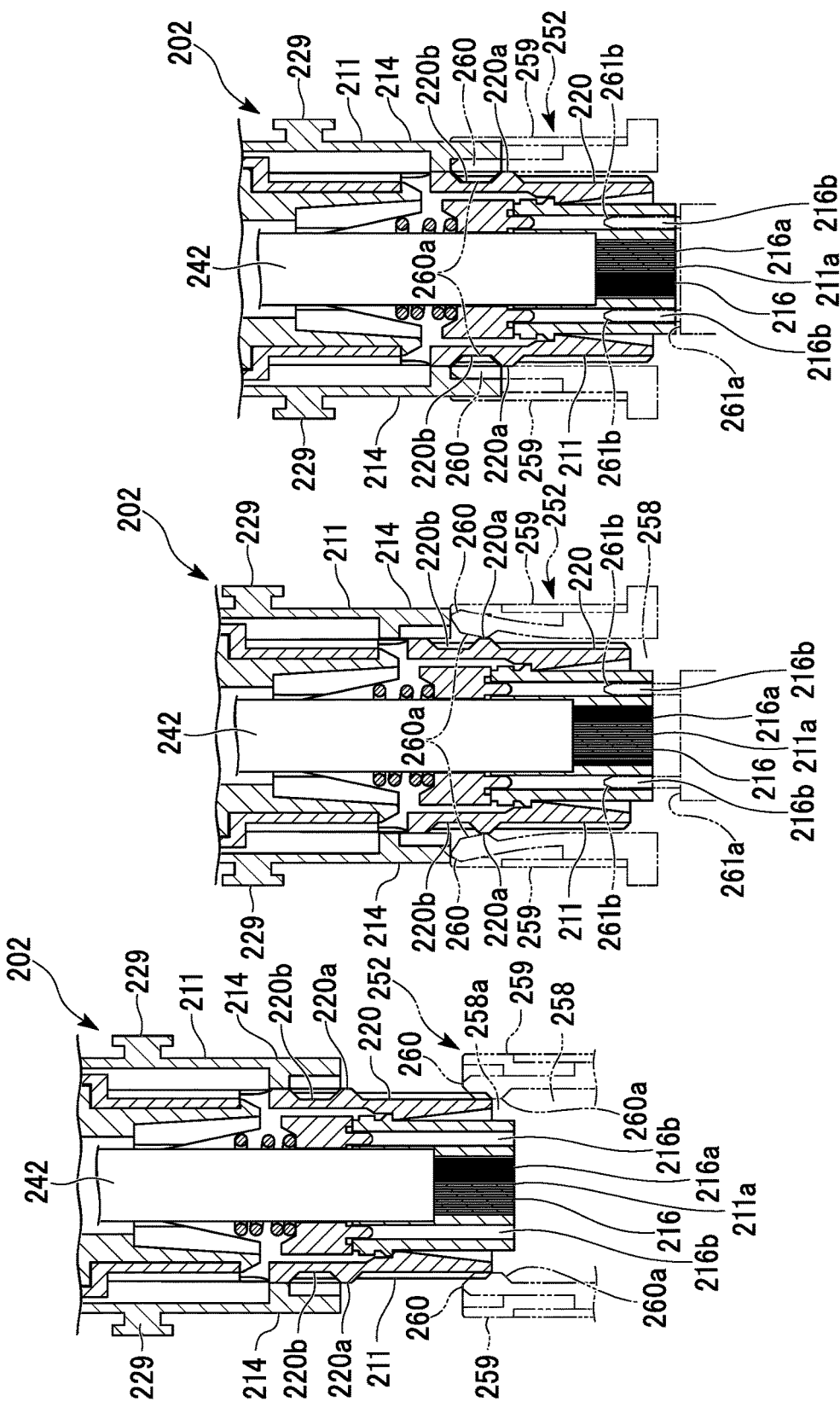

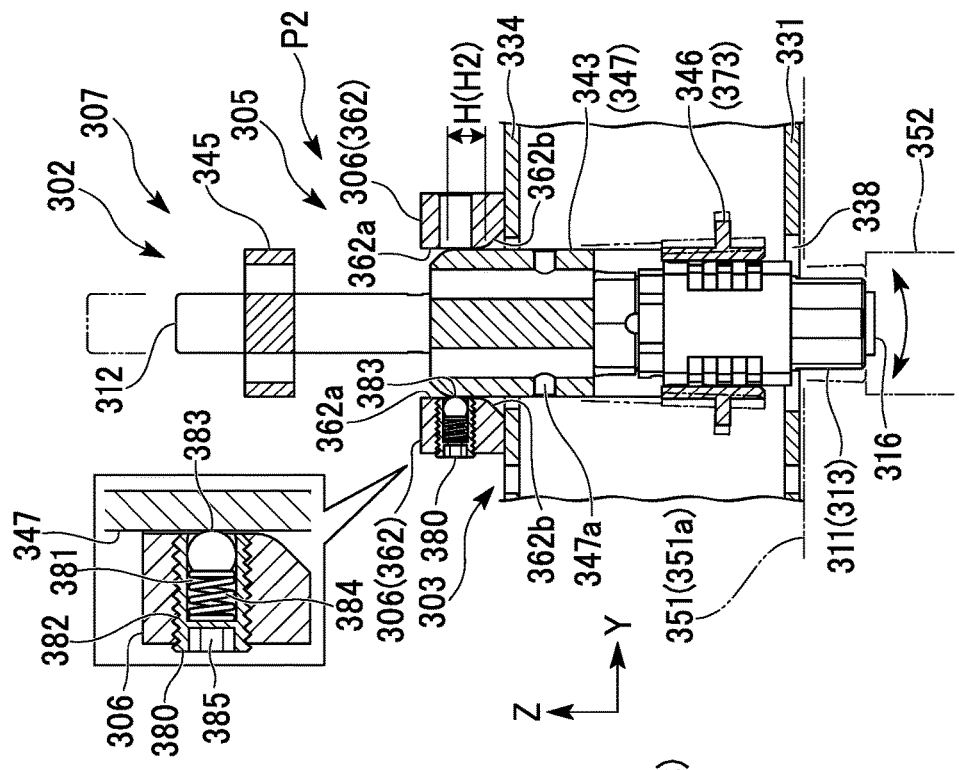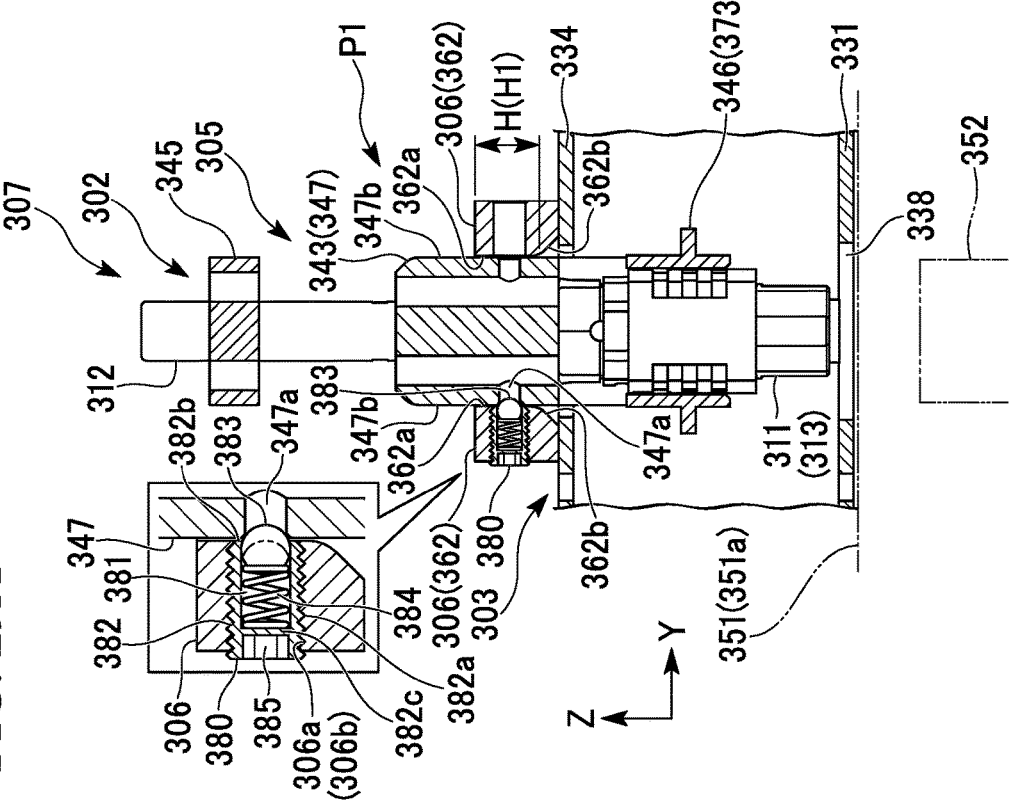

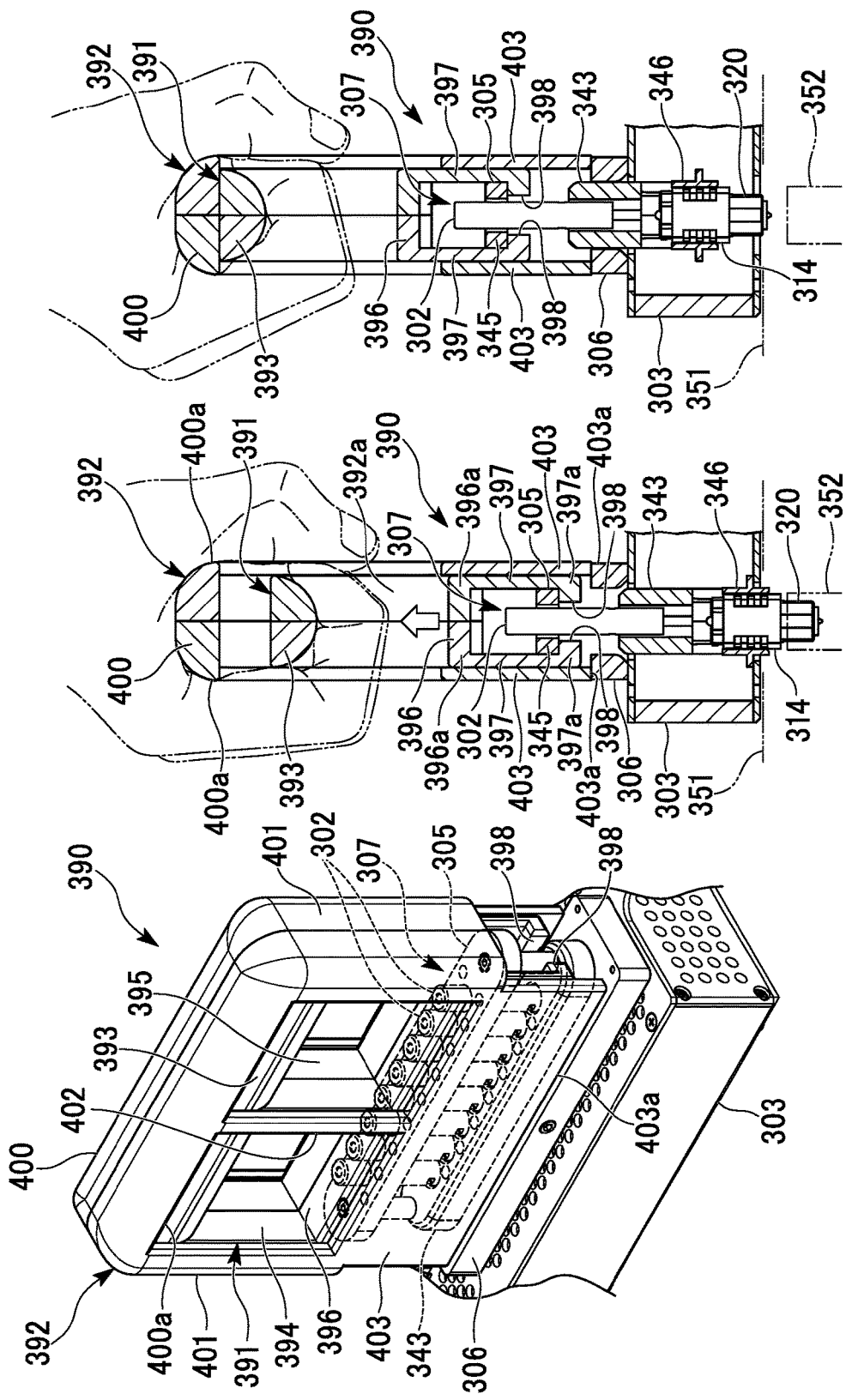

OPTICAL CONNECTION BOX

BACKGROUND OF THE INVENTION

Field of the Invention

The present invention relates to an optical connection box which is used in an information processing apparatus such as a super computer and a server, and which performs relay connection between optical paths.

Priority is claimed on Japanese Patent Applications No. 2013-194631, filed on Sep. 19, 2013, No. 2013-237416, filed on Nov. 15, 2013, No. 2014-096355, filed on May 7, 2014, the contents of which are incorporated herein by reference.

Description of Related Art

In recent years, in the field of high performance computing (HPC), there has been an increasing demand for a technology which allows a large capacity of data to be transmitted rapidly. As a technology which can satisfy this demand, an optical transmission technology using an optical fiber has attracted attention.

An information processing apparatus such as a super computer and a server requires complicated wiring which uses many optical fibers. In order to build this optical wiring, a module for relay connection is used in some cases (see Published Japanese Translation No. 2005-500565 of the PCT International Publication). In addition, an optical connection box is known which has a structure in which a housing accommodates a plurality of optical connectors which are to be connected to a counterpart device.

However, the information processing apparatus requires the complicated wiring which uses many optical fibers. Therefore, even if the module for relay connection is used, building work for the optical wiring needs much time and effort. In addition, it is also necessary to improve reliability of the relay connection.

The optical connection box has many optical connectors to be connected to the counterpart device. Accordingly, in some cases, it is not easy to reliably connect the optical connectors to the counterpart device.

SUMMARY OF THE INVENTION

The present invention is made in view of the above-described problems, and aims to provide an optical connection box that can easily and very reliably build complicated wiring which uses many optical fibers. In addition, the present invention aims to provide a relay optical connection unit which can reliably connect many optical connectors to a counterpart device.

The first aspect of the present invention is that an optical connection box that connects a plurality of first optical paths which are included in a first terminal to a plurality of second optical paths which are included in a second terminal. The optical connection box includes a plurality of first optical connectors to which a plurality of first optical paths are respectively connected, a plurality of second optical connectors that respectively include an operation unit protruding from a peripheral edge side position further from a position of the plurality of first optical connectors on a first surface of the optical connection box, and that are respectively connected to a plurality of receptacle optical connectors which are disposed in the plurality of second optical paths, a plurality of relay optical fibers in which any one of the plurality of first optical connectors is disposed in the first terminal and any one of the plurality of second optical connectors is disposed in the second terminal, and a fitting structure with respect to a substrate in which the receptacle optical connectors are disposed.

According to the above-described aspect of the present invention, if there is provided in advance an optical connection box in which optical connectors selected for an intended use are connected to each other, even when complicated optical wiring is needed, it is possible to build the optical wiring which is most suitable to the intended use by an easy operation of installing the optical connection box on a counterpart substrate. Accordingly, it is possible to easily and reliably build the complicated optical wiring using many optical fibers.

In the above-described aspect of the present invention, installation work goes through three stages of positioning. Accordingly, it is possible to reliably and accurately fit connectors to each other.

That is, after a position of an exterior body on the counterpart substrate is roughly determined in the first stage, a planar view position of the second optical connector is defined with respect to the receptacle optical connector in the second stage. Subsequently, the installation work goes through a process of completely and finally determining the position of the second optical connector in the third stage. In this manner, it is possible to guide the second optical connector to the receptacle optical connector.

According to this configuration, even when the position of the second optical connector is deviated, the deviation is reliably corrected and the second optical connector is guided to a correct position. In this manner, it is possible to reliably and accurately fit the second optical connector to the receptacle optical connector.

Therefore, it is possible to build a highly reliable optical wiring.

In the second aspect of the present invention, in the above-described optical connection box of the first aspect, it is preferable that a plurality of operation units of the second optical connectors are arranged to be divided into two groups on the first surface of the optical connection box, and at least a portion of the plurality of first optical connectors is arranged between the two groups.

The third aspect of the present invention further includes, in the above-described optical connection box of the first or the second aspect, it is preferable that a movable holding body that collectively holds the plurality of second optical connectors. It is preferable that the movable holding body is movable in directions close to and away from the plurality of receptacle optical connectors while collectively holding the plurality of second optical connectors, and is movable in a direction of being inserted into and removed from the receptacle optical connectors, the movable holding body includes a movable holding body positioning portion which performs positioning with respect to the substrate, and the movable holding body is positioned by the movable holding body positioning portion, and the plurality of second optical connectors are respectively arranged at a position where each of the plurality of second optical connectors can be fitted to the corresponding receptacle optical connector.

The above-described aspect of the present invention adopts the movable holding body which collectively holds the plurality of second optical connectors. Accordingly, a simple operation enables the plurality of second optical connectors to be collectively inserted into and removed from the receptacle optical connector.

The fourth aspect of the present invention further includes, in the above-described optical connection box of any one of the first to the third aspects, it is preferable that the second optical connector has an optical connector main body, and the operation unit is movable in a direction where the optical connector main body is inserted into and removed from the receptacle optical connector.

In the fifth aspect of the present invention, in the above-described optical connection box of the fourth aspect, it is preferable that in the second optical connector, the optical connector main body is accommodated inside the optical connection box.

In the sixth aspect of the present invention further includes, in the above-described optical connection box of any one of the first to the fifth aspects, it is preferable that a plurality of openings are provided in the optical connection box.

In the seventh aspect of the present invention, in the above-described optical connection box of the sixth aspect, it is preferable that an inner diameter of the opening is 0.5 to 3 mm.

In the eighth aspect of the present invention further includes, in the above-described optical connection box of any one of the first to the seventh aspects, it is preferable that the plurality of second optical connectors are mutually and independently movable with respect to the receptacle optical connectors of the second optical path.

In the ninth aspect of the present invention further includes, in the above-described optical connection box of any one of the first to the eighth aspects, it is preferable that the first optical connector is a receptacle optical connector where an optical connector plug disposed in a terminal of the first optical path is inserted and removed.

In the tenth aspect of the present invention, in the above-described optical connection box of the third aspect, it is preferable that the movable holding body is positioned by the fitting structure, and thereby the movable holding body is arranged at a position which can be determined by the movable holding body positioning portion of the movable holding body.

In the eleventh aspect of the present invention, in the above-described optical connection box of the third or the tenth aspect, it is preferable that each of the plurality of second optical connectors is movable by an operation of an operation body disposed in the optical connector main body, in directions of being inserted into and removed from the receptacle optical connector. It is preferable that in a state where the movable holding body is positioned by the movable holding body positioning portion, each of the plurality of second optical connectors is fitted to the corresponding receptacle optical connector by operating the operation body.

In the twelfth aspect of the present invention further includes, in the above-described optical connection box of any one of the third to the eleventh aspects, it is preferable that installation positions are different from each other in any combination between the plurality of first optical connectors and the plurality of first optical connectors, when viewed in a direction of being inserted and removed.

In the thirteenth aspect of the present invention, in the above-described optical connection box of the eleven aspect, it is preferable that the plurality of second optical connectors are respectively biased in a direction away from the receptacle optical connectors between the directions of being inserted and removed, and do not protrude from an outer surface of the optical connection box in a state where each of the plurality of second optical connectors is not fitted to the corresponding receptacle optical connector and does not operate the operation body.

In the fourteenth aspect of the present invention, in the above-described optical connection box of any one of the first to the thirteenth aspects, it is preferable that the plurality of second optical connectors are mutually and independently movable to the receptacle optical connectors of the second optical path.

The fifteenth aspect of the present invention further includes, in the above-described optical connection box of any one of the first to the fourteenth aspects, it is preferable that a housing in which the plurality of first optical connectors and the plurality of second optical connectors are disposed. The first optical connector is preferably a receptacle optical connector where an optical connector plug disposed in a terminal of the first optical path is inserted and removed, and is fixed to the housing.

In the above-described aspect of the present invention, installation work goes through four stages of positioning. Accordingly, it is possible to reliably and accurately fit the second optical connector to the receptacle optical connector.

That is, after a position of a housing on the counterpart unit is roughly determined by fitting a fitting concave portion to a fitting convex portion in the first stage, a position of a movable holding body is determined by a movable holding body positioning portion in the second stage. A position of the second optical connector is determined with respect to the receptacle optical connector in the third stage. Subsequently, in the fourth stage, the second optical connector is operated, thereby going through a process completely and finally determining the position of the second optical connector. In this manner, it is possible to guide the second optical connector to the receptacle optical connector.

According to this configuration, even when the position of the second optical connector is deviated, the deviation is reliably corrected and the second optical connector is guided to a correct position. In this manner, it is possible to reliably and accurately fit the second optical connector to the receptacle optical connector.

Therefore, it is possible to build a highly reliable optical wiring.

The sixteenth aspect of the present invention further includes, in the above-described optical connection box of any one of the third, the tenth, the eleventh, and the thirteenth aspects, a facing member that faces both surfaces of the movable holding body and regulates tilting of the movable holding body. It is preferable that the movable holding body moves in directions close to and away from the receptacle optical connectors, and thereby, the movable holding body can be switched over between a first position and a second position closer to the receptacle optical connectors than the first position, the second position, a dimension in the moving direction of a region in which the movable holding body faces the facing member is smaller than a dimension thereof at the first position, and a tiltable angle of the movable holding body is greater than a tiltable angle at the first position.

The seventeenth aspect of the present invention further includes, in the above-described optical connection box of the sixteenth aspect, it is preferable that a housing in which the plurality of first optical connectors and the plurality of second optical connectors are disposed. The facing member is preferably disposed on an outer surface side which is opposite to the receptacle optical connectors of the housing.

The eighteenth aspect of the present invention further includes, in the above-described optical connection box of any one of the third, the tenth, the eleventh, the thirteenth, and the seventeenth aspects, it is preferable that a ball plunger that regulates a movement of the movable holding body in a direction close to the receptacle optical connectors, when the second optical connectors are located away from the receptacle optical connectors. The ball plunger preferably includes a cylindrical main body, a ball which is accommodated inside the main body so as to be movable in a central axis direction of the main body, and a biasing member which biases the ball in a direction toward a distal end of the main body. The ball is preferably configured so that a protruding amount from an opening edge portion of the main body can be adjusted by the movement in the central axis direction of the main body, and an engagement recess with which the ball protruding from the opening edge portion is engageable is formed in the movable holding body.

The nineteenth aspect of the present invention further includes, in the above-described optical connection box of any one of the third, the tenth, the eleventh, the thirteenth, and the sixteenth aspects, it is preferable that a housing in which the plurality of first optical connectors and the plurality of second optical connectors are disposed. The housing preferably has a bottom plate which faces the substrate and the bottom plate has an insertion port into which the second optical connector is inserted when connected to the receptacle optical connector, and the movable holding body includes an electromagnetic wave shielding portion which shields an electromagnetic wave from the counterpart device. The electromagnetic wave shielding portion is preferably formed of a conductive material, and when the second optical connector is inserted into the insertion port and is connected to the receptacle optical connector, the electromagnetic wave shielding portion is formed so as to cover at least a portion of a gap between a peripheral edge of the insertion port and the second optical connector, when viewed in directions where the second optical connector is inserted and removed.

In the twentieth aspect of the present invention, in the above-described optical connection box of any one of the first to the nineteenth aspects, it is preferable that at least a pair of optical fiber guide bars is formed to protrude inside the optical connection box, and the relay optical fiber is wired between the pair of optical fiber guide bars.

According to an aspect of the present invention, the housing has the facing member which faces both surfaces of the movable holding body and regulates tilting of the movable holding body.

The movable holding body is configured so that the tilting is regulated by the facing member when the movable holding body is located at the first position. Accordingly, it is possible to easily align the movable holding body positioning portion with the counterpart device.

At the second position closer to the receptacle optical connector than the first position, a dimension in the moving direction of a region in which the movable holding body faces the facing member is smaller than a dimension thereof at the first position. Accordingly, a tiltable angle of the movable holding body is greater than a tiltable angle at the first position.

Accordingly, it becomes easy to align the second optical connector with the receptacle optical connector. For example, even when the position of the receptacle optical connector is deviated from a designed position, it is possible to easily perform the alignment.

Therefore, it is possible to easily and reliably connect the plurality of second optical connectors to the receptacle optical connectors of the counterpart device.

BRIEF DESCRIPTION OF THE DRAWINGS

FIG. 18A is a process diagram illustrating an example of a process where the second optical connector is fitted to a receptacle optical connector.

FIG. 18B is a process diagram illustrating an example of a process where the second optical connector is fitted to the receptacle optical connector.

FIG. 18C is a process diagram illustrating an example of a process where the second optical connector is fitted to the receptacle optical connector.

FIG. 20A is a cross-sectional view illustrating a process where the second optical connector is fitted to the receptacle optical connector.

FIG. 20B is a cross-sectional view illustrating a process where the second optical connector is fitted to the receptacle optical connector.

FIG. 20C is a cross-sectional view illustrating a process where the second optical connector is fitted to the receptacle optical connector.

FIG. 21A is a process diagram illustrating another example of a process where the second optical connector is fitted to a receptacle optical connector.

FIG. 21B is a process diagram illustrating another example of a process where the second optical connector is fitted to the receptacle optical connector.

FIG. 21C is a process diagram illustrating another example of a process where the second optical connector is fitted to the receptacle optical connector.

FIG. 29A is a view for illustrating an operation of the second optical connector, a movable holding body, and a ball plunger.

FIG. 29B is a view for illustrating an operation of the second optical connector, the movable holding body, and the ball plunger.

FIG. 30A is a perspective view illustrating a connector detaching tool.

FIG. 30B is a cross-sectional view of the connector detaching tool which illustrates a state before the second optical connector is pulled out.

FIG. 30C is a cross-sectional view of the connector detaching tool which illustrates a state after the second optical connector is pulled out.

DETAILED DESCRIPTION OF THE INVENTION

First Exemplary Embodiment

Hereinafter, the present invention will be described with reference to preferred exemplary embodiments. First, referring to FIGS. 3A and 3B, an overview of the first exemplary embodiment of the present invention will be described. Subsequently, detailed description will be added with reference to FIGS. 1, 2, and 4 to 11.

Figure 3A:
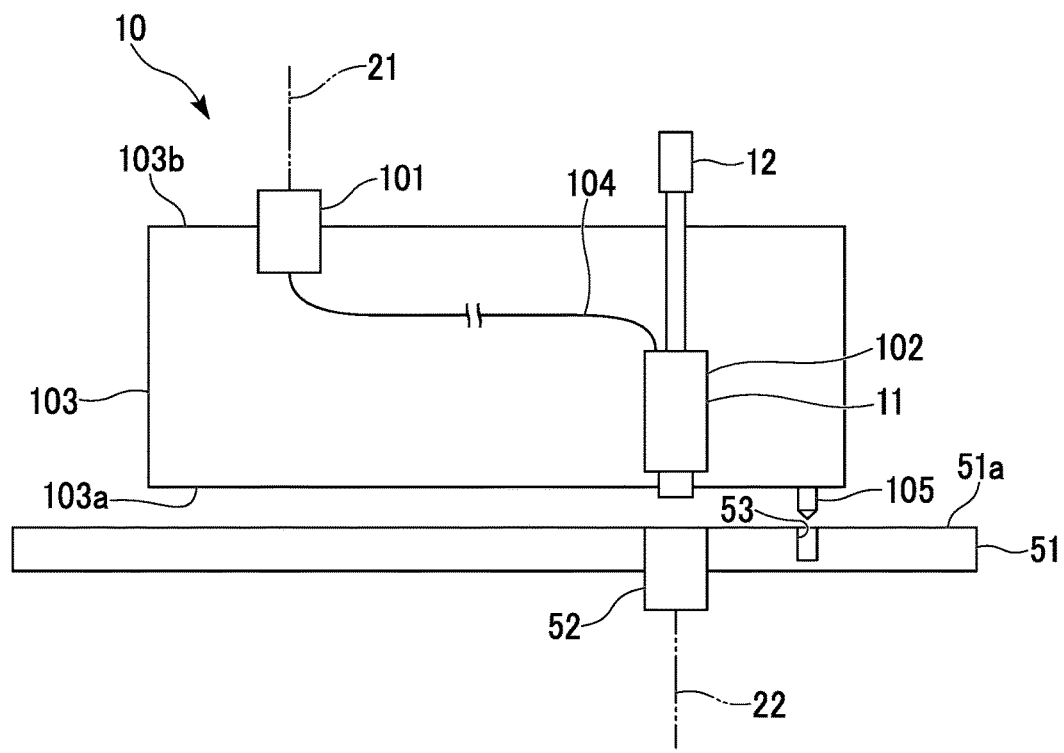
FIG. 3A is an overall view schematically illustrating the optical connection box in FIG. 1.
Figure 3B:
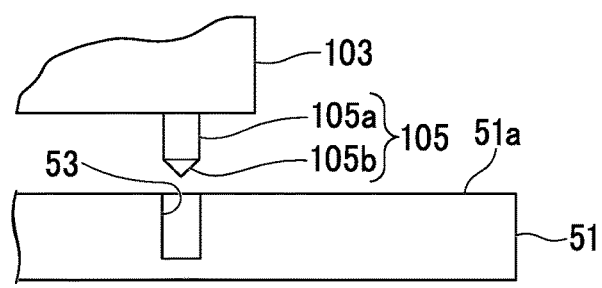
FIG. 3B is an enlarged view illustrating a main portion in FIG. 3A.

FIG. 3A is a schematic view illustrating an optical connection box 10 according to the first exemplary embodiment, and FIG. 3B is an enlarged view of a main portion of the optical connection box 10.

As illustrated in FIG. 3A, the optical connection box 10 includes one end-side optical connector (the first optical connector) 101 to which one end-side optical path (the first optical path) 21 is connected, the other end-side optical connector (the second optical connector) 102 to which the other end-side optical path (the second optical path) 22 is connected, an exterior body 103 in which one end-side optical connector 101 and the other end-side optical connector 102 are disposed, and a relay optical fiber 104 which optically connects the one end-side optical connector 101 and the other end-side optical connector 102 to each other inside the exterior body 103.

Hereinafter, a direction in which the other end-side optical connector 102 moves close to a receptacle optical connector 52 of a counterpart substrate 51 (i.e., downward in FIG. 3A) is referred to as a forward direction, and an opposite direction thereto (i.e., upward in FIG. 3A) is referred to as a rearward direction.

The other end-side optical connector 102 has an optical connector main body 11 which is an optical connector plug and an operation portion 12 which extends from the optical connector main body 11.

The other end-side optical connector 102 is movable in a longitudinal direction (i.e., an upward and downward direction in FIG. 3A). The optical connector main body 11 can be accommodated inside the exterior body 103 when moving rearward, and can be connected to the receptacle optical connector 52 so that insertion and removal are available by protruding forward from a front surface 103a of the exterior body 103 when moving forward. The term of "insertion and removal" means that the optical connector main body 11 is inserted and removed.

The operation portion 12 protrudes outward from a rear surface 103b (one surface) of the exterior body 103.

The one end-side optical connector 101 is disposed on the rear surface 103b side of the exterior body 103, and an optical connector (not shown) disposed in a terminal of one end-side optical path 21 is connected to the one end-side optical connector 101.

In the one end-side optical connector 101, a planar view position is different from that of the other end-side optical connector 102. In FIG. 3A, the one end-side optical connector 101 is located rightward from the center of the exterior body 103, and the other end-side optical connector 102 is located leftward from the center of the exterior body 103.

As illustrated in FIG. 3B, a fitting convex portion 105 (fitting portion) protruding forward is formed on the front surface 103a of the exterior body 103. The fitting convex portion 105 can be fitted to a fitting concave portion 53 (fitting receiving portion) disposed on an installation surface 51a of the counterpart substrate 51.

The receptacle optical connector 52 is disposed on the counterpart substrate 51 in which the optical connection box 10 is installed. The receptacle optical connector 52 is disposed in a terminal of the other end-side optical path 22.

FIGS. 3A and 3B illustrate a state immediately before the optical connection box 10 is installed on the counterpart substrate 51.

Next, a method of using the optical connection box 10 will be described.

(First Stage)

As illustrated in FIG. 3A, the optical connection box 10 is moved downward (i.e., forward), and is installed on the installation surface 51a of the counterpart substrate 51.

At this time, the fitting convex portion 105 is fitted to the fitting concave portion 53 of the counterpart substrate 51. This regulates a movement of the optical connection box 10, and the optical connection box 10 is roughly positioned with respect to the counterpart substrate 51. This state is referred to as "a first positioning".

(Second Stage)

The optical connection box 10 is installed on the installation surface 51a of the counterpart substrate 51 so that a distal end portion of the optical connector main body 11 of the other end-side optical connector 102 is inserted into an entrance portion of the receptacle optical connector 52. This defines a planar view position of the optical connector main body 11 with respect to the receptacle optical connector 52. This state is referred to as "a second positioning".

(Third Stage)

If the optical connector main body 11 is moved forward by gripping and pressing the operation portion 12, the distal end portion of the optical connector main body 11 is deeply inserted into the receptacle optical connector 52, and is completely fitted to the receptacle optical connector 52.

This causes the other end-side optical connector 102 and the receptacle optical connector 52 to be optically connected to each other, and causes the other end-side optical connector 102 to be accurately positioned with respect to the receptacle optical connector 52. This state is referred to as "a third positioning".

Next, the present invention will be described in more detail with reference to exemplary embodiments in FIGS. 1, 2, and 4 to 11.

Figure 1:
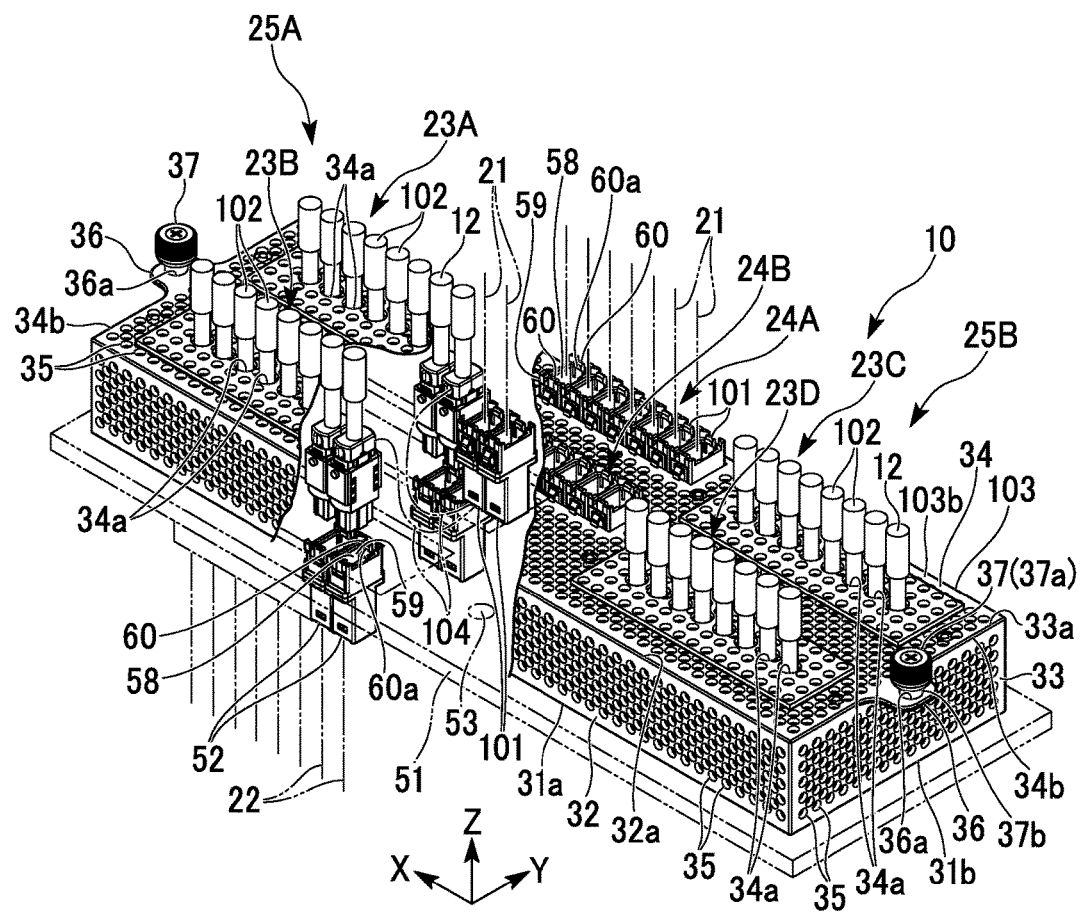
FIG. 1 is a perspective view when an optical connection box according to an exemplary embodiment of the present invention is viewed from an upper surface side.
Figure 2:
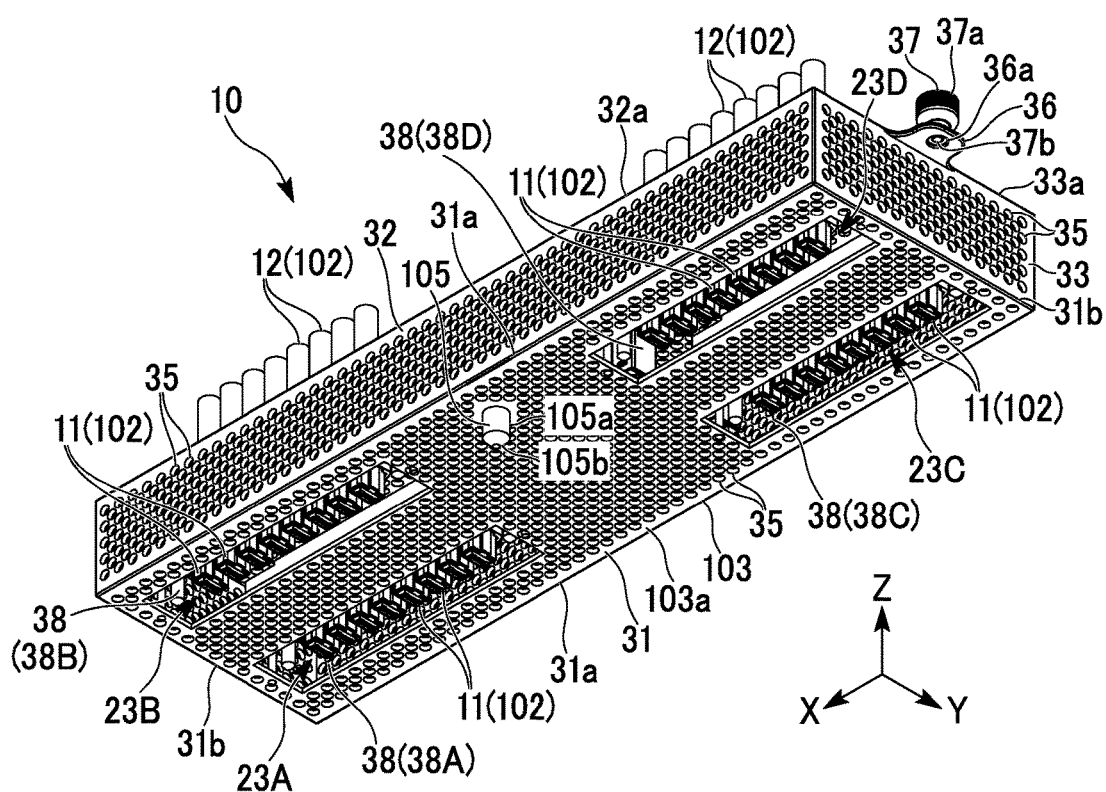
FIG. 2 is a perspective view when the optical connection box in FIG. 1 is viewed from a lower surface side.

As illustrated in FIGS. 1 and 2, the optical connection box 10 includes a plurality of one end-side optical connectors 101 to which a plurality of one end-side optical paths 21 are respectively connected, the plurality of the other end-side optical connectors 102 to which the plurality of the other end-side optical paths 22 are respectively connected, the exterior body 103 in which the one end-side optical connector 101 and the other end-side optical connector 102 are disposed, and the relay optical fiber 104 which optically connects the one end-side optical connector 101 and the other end-side optical connector 102 to each other inside the exterior body 103.

The exterior body 103 is formed in a substantially rectangular parallelepiped box shape. Specifically, the exterior body 103 has a rectangular bottom plate 31, a lateral plate 32 erected on a lateral edge portion 31a which is a long side of the bottom plate 31, an end plate 33 erected on an end edge portion 31b which is a short side of the bottom plate 31, and an upper plate 34 disposed in upper edge portions 32a and 33a of the lateral plate 32 and the end plate 33.

Many vent holes 35 are formed on the bottom plate 31, the lateral plate 32, the end plate 33, and the upper plate 34. The vent hole 35 is a substantially circular opening, and can cool a structure (for example, the other end-side optical connector 102 or the like) inside the exterior body 103 by introducing the outside air into the exterior body 103.

It is preferable that an inner diameter of the vent hole 35 be 3 mm or less. It is possible to prevent passage of electromagnetic waves by setting the inner diameter of the vent hole 35 to fall within the above-described range. For this reason, it is possible to avoid a case where the electromagnetic waves affect the other end-side optical connector 102 inside the exterior body 103.

For example, the inner diameter of the vent hole 35 can be set to 0.5 mm to 3 mm. This can prevent the electromagnetic waves. Thus, it is possible to ensure sufficient air ventilation.

Hereinafter, a structure may be described with reference to an XYZ orthogonal coordinate system illustrated in FIG. 1 and the like. An X-direction represents an extending direction of the lateral edge portion 31a of the bottom plate 31, and represents a longitudinal direction of the bottom plate 31. A Y-direction represents a direction orthogonal to the X-direction within a plane parallel to the bottom plate 31, and represents an extending direction of the end edge portion 31b. A Z-direction represents a height direction which is orthogonal to the X-direction and the Y-direction.

Plate-shaped extension pieces 36 and 36 respectively extending outward in the longitudinal direction of the upper plate 34 are formed in the center of the end edge portions 34b and 34b, both of which are a short side of the rectangular upper plate 34. An insertion hole 36a is formed in the extension piece 36. A fixing pin 37 (insertion portion 37b) is inserted into the insertion hole 36a.

The fixing pin 37 has a head portion 37a and the insertion portion 37b extending from the head portion 37a.

As illustrated in FIG. 2, an insertion port 38 into which the other end-side optical connector 102 is inserted is formed on the bottom plate 31. In the illustrated example, four insertion ports 38 are formed. These are referred to as first to fourth insertion ports 38A to 38D.

The insertion ports 38A to 38D are respectively formed at positions conforming to first to fourth connector groups 23A to 23D (to be described later) of the other end-side optical connectors 102.

The insertion ports 38A to 38D in the illustrated example has a rectangular shape in which the longitudinal direction extends along the X-direction, and respectively have a shape of collectively surrounding the first to fourth connector groups 23A to 23D.

The fitting convex portion 105 protruding forward is formed on an outer surface 3a of the bottom plate 31 of the exterior body 103. The fitting convex portion 105 can be fitted to the fitting concave portion 53 of the counterpart substrate 51 (see FIG. 3B).

The fitting convex portion 105 in the illustrated example has a cylindrical main portion 105a protruding forward and a distal end portion 105b which has a substantially conical shape and whose diameter gradually decreases from a distal end of the main portion 105a in a protruding direction thereof.

It is preferable that an outer diameter of the main portion 105a is the same as or smaller than an inner diameter of the fitting concave portion 53 which has a circular shape in plan view. When fitted to the fitting concave portion 53, this can regulate a movement of the exterior body 103 in a direction along the counterpart substrate 51.

In the fitting convex portion 105, the distal end portion 105b has a shape whose diameter gradually decreases in the protruding direction. Accordingly, when fitted to the fitting concave portion 53, even if a planar view position is deviated from the fitting concave portion 53, it is possible to guide the fitting convex portion 105 to a correct position along a slope on an outer surface of the distal end portion 105b.

Figure 6:
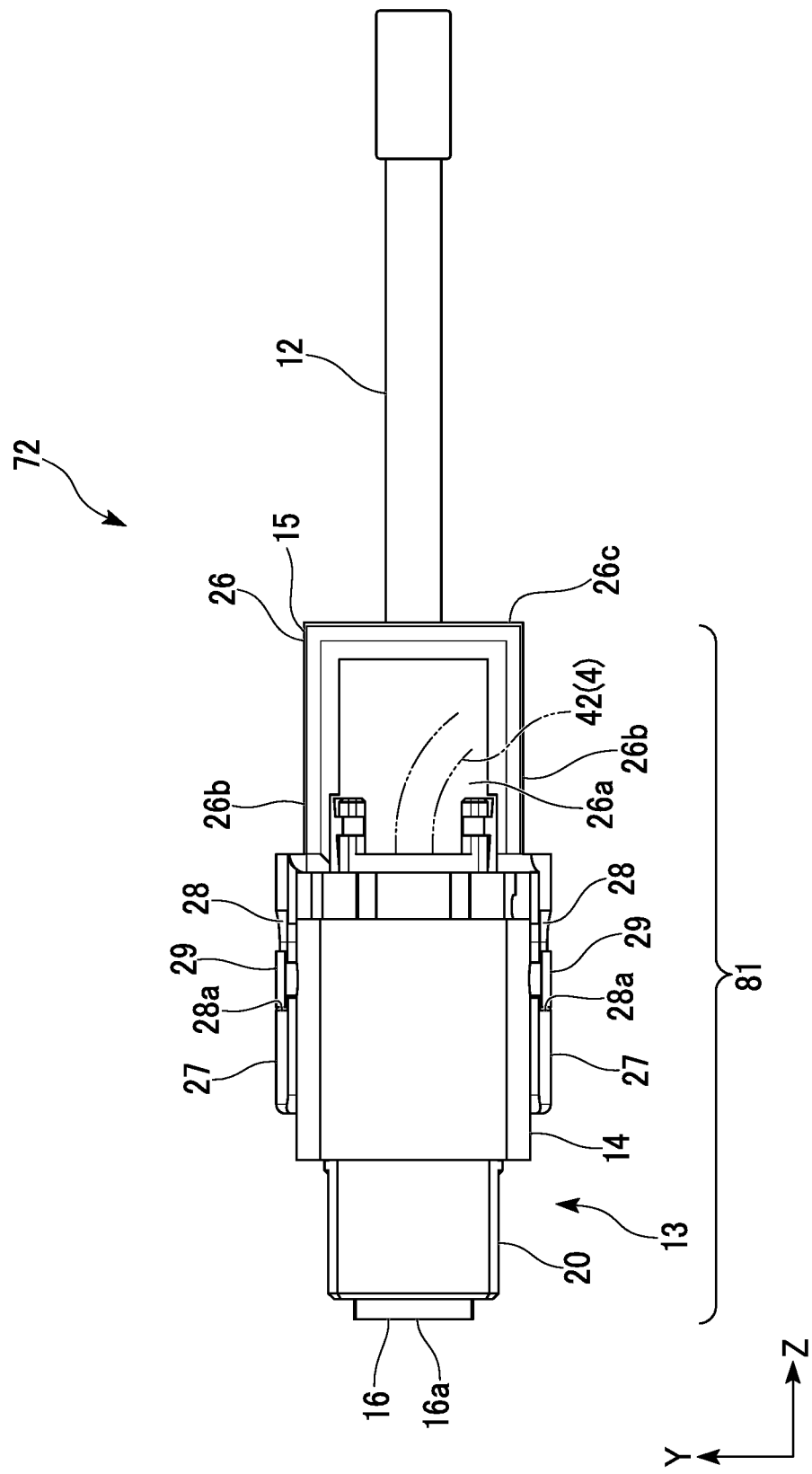
FIG. 6 is plan view illustrating an optical connector used in the optical connection box.
Figure 7:
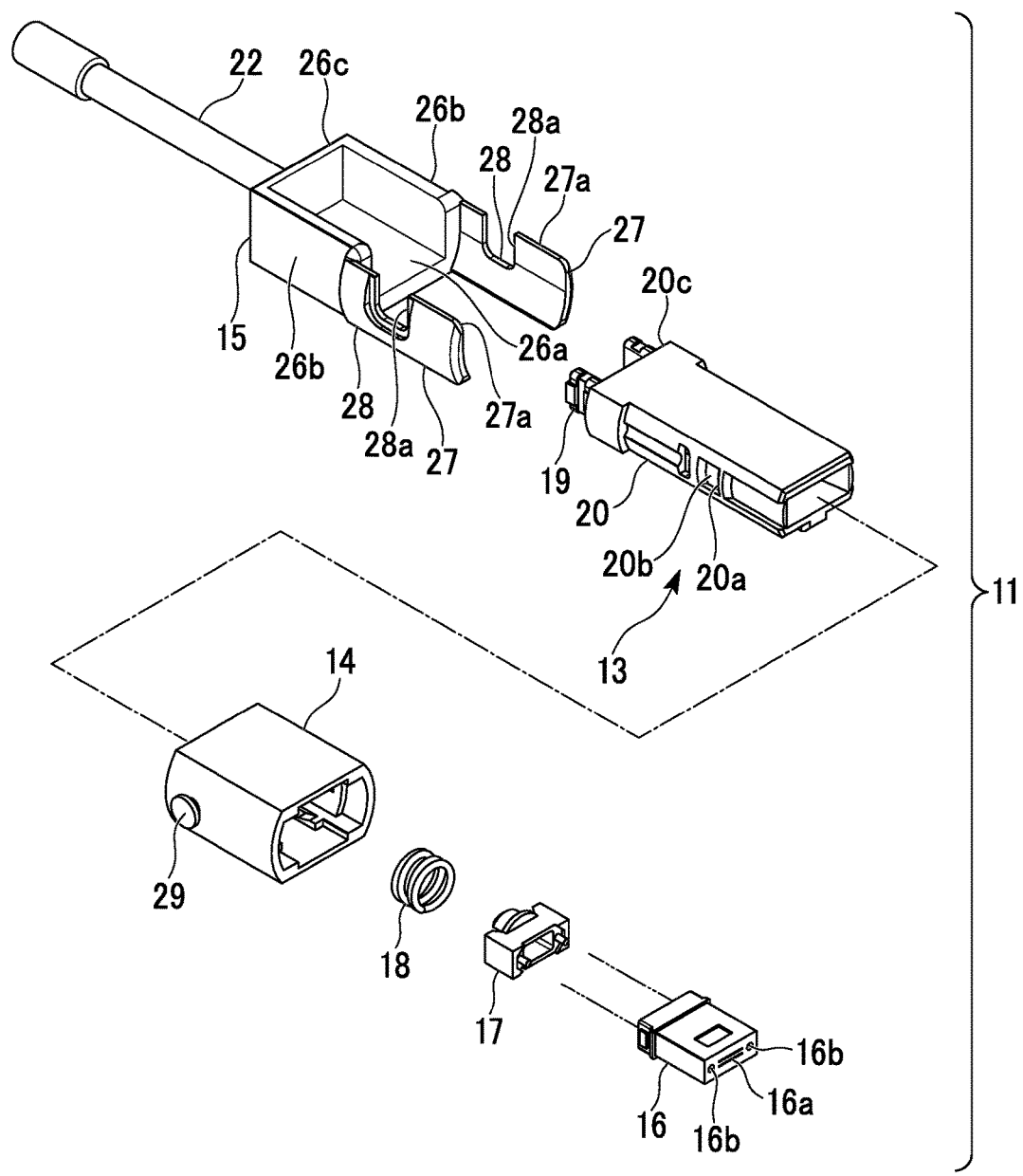
FIG. 7 is an exploded perspective view of the optical connector.
Figure 8:
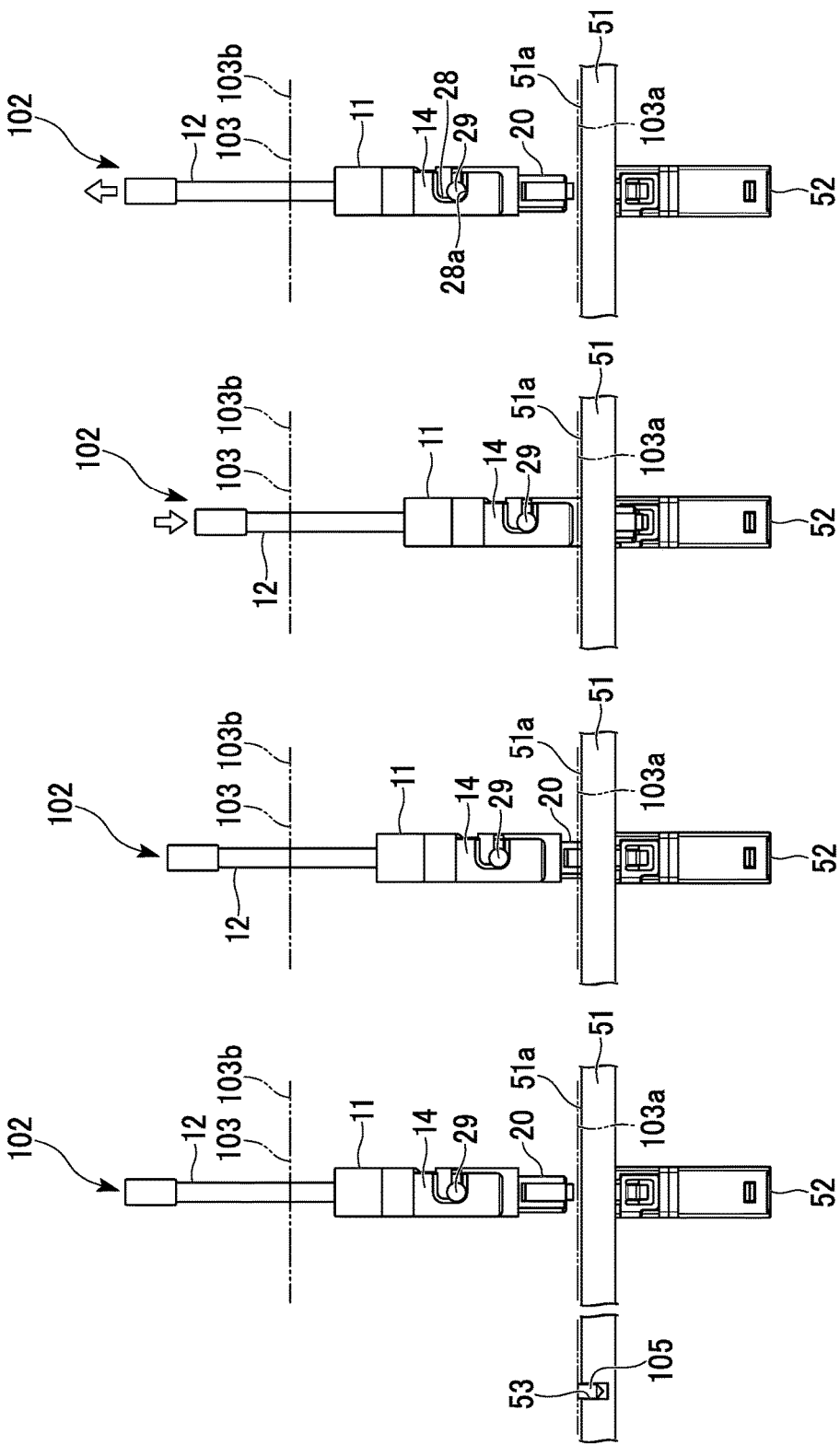
FIG. 8A is a front view illustrating a process where the optical connector is fitted to an optical connector of a counterpart substrate.
FIG. 8B is a front view illustrating a process where the optical connector is fitted to the optical connector of the counterpart substrate.
FIG. 8C is a front view illustrating a process where the optical connector is fitted to the optical connector of the counterpart substrate.
FIG. 8D is a front view illustrating a process where the optical connector is fitted to the optical connector of the counterpart substrate.

As illustrated in FIGS. 6 and 7, the other end-side optical connector 102 has the optical connector main body 11 which serves as an optical connector plug and the operation portion 12 which extends from the optical connector main body 11, and is movable in directions close to and away from the receptacle optical connector 52.

The optical connector main body 11 includes a connector main portion 13, a coupling 14 which can move forward and rearward with respect to the connector main portion 13, and a coupling engagement member 15 which is disposed in the rear of the connector main portion 13.

The optical connector main body 11 can adopt a structure of an MPO-type optical connector (F13-type optical connector pursuant to JIS C5982, MPO: Multi-fiber Push On).

The connector main portion 13 includes a ferrule 16 which is attached to a distal end of an optical fiber 42, a spring receiving portion 17 which is disposed on a rear side of the ferrule 16, a spring 18 (for example, a coil spring) which elastically biases the ferrule 16 forward, a contact member 19 with which a rear end of the spring 18 comes into contact, and a cylindrical housing 20 which accommodates these.

For example, the ferrule 16 is a multicore connector such as an MT-type optical connector, and a front surface thereof is a joining end surface 16a. A guide pin hole 16b into which a guide pin (not shown) is inserted is formed in the ferrule 16.

The spring 18 can bias the ferrule 16 forward via the spring receiving portion 17 by receiving a reaction force from the contact member 19.

An engagement projection 20a is formed on an outer side surface of the housing 20. A rear side of the engagement projection 20a serves as an engagement recess 20b with which a latch convex portion 60a of a latch 60 of the receptacle optical connector 52 (to be described later) engages.

The coupling 14 is slidable forward and rearward with respect to the housing 20. If the coupling slides rearward, the latch 60 of the receptacle optical connector 52 can disengage from the housing 20.

An engagement convex portion 29 which can engage with an inner edge of an engagement concave portion 28 is formed on both lateral surfaces of the coupling 14.

The coupling engagement member 15 includes a main body portion 26 and a pair of extension portions 27 extending forward from the main body portion 26. The coupling engagement member 15 is movable forward and rearward with respect to the connector main portion 13 and the coupling 14.

The main body portion 26 includes a bottom plate portion 26a, a lateral plate portion 26b disposed in both lateral edges thereof, and a rear plate portion 26c disposed in a rear edge of the bottom plate portion 26a.

The bottom plate portion 26a and the lateral plate portion 26b can press the housing 20 forward by coming into contact with a rear end portion 20c of the housing 20.

The extension portion 27 is formed in a long plate shape, and the engagement concave portion 28 is formed in one lateral edge portion 27a. Dimensions of the engagement concave portion 28 in the longitudinal direction are larger than dimensions of the engagement convex portion 29 of the coupling 14 in the longitudinal direction. This enables the coupling engagement member 15 to relatively move forward and rearward with respect to the coupling 14 in a state where the engagement convex portion 29 enters the engagement concave portion 28.

The optical fiber 42 is not particularly limited. However, for example, the optical fiber 42 can employ multicore optical fibers such as optical fiber ribbons having four cores, eight cores, or twelve cores. As the optical fiber 42, a plurality of stacked optical fiber ribbons may be used.

The optical connector main body 11 does not protrude from the exterior body 103 at least when located at the rearmost position and protrudes forward from the front surface 103a of the exterior body 103 through the insertion port 38. In this manner, it is preferable to configure the optical connector main body 11 so that the optical connector main body 11 can be removably attached and connected to the receptacle optical connector 52.

The optical connector main body 11 adopts a structure in which a movement in the longitudinal direction enables the optical connector main body 11 to appear and disappear from the front surface 103a (other surface) of the exterior body 103.

If the optical connector main body 11 adopts a structure in which the optical connector main body 11 does not protrude from the exterior body 103 at least when located at the rearmost position (when located at the farthest position away from the receptacle optical connector 52), it is possible to avoid the optical connector main body 11 being damaged when an operation is performed in order to attach or detach the optical connection box 10 to or from the counterpart substrate 51.

In the illustrated example, the optical connector main body 11 is accommodated in the exterior body 103 when located at the rearmost position. Accordingly, it is possible to avoid damage.

The optical connector main body 11 may adopt a structure in which a distal end portion does not protrude from the exterior body 103 during all processes. In this case, fitting to the receptacle optical connector 52 is performed inside the exterior body 103.

The operation portion 12 is gripped and operated by a worker, thereby enabling the optical connector main body 11 to move forward and rearward.

Concave and convex portions (not shown) for a non-slip operation are formed on an outer peripheral surface of a distal end portion of the operation portion 12. This can facilitate work when a worker operates the other end-side optical connector 102 by gripping the operation portion 12. For example, the concave and convex portions are configured to have a plurality of annular concave portions and a plurality of annular convex portions along a circumferential direction.

As illustrated in FIG. 1, the operation portion 12 protrudes outward from the rear surface 103b (one surface) through an insertion hole 34a formed on the upper plate 34 of the exterior body 103.

Figure 4:
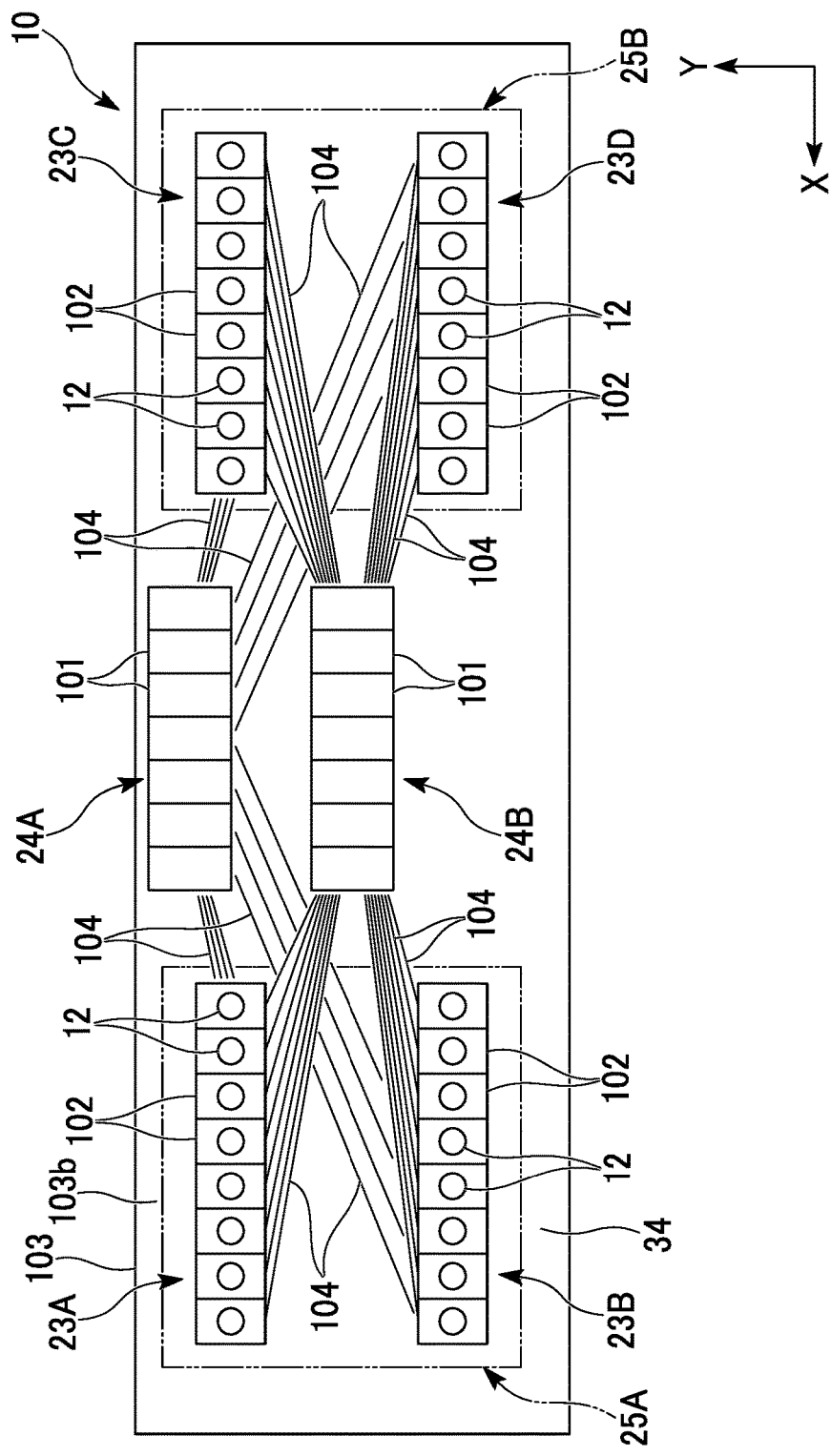
FIG. 4 is plan view schematically illustrating the optical connection box in FIG. 1.

As illustrated in FIG. 4, the other end-side optical connectors 102 are divided into a plurality of connector groups, and are disposed inside the exterior body 103.

In this example, four connector groups configured to have a plurality of the other end-side optical connectors 102 are disposed. These connector groups are referred to as first to fourth connector groups 23A to 23D. The connector groups 23A to 23D are configured to have eight other end-side optical connectors 102 which are respectively arrayed in one row along the longitudinal direction of the exterior body 103 in plan view.

The first and second connector groups 23A and 23B are disposed at a position on one end side (i.e., a position on the left side from the center in FIG. 4) from the center in the longitudinal direction of the exterior body 103 in plan view. The first and second connector groups 23A and 23B are disposed away from each other in the lateral direction of the exterior body 103.

The third and fourth connector groups 23C and 23D are disposed at a position on the other end side (i.e., a position on the right side from the center in FIG. 4) from the center in the longitudinal direction of the exterior body 103 in plan view. The third and fourth connector groups 23C and 23D are disposed away from each other in the lateral direction of the exterior body 103.

The first and second connector groups 23A and 23B can be collectively referred to as one end-side connector group 25A. The third and fourth connector groups 23C and 23D can be collectively referred to as the other end-side connector group 25B.

Connector groups 24A and 24B of the one end-side optical connector 101 are installed at a position different from that of the one end-side connector group 25A and the other end-side connector group 25B of the other end-side optical connectors 102. Therefore, the operation portion 12 of the other end-side optical connector 102 protrudes from the rear surface 103b of the exterior body 103 at any different position of one end-side optical connector 101.

As described above, the plurality of the other end-side optical connectors 102 are divided into two connector groups 25A and 25B. Therefore, the operation portion 12 of the other end-side optical connector 102 is divided into two groups. The operation portion 12 may be divided into three or more groups.

For example, with regard to a position in the X-direction, the connector groups 25A and 25B are located at a position on a peripheral edge side compared with the connector groups 24A and 24B. Therefore, the operation portion 12 of the other end-side optical connector 102 is located at a position on the peripheral edge side from one end-side optical connector 101.

For example, the one end-side optical connector 101 is an optical connector receptacle or an optical connector adapter.

As illustrated in FIG. 1, the one end-side optical connector 101 in the illustrated example is the optical connector receptacle. A pair of latches 60 is formed in a cylindrical main body portion 59 having an insertion port 58 into which an optical connector (for example, MPO-type optical connector, not shown) of one end-side optical path 21 is inserted. A latch convex portion 60a protruding inward is formed on an inner surface of a distal end portion of the latch 60.

As illustrated in FIG. 4, the one end-side optical connector 101 is divided into a plurality of connector groups, and is disposed on the upper plate 34.

In this example, two connector groups configured to have the plurality of the one end-side optical connectors 101 are disposed. The connector groups are referred to as the first and second connector groups 24A and 24B.

The connector groups 24A and 24B are configured to have seven one end-side optical connectors 101 which are respectively arrayed in one row along the longitudinal direction (X-direction) of the exterior body 103 in plan view. The connector groups 24A and 24B are disposed away from each other in the lateral direction of the exterior body 103.

It is preferable that a position of the connector groups 24A and 24B in the longitudinal direction of the exterior body 103 be located closer to the center compared with the connector groups 23A to 23D.

In the illustrated example, with regard to a position in the longitudinal direction (X-direction) of the exterior body 103, the connector groups 24A and 24B are located closer to the center (closer to the right in FIG. 4) compared with the connector groups 23A and 23B, and are located closer to the center (closer to the left in FIG. 4) compared with the connector groups 23C and 23D.

Therefore, in the longitudinal direction (X-direction) of the exterior body 103, the connector groups 24A and 24B are located between one end-side connector group 25A and the other end-side connector group 25B of the other end-side optical connector 102.

In the longitudinal direction (X-direction) of the exterior body 103, the connector groups 24A and 24B are located between a group configured to have the operation portion 12 of the plurality of the other end-side optical connectors 102 configuring one end-side connector group 25A and a group configured to have the operation portion 12 of the plurality of the other end-side optical connectors 102 configuring the other end-side connector group 25B.

With regard to a position in the lateral direction (Y-direction) of the exterior body 103, the connector group 24A is located closer to one end side (closer to the upper side in FIG. 4) compared with the connector groups 23A and 23C.

With regard to a position in the lateral direction (Y-direction) of the exterior body 103, the connector group 24B is located closer to the other end side (closer to the lower side in FIG. 4) compared with the connector groups 23A and 23C, and is located closer to one end side (closer to the upper side in FIG. 4) compared with the connector groups 23B and 23D.

In a connector group of the one end-side optical connectors, only a portion thereof may be located between two operation portion groups of the other end-side optical connectors, or all portions may be located between the operation portion groups of the other end-side optical connector. When the other end-side optical connector has three or more operation portion groups, at least a portion of one end-side optical connectors may be located between at least two operation portion groups of the other end-side optical connector.

In this example, the positions of the one end-side optical connector 101 and the other end-side optical connector 102 are different from each other in plan view.

That is, with regard to any position in the longitudinal direction and the lateral direction of the exterior body 103, the connector groups 24A and 24B of the one end-side optical connector 101 are installed at a position different from that of the connector groups 23A to 23D of the other end-side optical connector 102.

Therefore, it is possible to ensure a sufficient space for wiring of the relay optical fiber 104 around the respective optical connectors 101 and 102. Accordingly, even if the height dimension of the exterior body 103 is small, an excessive force is not applied to the relay optical fiber 104. Thus, it is possible to miniaturize the optical connection box 10.

In the longitudinal direction (X-direction) of the exterior body 103, the connector groups 24A and 24B of the one end-side optical connector 101 are located between the connector groups 23A and 23B, and the connector groups 23C and 23D of the other end-side optical connector 102. Accordingly, the relay optical fiber 104 can be shortened between the connector groups 23A to 23D, and the wiring can be carried out separately from each other. Therefore, it is possible to avoid a problem of loss or improper connection without the relay optical fiber 104 being complicated.

In particular, with regard to a position in the lateral direction (Y-direction), the connector group 24B of the one end-side optical connector 101 is also located between the connector groups 23A and 23B, and the connector groups 23C and 23D of the other end-side optical connector 102. Accordingly, the relay optical fiber 104 can be further shortened between the connector groups 23A to 23D of the other end-side optical connector 102, and the wiring can be carried out separately from each other. Therefore, it is advantageous in that the relay optical fiber 104 is prevented from being complicated, loss is suppressed, and improper connection is avoided.

The relay optical fiber 104 is an optical fiber wire or an optical fiber ribbon. At least one of the one end-side optical connectors 101 and at least one of the other end-side optical connectors 102 are optically connected to each other inside the exterior body 103.

In this case, the relay optical fiber 104 causes any one of the one end-side optical connectors 101 to be disposed in one terminal, and causes any one of the other end-side optical connectors 102 to be disposed in the other terminal.

Depending on an intended use, the relay optical fiber 104 can connect any desired one end-side optical connector 101 and any desired other end-side optical connector 102 to each other.

For example, one, two or more of the plurality of one end-side optical connectors 101 which belong to the connector group 24A can be connected to one, two or more of the plurality of the other end-side optical connectors 102 which belong to one, two or more of the connector groups 23A to 23D via the relay optical fiber 104.

Similarly, one, two or more of the plurality of one end-side optical connectors 101 which belong to the connector group 24B can be connected to one, two or more of the plurality of the other end-side optical connectors 102 which belong to one, two or more of the connector groups 23A to 23D via the relay optical fiber 104.

Figure 5:
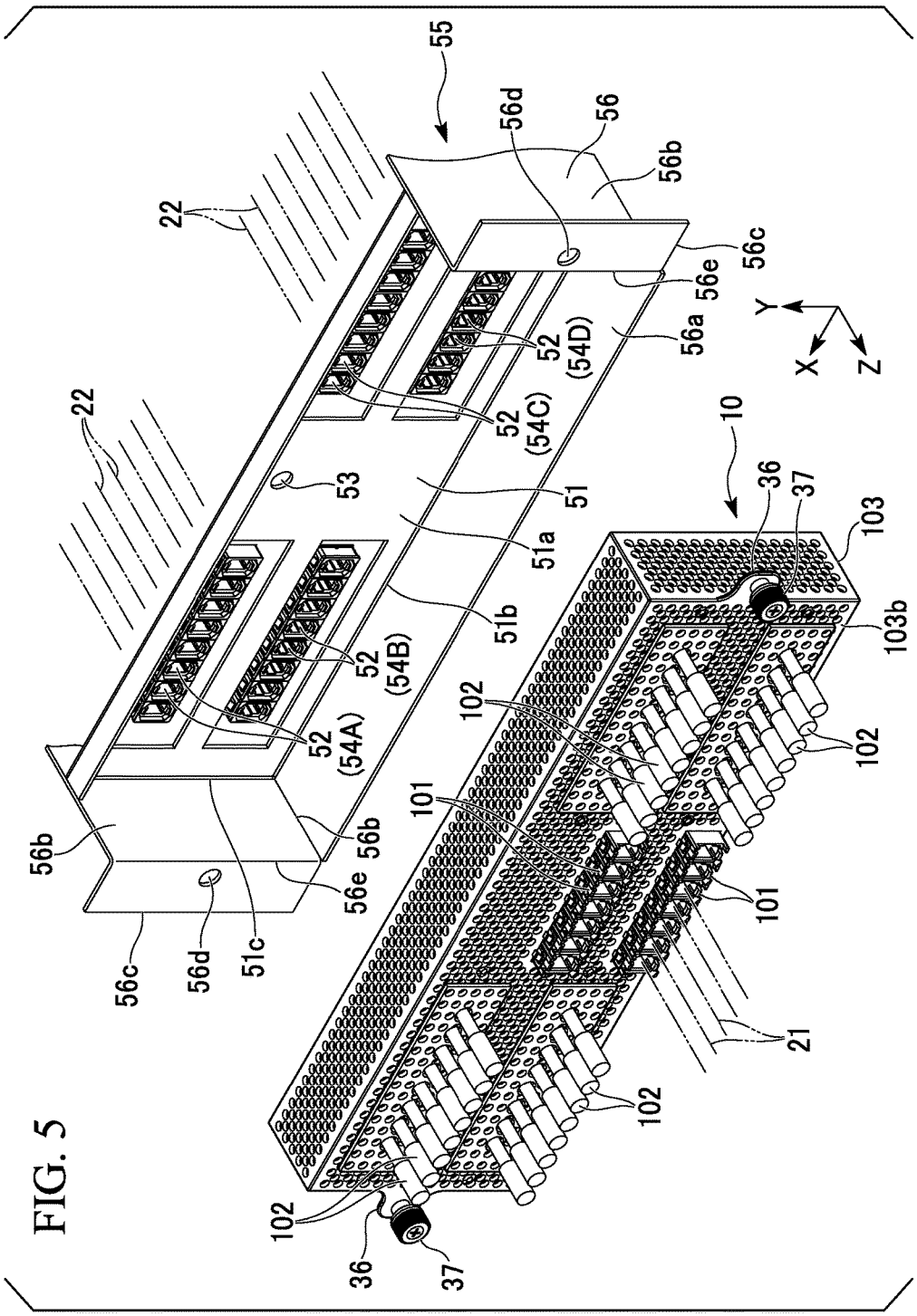
FIG. 5 is a perspective view illustrating the optical connection box in FIG. 1 and a counterpart unit.

FIG. 5 illustrates a counterpart unit 55 in which the optical connection box 10 is installed. The counterpart unit 55 has a counterpart substrate 51 and a positioning plate 56 which extends rearward from a lower side edge portion 51b (i.e., one lateral edge portion 51b) and both end edge portions 51c of the counterpart substrate 51.

The positioning plate 56 has a bottom plate portion 56a extending from the lower side edge portion 51b, end plate portions 56b and 56b extending from the end edge portion 51c, and extension plate portions 56c respectively extending outward from extension edge portions 56e and 56e of the end plate portions 56b and 56b. An insertion hole 56d is formed in the extension plate portion 56c.

Two or more counterpart units 55 may be disposed. The plurality of counterpart units 55 can be connected to each other via the other end-side optical path 22.

For example, the receptacle optical connector 52 is an optical connector receptacle or an optical connector adapter.

As illustrated in FIG. 1, the optical connector 52 in the illustrated example is the optical connector receptacle. A pair of latches 60 is formed in the cylindrical main body portion 59 having the insertion port 58 into which the optical connector main body 11 of the other end-side optical connector 102 is inserted. The latch convex portion 60a protruding inward is formed on the inner surface of the distal end portion of the latch 60.

As illustrated in FIG. 5, the receptacle optical connector 52 is disposed at a position corresponding to the other end-side optical connector 102. In the illustrated example, four connector groups configured to have the plurality of receptacle optical connectors 52 are disposed on the counterpart substrate 51. The connector groups are referred to as first to fourth connector groups 54A to 54D.

The connector groups 54A to 54D are configured to have eight receptacle optical connectors 52 which are arrayed in one row along the longitudinal direction (X-direction) of the exterior body 103. The connector groups 54A to 54D are respectively disposed at positions conforming to connector groups 23A to 23D.

Next, a usage method of the optical connection box 10 will be described with reference to FIGS. 8 to 11.

(First Stage)

As illustrated in FIG. 8A, the optical connection box 10 is moved downward (forward), and is installed on the installation surface 51a of the counterpart substrate 51.

At this time, the fitting convex portion 105 is fitted to the fitting concave portion 53 of the counterpart substrate 51. This regulates a movement of the optical connection box 10 in the direction along the counterpart substrate 51 (for example, a rightward-leftward direction and a vertical direction to the paper surface in FIG. 8A), and the optical connection box 10 is roughly positioned with respect to the counterpart substrate 51.

As illustrated in FIG. 5, the insertion portion 37b of the fixing pin 37 which is inserted into the insertion hole 36a of the extension piece 36 may be inserted into the insertion hole 56d of the extension plate portion 56c. This causes the optical connection box 10 to be positioned at three points (i.e., the fitting convex portion 105, the fixing pins 37 and 37), and causes the optical connection box 10 to have a determined posture (that is, to have a posture in which the longitudinal direction of the exterior body 103 coincides with the longitudinal direction of the counterpart substrate 51). This state is referred to as "a first positioning".

(Second Stage)

Figure 9:
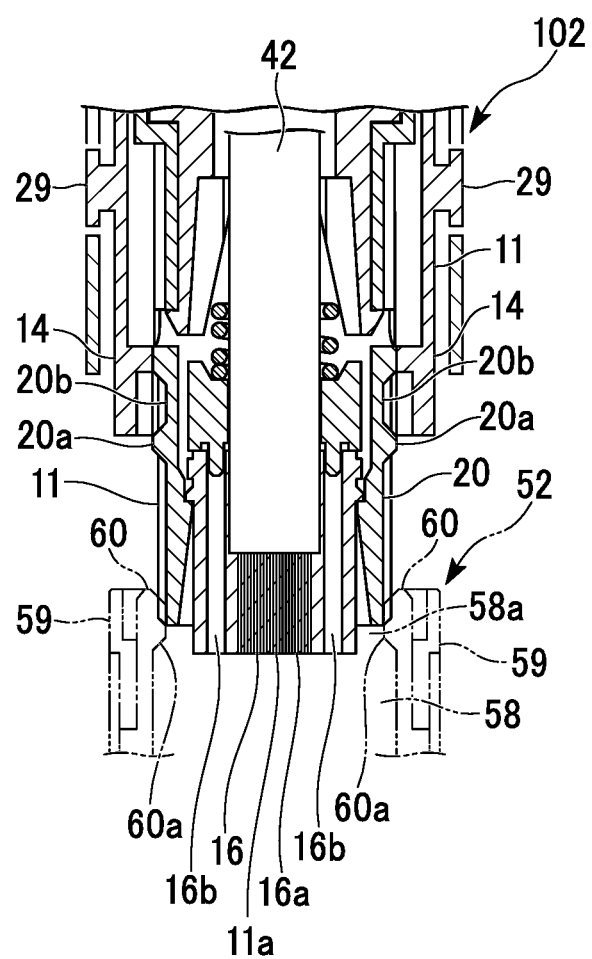
FIG. 9 is a cross-sectional view illustrating a process where the optical connector is fitted to the optical connector of the counterpart substrate.

As illustrated in FIGS. 8B and 9, the optical connection box 10 is installed on the installation surface 51a of the counterpart substrate 51 so that a distal end portion 11a of the optical connector main body 11 of the other end-side optical connector 102 is inserted into an entrance portion 58a of the insertion port 58 of the receptacle optical connector 52.

If the other end-side optical connector 102 does not reach the receptacle optical connector 52, the optical connector main body 11 is moved forward by gripping the operation portion 12. In this manner, the distal end portion 11a can be arranged in the entrance portion of the insertion port 58. This state is referred to as "a second positioning".

In this state, the distal end portion 11a is arranged in the entrance portion of the insertion port 58. Accordingly, a movement of the optical connector main body 11 is regulated in the direction along the counterpart substrate 51. Therefore, a planar view position of the optical connector main body 11 is determined with respect to the receptacle optical connector 52.

(Third Stage)

Figure 10:
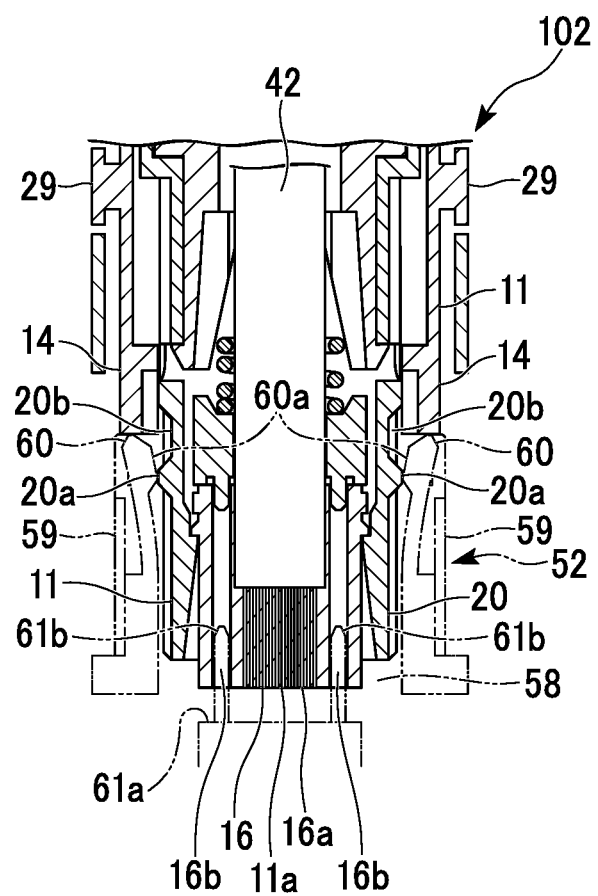
FIG. 10 is a cross-sectional view illustrating a process where the optical connector is fitted to the optical connector of the counterpart substrate, subsequent to FIG. 9.

As illustrated in FIGS. 8C and 10, the other end-side optical connector 102 is pressed downward (forward), and the distal end portion 11a of the optical connector main body 11 is deeply inserted into the insertion port 58 of the receptacle optical connector 52.

For example, if the operation portion 12 is gripped and pressed forward, a pressing force thereof is transmitted to the coupling engagement member 15. Then, a front end of the main body portion 26 (for example, a front end of the bottom plate portion 26a and the lateral plate portion 26b which are illustrated in FIG. 7) comes into contact with the rear end portion 20c of the housing 20, and presses the housing 20 forward. This causes the optical connector main body 11 to move forward, and causes the distal end portion 11a to be deeply inserted into the receptacle optical connector 52.

As illustrated in FIG. 10, the forward movement of the optical connector main body 11 causes the engagement projection 20a of the housing 20 to displace the latch 60 outward (i.e., in a direction in which a distance between the latches 60 increases). The displaced latch 60 regulates the forward movement of the coupling 14.

Figure 11:
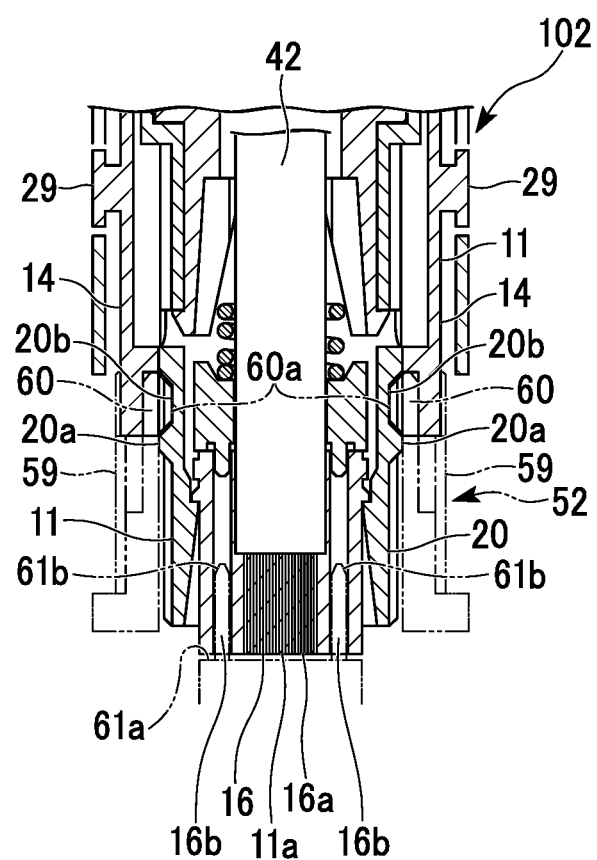
FIG. 11 is a cross-sectional view illustrating a process where the optical connector is fitted to the optical connector of the counterpart substrate, subsequent to FIG. 10.

As illustrated in FIG. 11, whereas the forward movement of the coupling 14 is regulated, the housing 20 is moved forward. Accordingly, the engagement recess 20b is exposed, the latch 60 is displaced inward, and the latch convex portion 60a engages with the engagement recess 20b.

The inward displacement of the latch 60 releases the regulation of the forward movement of the coupling 14. Accordingly, the coupling 14 is moved forward by an elastic force of a spring (not shown) inside the coupling 14.

FIG. 11 illustrates a state where the other end-side optical connector 102 is completely fitted to the receptacle optical connector 52. This state is referred to as "a third positioning".

At this position, the joining end surface 16a of the ferrule 16 is caused to abut onto a connection end surface 61a inside the receptacle optical connector 52, and a pair of guide pins 61b formed on the connection end surface 61a are respectively inserted into the guide pin hole 16b of the ferrule 16. This causes the ferrule 16 to be very accurately positioned with respect to the receptacle optical connector 52.

The respective other end-side optical connectors 102 can be mutually and independently operated. Accordingly, only one that is required out of the plurality of other end-side optical connectors 102 can be fitted to the receptacle optical connector 52.

(Detachment of Other-End Optical Connector 102 from Receptacle Optical Connector 52)

The other end-side optical connector 102 can be detached from the receptacle optical connector 52 as follows.

As illustrated in FIG. 8D, if the operation portion 12 is gripped and pulled rearward, a tensile force is transmitted to the coupling engagement member 15. A front edge 28a of the engagement concave portion 28 formed in the extension portion 27 applies a rearward acting force to the engagement convex portion 29 of the coupling 14. In this manner, the coupling 14 is moved rearward.

As illustrated in FIG. 10, the rearward movement of the coupling 14 causes the engagement recess 20b of the housing 20 to be exposed, and brings the latch 60 into an outward displaceable state.

If the coupling 14 is further moved rearward, a spring (not shown) inside the coupling 14 applies a rearward acting force to the optical connector main body 11. The optical connector main body 11 also starts to move rearward, and the engagement projection 20a displaces the latch 60 outward. In this manner, the latch convex portion 60a is disengaged from the engagement recess 20b.

If the operation portion 12 is further pulled rearward, the coupling engagement member 15 moves away from the housing 20, and the other end-side optical connector 102 is pulled out from the receptacle optical connector 52.

The optical connection box 10 has a structure in which the one end-side optical connector 101 and the other end-side optical connector 102 are connected to each other by the relay optical fiber 104. Therefore, if there is provided in advance the optical connection box 10 in which the optical connectors 101 and 102 selected for an intended use are connected to each other, even when complicated optical wiring is needed, it is possible to build the optical wiring which is most suitable to the intended use by an easy operation of installing the optical connection box 10 on the counterpart substrate 51.

Accordingly, it is possible to easily and reliably build the complicated optical wiring using many optical fibers.

In addition, according to the optical connection box 10, installation work goes through three stages of positioning. Accordingly, it is possible to reliably and accurately fit the other end-side optical connector 102 to the receptacle optical connector 52.

That is, after a position of the exterior body 103 on the counterpart substrate 51 is roughly determined by fitting the fitting convex portion 105 to the fitting concave portion 53 in the first stage, a position of the other end-side optical connector 102 is determined with respect to the receptacle optical connector 52 in the second stage. Subsequently, in the third stage, the installation work goes through a process of completely and finally determining the position. In this manner, it is possible to guide the other end-side optical connector 102 to the receptacle optical connector 52.

According to this configuration, even when the position of the other end-side optical connector 102 is deviated, the deviation is reliably corrected and the other end-side optical connector 102 is guided to a correct position. In this manner, it is possible to reliably and accurately fit the other end-side optical connector 102 to the receptacle optical connector 52.

Therefore, it is possible to build a highly reliable optical wiring.

Hitherto, the present invention has been described in detail with reference to the exemplary embodiment. However, the present invention is not limited to the above-described exemplary embodiment. Various modifications can be added to the present invention within a scope not departing from the spirit of the present invention.

For example, in the illustrated example, the connector groups 23A to 23D are configured to respectively have the plurality of the other end-side optical connectors 102. However, instead of one or more connector groups therefrom, the connector groups 23A to 23D may respectively employ one optical connector 102.

In addition, the connector group 24A or the connector group 24B is also configured to respectively have the plurality of one end-side optical connectors 101. However, instead of one or more connector groups therefrom, the connector group 24A or the connector group 24B may respectively employ one optical connector 101.

The number of connector groups of the one end-side optical connector 101 is not limited to two, and may be one, or may be any desired number of three or more.

The number of connector groups of the other end-side optical connector 102 is not also limited to four, may be any one of one to three, or may be any desired number of five or more.

The number of connectors configuring the connector group of the one end-side optical connector 101 and the other end-side optical connector 102 may be any desired number of two or more.

In addition, the optical connection box 10 adopts a structure in which the fitting convex portion 105 formed in the exterior body 103 is fitted to the fitting concave portion 53 of the counterpart substrate 51. However, on the other hand, the optical connection box 10 may adopt a structure in which a fitting convex portion (fitting portion) formed on the counterpart substrate 51 is fitted to a fitting concave portion (fitted portion) of the exterior body 103.

In addition, the exterior body 103 in the illustrated example has a box shape. However, as long as a structure can protect the relay optical fiber so as not to be affected by an external force, the shape of the exterior body 103 is not limited to the box shape. For example, the exterior body 103 may adopt a structure which is configured to have a bottom plate, an upper plate, and a columnar body for connecting both of these, and which can accommodate the relay optical fiber and the other end-side optical connector in a space formed between the bottom plate and the upper plate.

Second Exemplary Embodiment

Hereinafter, the present invention will be described with reference to preferred exemplary embodiments. First, referring to FIGS. 12A and 12B, an overview of the first exemplary embodiment of the present invention will be described. Subsequently, detailed description will be added with reference to FIG. 13A and thereafter.

Figure 12A:
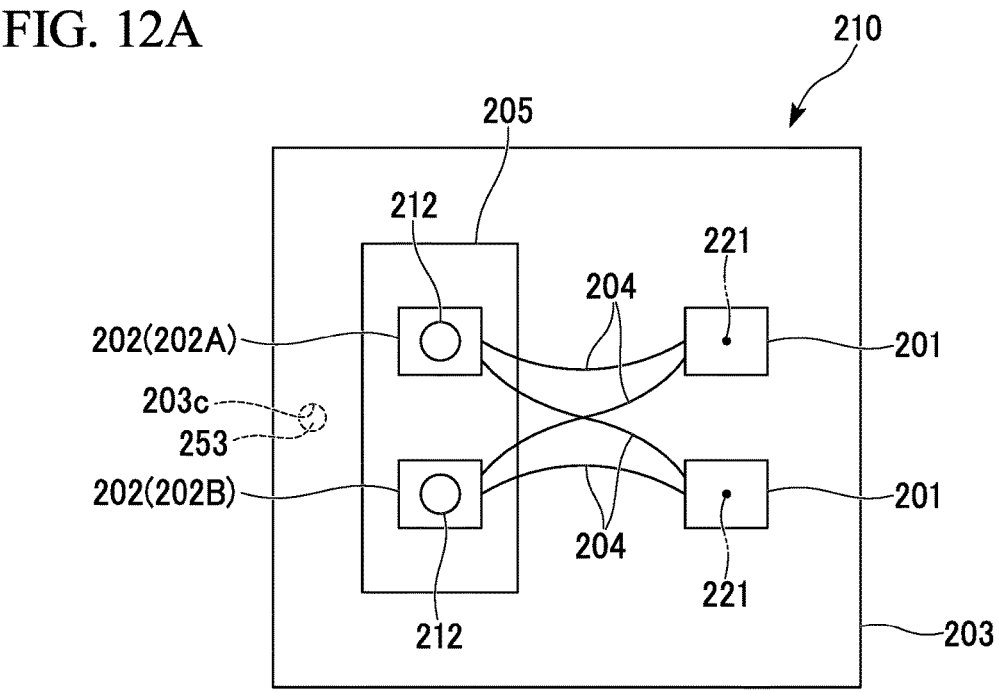
FIG. 12A is plan view schematically illustrating a relay optical connection unit according to an exemplary embodiment of the present invention.
Figure 12B:
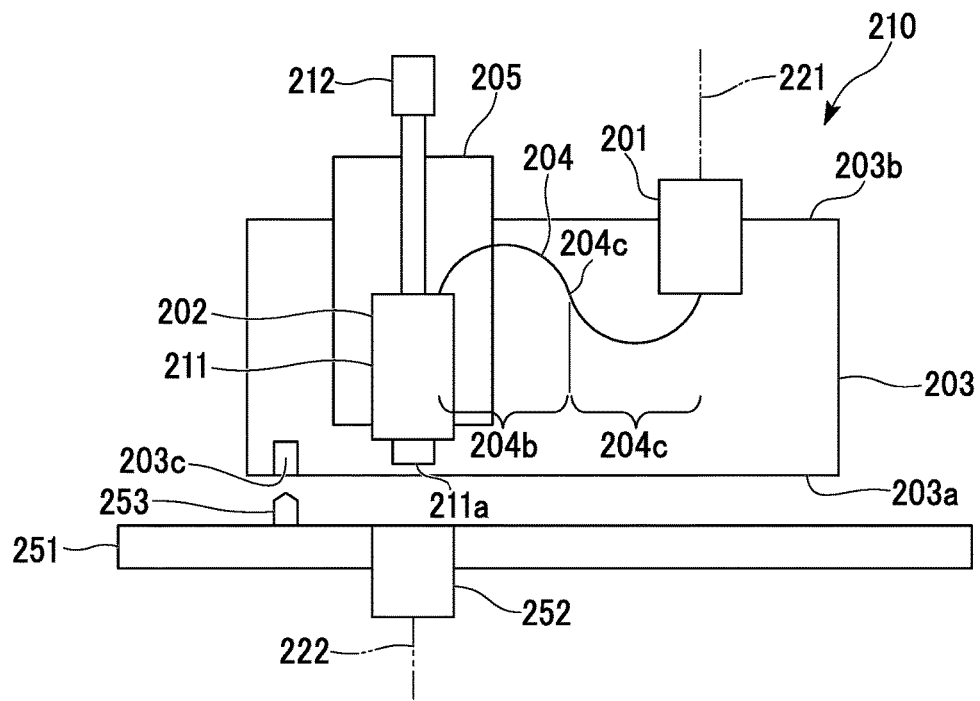
FIG. 12B is a side view schematically illustrating the relay optical connection unit according to the exemplary embodiment of the present invention.

As illustrated in FIGS. 12A and 12B, the relay optical connection unit (optical connection box) 210 which is one exemplary embodiment of the present invention includes one end-side optical connector (first optical connector) 201, the other end-side optical connector (second optical connector) 202, a movable holding body 205 that collectively holds a plurality of the other end-side optical connectors 202, a relay optical fiber 204 which optically connects the one end-side optical connector 201 and the other end-side optical connector 202, and a housing 203 where the above-described members are provided.

Hereinafter, a direction (downward in FIG. 12B) in which the other end-side optical connector 202 moves close to a receptacle optical connector 252 of a counterpart substrate (counterpart unit) 251 is referred to as a forward direction, and an opposite direction thereto (i.e., upward in FIG. 12B) is referred to as a rearward direction. The forward direction is an insertion direction and the rearward direction is a removal direction. The insertion direction and the removal direction are sometimes collectively referred to as "an insertion and removal direction".

The other end-side optical connector 202 has an optical connector main body 211 which is an optical connector plug and an operation portion 212 which extends from the optical connector main body 211.

The other end-side optical connector 202 is movable in the forward and rearward direction (i.e., an upward and downward direction in FIG. 12B). The optical connector main body 211 can be accommodated inside the exterior body 203 when moving rearward, and can be connected to the receptacle optical connector 252 so that insertion and removal are available by protruding forward from a front surface 203a of the housing 203 when moving forward.

The operation portion 212 protrudes outward from a rear surface 203b (one surface) of the exterior body 203.

As illustrated in FIG. 12A, in this example, there are two other end-side optical connectors 202, and each of them is referred to as the other end-side optical connector 202A and the other end-side optical connector 202B.

The movable holding body 205 is movable in directions close to and away from the receptacle optical connector 252 (i.e., the upward and downward direction of FIG. 12B) while collectively holding the plurality of the other end-side optical connectors 202. In the illustrated example, the movable holding body 205 holds both of the two other end-side optical connectors 202.

One end-side optical connector 201 is disposed on the rear surface 203b side of the exterior body 203, and an optical connector (not shown) disposed in a terminal of one end-side optical path (first optical path) 221 is connected to the one end-side optical connector 201.

In one end-side optical connector 201, a planar view position (i.e., a position viewed from the insertion and removal direction) is different from that of the other end-side optical connector 202. In FIGS. 12A and 12B, one end-side optical connector 201 is located slightly rightward from the center of the exterior body 203, and the other end-side optical connector 202 is located slightly leftward from the center of the exterior body 203.

As illustrated in FIG. 12B, a fitting convex portion (housing positioning portion) 203c is formed on a side of the front surface 203a of the housing 203.

The fitting concave portion 203c can be fitted to a fitting convex portion 253 disposed on an installation surface 251a of the counterpart substrate 251, and thereby, the housing 203 can be positioned with respect to the counterpart substrate 251.

As illustrated in FIG. 12B, the relay optical fiber 204 is preferably wired in approximately S-shape.

Specifically, the relay optical fiber 204 preferably has an S-shape including one end-side curve portion 204a which is a portion between a position connected to the one end-side optical connector 201 and an intermediate point (inflection point) 204c and the other end-side curve portion 204b which is a portion between the intermediate point 204c and a position connected to the other end-side optical connectors 202.

The one end-side curve portion 204a is curved so as to convex forward (i.e., a downward direction in FIG. 12B), and the other end-side curve portion 204b is curved so as to convex rearward (i.e., an upward direction in FIG. 12B). The curve portions 204a, 204b has appropriately arc-like shape, and curvature thereof is set so as not to affect optical characteristics of the relay optical fiber 204.

The relay optical fiber 204 is wired in an S-shape including the curve portions 204a and 204b, and the curve portions 204a and 204b provide sufficient extra lengths. Therefore, even when the other end-side optical connectors 202 move in the forward and rearward direction, the addition of local bending to the relay optical fiber 204 can be avoided.

The receptacle optical connector 252 is disposed on the counterpart substrate 251 in which the relay optical connection unit 210 is installed. The receptacle optical connector 252 is disposed in a terminal of the other end-side optical path (second optical path) 222.

FIG. 12B illustrates a state immediately before the relay optical connection unit 210 is installed on the counterpart substrate 251.

Next, a method of using the relay optical connection unit 210 will be described.

(First Stage)

As illustrated in FIG. 12B, the relay optical connection unit 210 is moved downward (forward), and is installed on the installation surface 251a of the counterpart substrate 251.

At this time, the fitting concave portion 203 of the housing 203 is fitted to the fitting convex portion 253 of the counterpart substrate 251. This regulates a movement (i.e., a lateral movement) of the optical connection unit 210 in the direction along the counterpart substrate 251, and a planar view position of the relay optical connection unit 210 is roughly positioned with respect to the counterpart substrate 251.

By fitting the fitting concave portion 203c to the fitting convex portion 253, the relay optical connection unit 210 is positioned and this is referred to as "a first positioning".
(Second Stage)

The movable holding body 205 is moved downward toward the receptacle optical connector 252. Since a plurality of the other end-side optical connectors 202 (202A, 202B) is collectively held at the movable holding body 205, in line with the movable holding body 205 moving downward, the other end-side optical connectors 202A, 202B also move downward.

As described below, at this time, a guide bar 250 which protrudes from the movable holding body 205 (see FIG. 14A and FIG. 14B) is inserted to a guide hole 254 formed at the counterpart substrate 251, and thereby, the lateral movement of the movable holding body 205 is regulated.

Therefore, the other end-side optical connectors 202 can be arranged at a position where each of the other end-side optical connectors 202 can be fitted to the corresponding receptacle optical connector 252.

By inserting the guide bar 250 to the guide hole 254, the movable holding body 205 and the other end-side optical connector 202 are positioned and this is referred to as "a second positioning".
(Third Stage)

The distal end portion 211a of the optical connector main body 211 of the other end-side optical connector 202 is inserted to the entrance portion of the receptacle optical connector 252.

At this time, if necessary, the operation portion 212 is gripped to move the optical connector main body 211 forward, and thereby, the distal end portion 211a thereof can be inserted to the entrance portion of the insertion port 258.

The distal end portion 211a is inserted to an entrance portion of the insertion port 258. Thereby, the lateral movement of the optical connector main body 211 is regulated, and a planar view position of the optical connector main body 211 is determined with respect to the receptacle optical connector 252.

The positioning of the optical connector main body 211 with respect to the receptacle optical connector 252 is referred to as "a third positioning".
(Fourth Stage)

If the optical connector main body 211 is moved forward, the distal end portion 211a of the optical connector main body 211 is deeply inserted into the receptacle optical connector 252, and is completely fitted to the receptacle optical connector 252.

As described below, at this time, the joining end surface 216a of the ferrule 216 is caused to abut onto a connection end surface 261a inside the receptacle optical connector 252 (see FIGS. 21A-21C), and a pair of guide pins 261b formed on the connection end surface 261a are respectively inserted into the guide pin hole 216b of the ferrule 216.

This causes the other end-side optical connector 202 to be accurately positioned with respect to the receptacle optical connector 252, and the other end-side optical connector 202 and the receptacle optical connector 252 are optically connected.

The positioning of the other end-side optical connector 202 with respect to the receptacle optical connector 252 is referred to as "a fourth positioning".

Next, the relay optical connection unit 210 will be described in detail with reference to FIGS. 13A-21C.

As illustrated in FIGS. 13A and 13B, 14A, and 14B, the relay optical connection unit 210 includes a plurality of one end-side optical connector 201 to which one end-side optical path 221 is connected, the other end-side optical connector 202 to which the other end-side optical path 222 is connected, a movable holding body 205 that collectively holds a plurality of the other end-side optical connectors 202, a relay optical fiber 204 which optically connects the one end-side optical connector 201 and the other end-side optical connector 202, and a housing 203 where the above-described members are provided.

Figure 13A:
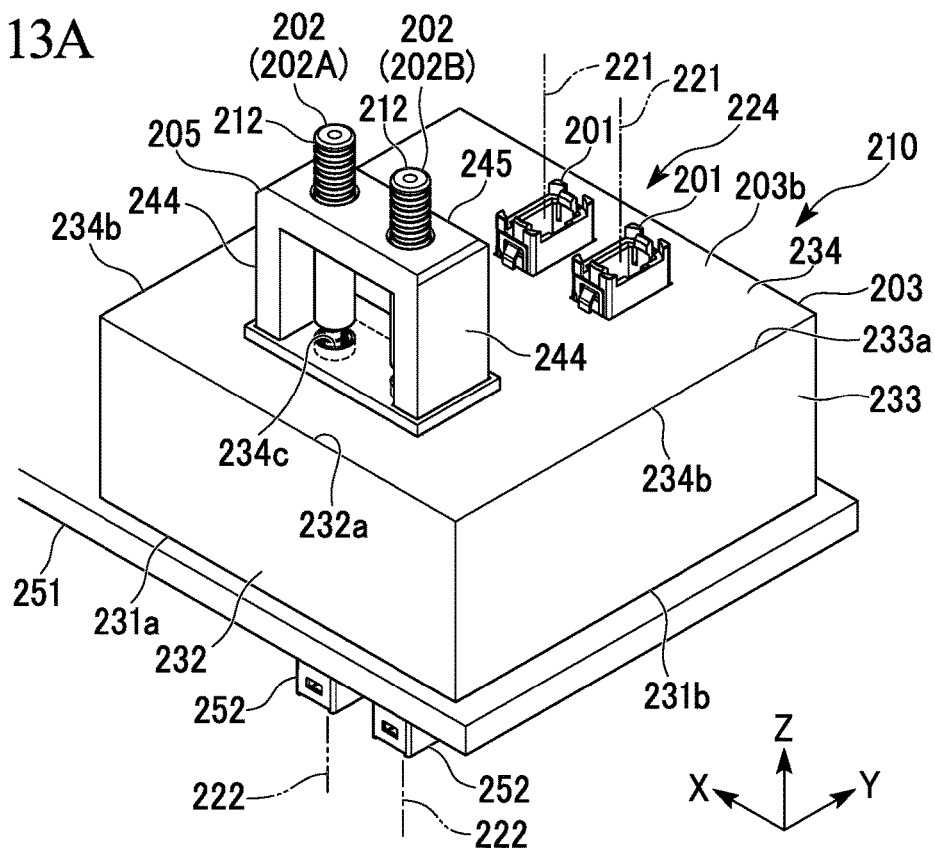
FIG. 13A is a perspective view from an upper surface side which illustrates the relay optical connection unit.
Figure 13B:
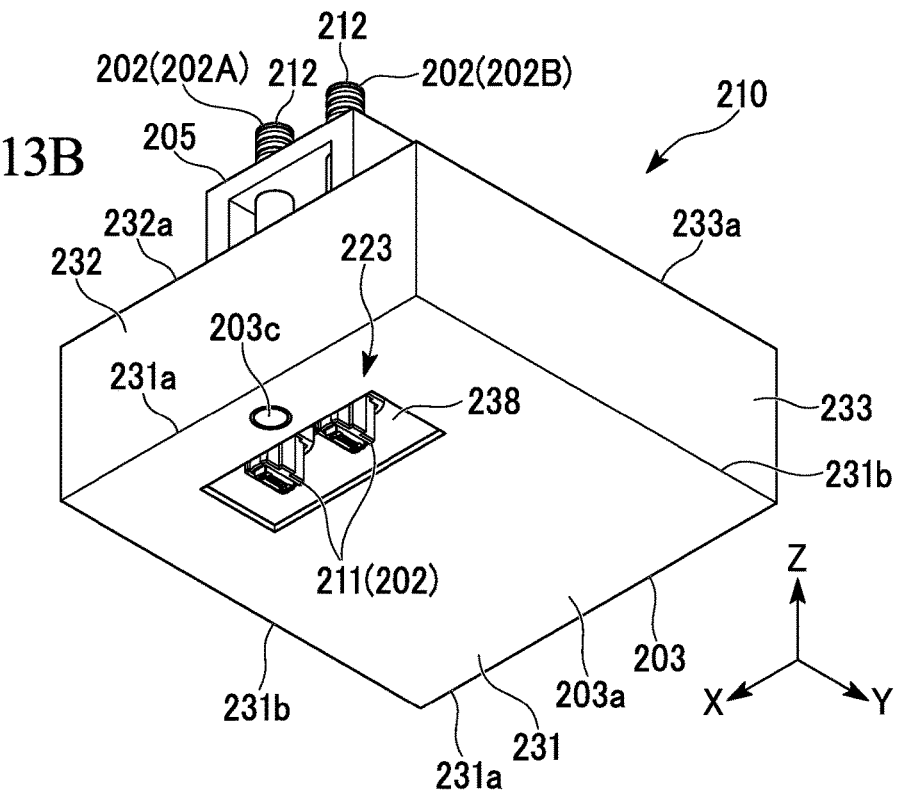
FIG. 13B is a perspective view from a lower surface side which illustrates the relay optical connection unit.

As illustrated in FIGS. 13A and 13B, the housing 203 is formed in a substantially rectangular parallelepiped box shape. Specifically, the housing 203 has a rectangular bottom plate 231, a lateral plate 232 erected on a lateral edge portion 231a which is a long side of the bottom plate 231, an end plate 233 erected on an end edge portion 231b which is a short side of the bottom plate 231, and an upper plate 234 disposed in upper edge portions 232a and 233a of the lateral plate 232 and the end plate 233.

Hereinafter, a structure may be described with reference to an XYZ orthogonal coordinate system illustrated in FIG. 13A and the like. An X-direction represents an extending direction of the lateral edge portion 231a of the bottom plate 231, and represents a longitudinal direction of the bottom plate 231. A Y-direction represents a direction orthogonal to the X-direction within a plane parallel to the bottom plate 231, and represents an extending direction of the end edge portion 231b. A Z-direction represents a height direction which is orthogonal to the X-direction and the Y-direction.

As illustrated in FIG. 13B, an insertion port 238 into which the other end-side optical connector 202 is inserted is formed on the bottom plate 231.

The insertion port 238 is formed at a position conforming to the other end-side optical connectors 202. The insertion port 238 has a shape of collectively surrounding all of the other end-side optical connectors 202 in plan view. The insertion port 238 in the illustrated example has a rectangular shape in which a longitudinal direction is along an X-direction, and has shape of collectively surrounding the two other end-side optical connectors 202.

As illustrated in FIG. 13B, a fitting concave portion 203c is formed in the bottom surface 231 of the housing 203. The fitting concave portion 203c is a concave portion or an opening portion which is formed on a side of the front surface 203a of the housing 203, and the fitting convex portion 253 provided on the installation surface 251a of the counterpart substrate 251 (see FIG. 14A) can be fit to the fitting concave portion 203c.

In the illustrated example, the fitting concave portion 203c is an aperture portion that has a circular shape in plan view and is formed at the bottom plate 231.

It is preferable that an inner diameter of the fitting concave portion 203c is approximately the same as or slightly larger than an outer diameter of the fitting convex portion 253 (i.e., a main portion 253a). When fitted to the fitting concave portion 253, this can regulate a lateral movement of the housing 203.

Figure 14A:
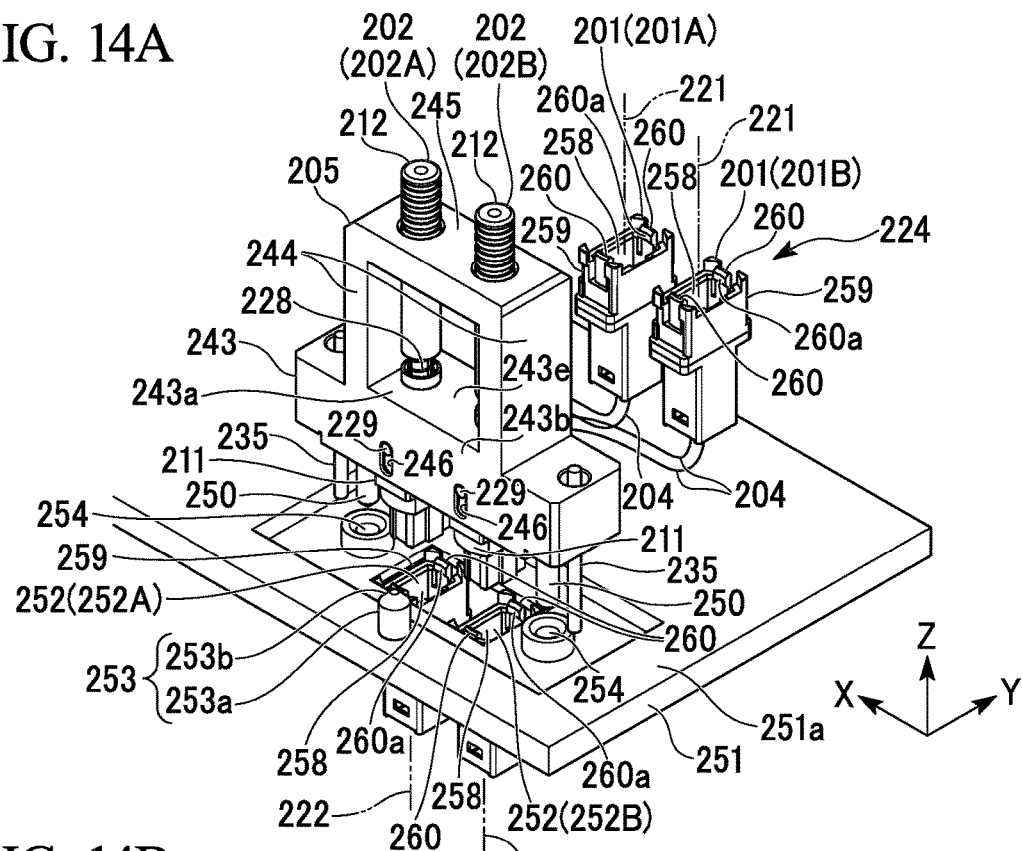
FIG. 14A is a perspective view from the upper surface side which illustrates an internal structure of the relay optical connection unit.

The fitting convex portion 253 as illustrated in FIG. 14A includes a cylindrical main portion 253a protruding upward (i.e., a Z-direction) from the installation surface 251a of the counterpart substrate 251 and a distal end portion 253 which has a substantially conical shape and whose diameter gradually decreases from a distal end of the main portion 253a in a protruding direction thereof.

The distal end portion 253b has a shape whose diameter gradually decreases in the protruding direction. Accordingly, when the fitting convex portion 253 is fitted to the fitting concave portion 203c, even if a planar view position of the fitting convex portion 253 is deviated from the fitting concave portion 203c, it is possible to guide the fitting convex portion 253 to a correct position along a slope on an outer surface of the distal end portion 253b.

In the relay optical connection unit 210, a structure is used such that the fitting concave portion (housing positioning portion) 203c of the housing 203 is fitted to the fitting convex portion 253 of the counterpart substrate 251. However, in an opposite manner, a structure can be used such that the fitting convex portion (housing positioning portion) formed in the housing 203 is fitted to the fitting concave portion of the counterpart substrate 251, and thereby, the movable holding body 205 is arranged at a predetermined position.

As a positioning structure of the housing 203, it is not limited to a structure of concavo-convex fitting between the counterpart substrate 251 and the housing 203. Adhesion, adsorption, and other positioning structures can be used.

The housing 203 in the illustrated example has a box shape. However, as long as a structure can hold the one end-side optical connectors 201, the other end-side optical connectors 202, the movable holding body 205, and the relay optical fibers 204, the shape of the housing 203 is not limited to the box shape. For example, the housing 203 may adopt a structure which is configured to have a bottom plate 231, an upper plate 234, and a columnar body for connecting both of these.

Figure 15:
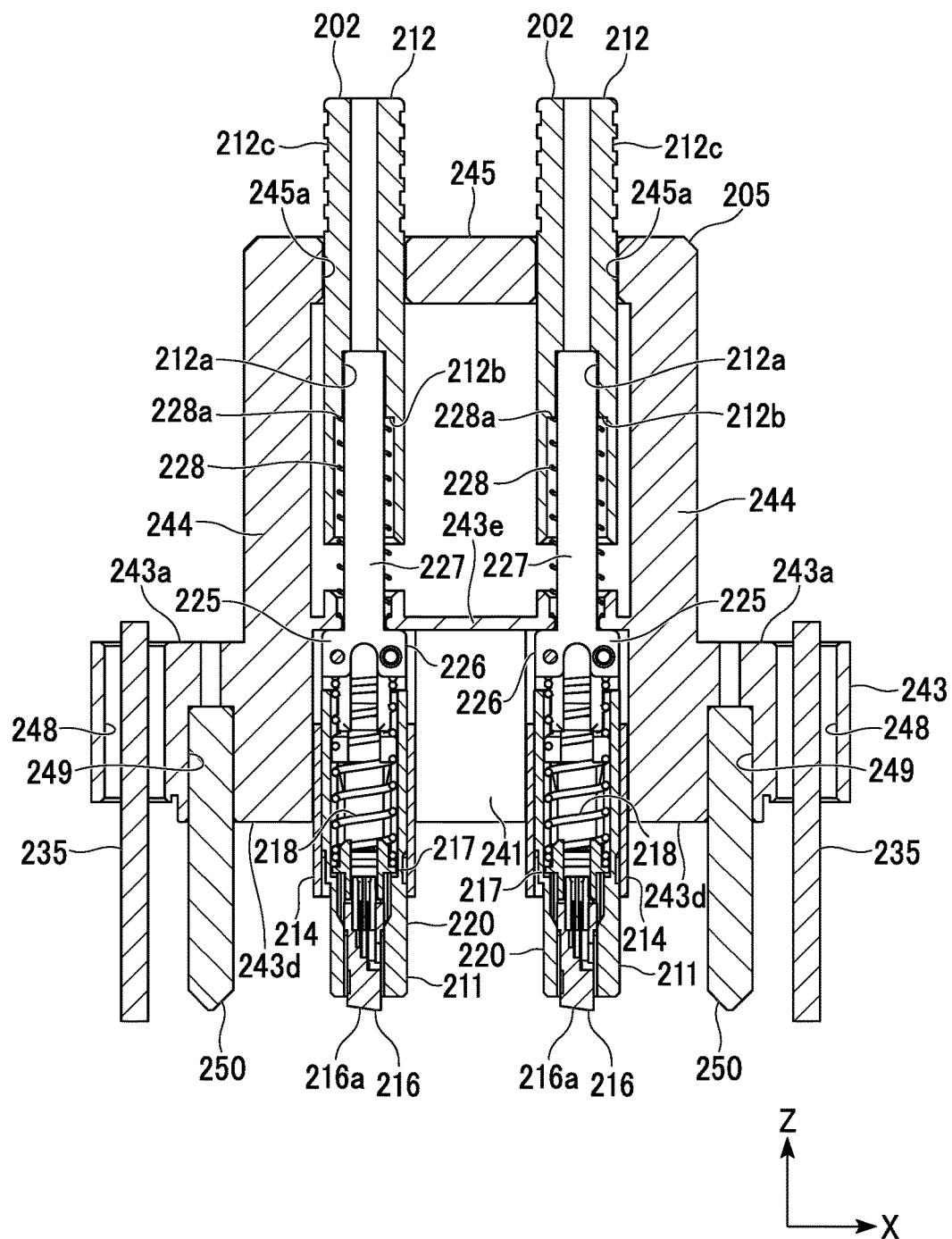
FIG. 15 is a cross-sectional view illustrating a movable holding body and the second optical connector.
Figure 16:
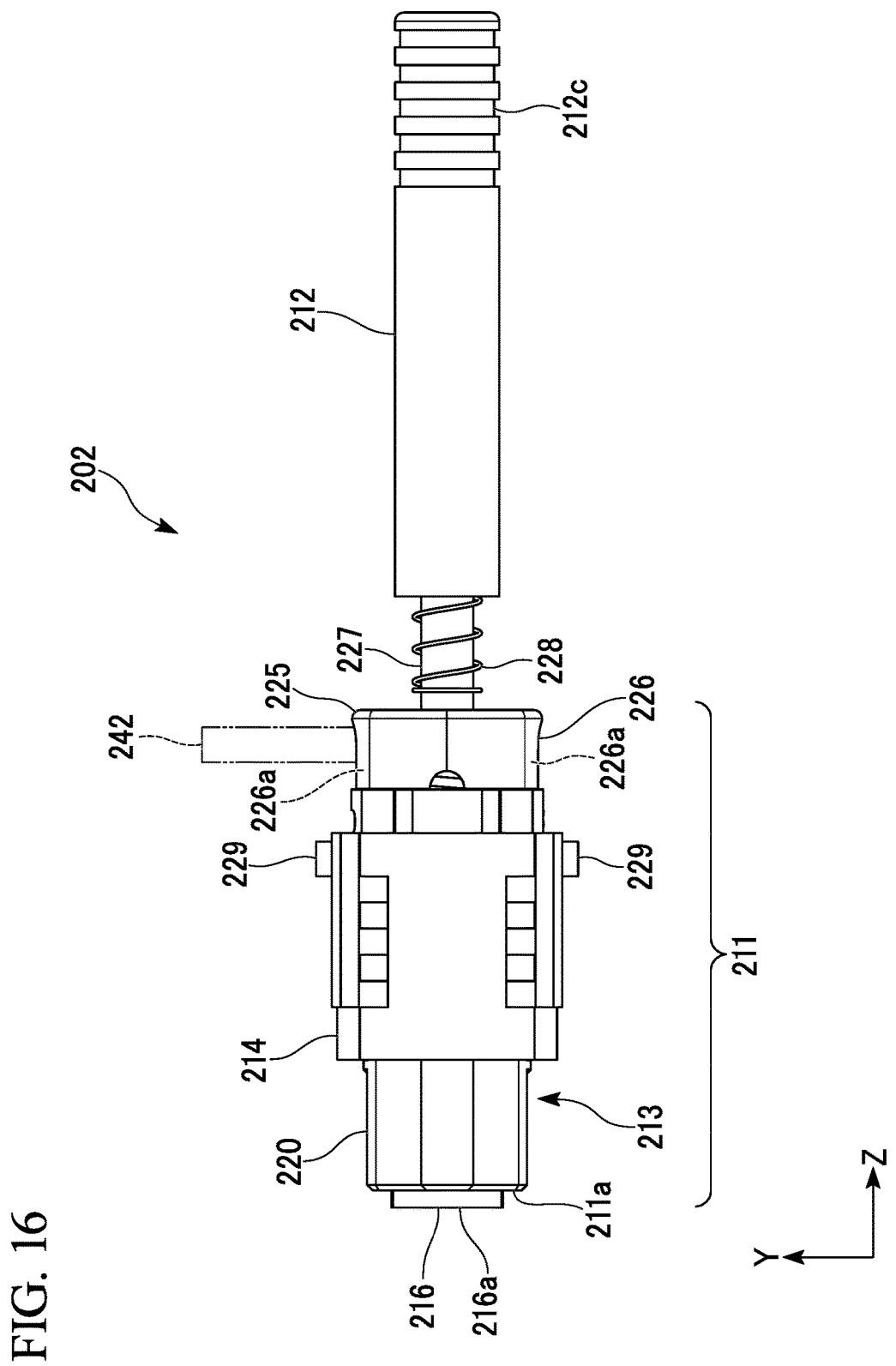
FIG. 16 is plan view illustrating an example of the second optical connector.
Figure 17:
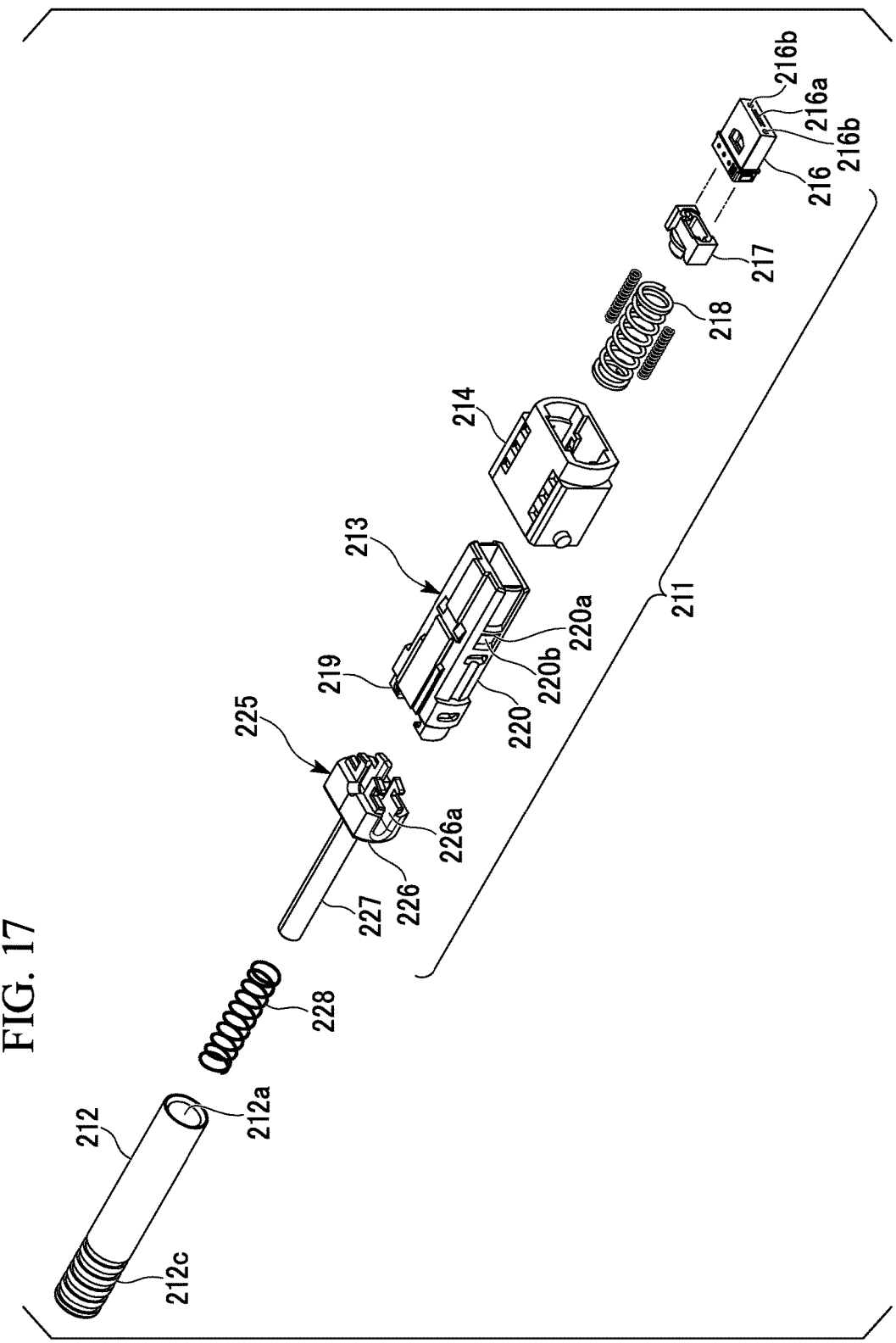
FIG. 17 is an exploded perspective view illustrating the second optical connector in FIG. 16.

As illustrated in FIGS. 15-17, the other end-side optical connector 202 has an optical connector main body 211 which is an optical connector plug and an operation portion 212 which extends from the optical connector main body 211, and movable in a direction of being inserted into and removed from with respect to the receptacle optical connectors 252.

The optical connector main body 211 includes a main connector portion 213 and a coupling 214 which is movable in the forward and rearward direction with respect to the main connector portion 213.

The optical connector main body 211 can adopt a structure of an MPO-type optical connector (F13-type optical connector pursuant to JIS C5982, MPO: Multi-fiber Push On).

As illustrated in FIGS. 16 and 17, the connector main portion 213 includes a ferrule 216 which is attached to a distal end of an optical fiber 242, a spring receiving portion 217 which is disposed on a rear side of the ferrule 216, a spring 218 (for example, a coil spring) which elastically biases the ferrule 216 forward, a contact member 219 with which a rear end of the spring 218 comes into contact, a cylindrical housing 220 which accommodates these members, and a rear member 225 provided at a rear portion of the housing 220.

For example, the ferrule 216 is a multicore connector such as an MT-type optical connector, and a front surface thereof is a joining end surface 216a. A guide pin hole 216b into which a guide pin (not shown) is inserted is formed in the ferrule 216.

The spring 218 can bias the ferrule 216 forward via the spring receiving portion 217 by receiving a reaction force from the contact member 219.

An engagement projection 220a is formed on an outer side surface of the housing 220. A rear side of the engagement projection 220a serves as an engagement recess 220b with which a latch convex portion 260a of a latch 260 of the receptacle optical connector 252 engages.

The rear member 225 includes a main body portion 226 including insertion concave portions 226a which opens at both lateral sides thereof, and an extension portion 227 extending rearward from the main body portion 226.

As illustrated in FIGS. 16 and 17, the insertion concave portion 226a can guide the optical fiber 242 (i.e., the relay optical fiber 204) in the main body portion 226 outward (i.e., the Y-direction).

The optical fiber 242 (i.e., the relay optical fiber 204) faces toward outside, and thereby, the relay optical fiber 204 can be wired toward the one end-side optical connector 201 with a relatively short path. Therefore, a wiring space of the relay optical fiber 204 inside the housing 203 can be reduced.

The optical fiber 242 (i.e., the relay optical fiber 204) can be guided outward through any two of the insertion concave portions 226a.

The main body portion 226 is attached to the rear end portion of the housing 220 by concavo-convex fitting and the like.

The spring 228 is outwardly fitted to the extension portion 227. The extension portion 227 and the spring 228 outwardly fitted thereto are inserted to an insertion hole 212a of the operation portion 212.

The spring 228 can bias the other end-side optical connector 202 rearward by receiving a reaction force from the upper surface 243a of the base portion 243 of the movable holding body 205 (see FIG. 15).

The coupling 214 is slidable forward and rearward with respect to the housing 220. If the coupling slides rearward, the latch 260 of the receptacle optical connector 252 can disengage from the housing 220.

An engagement convex portion 229 which can engage with inner edges of the engagement concave portions 246, 247 of the movable holding body 205 is formed on both lateral surfaces of the coupling 214.

The optical fiber 242 is not particularly limited. However, for example, the optical fiber 242 can employ multicore optical fibers such as optical fiber ribbons having four cores, eight cores, or twelve cores. As the optical fiber 242, a plurality of stacked optical fiber ribbons may be used.

The optical connector main body 211 does not protrude from the housing 203 at least when located at the rearmost position and protrudes forward from the front surface 203a of the housing 203 through the insertion port 238. In this manner, it is preferable to configure the optical connector main body 211 so that the optical connector main body 211 can be removably attached and connected to the receptacle optical connector 252.

The optical connector main body 211 adopts a structure in which a movement in the longitudinal direction enables the optical connector main body 211 to appear and disappear from the front surface (i.e., other surface) 103a of the housing 203.

In a state where the other end-side optical connector 202 is not fitted to the receptacle optical connector 252 and does not operate the operation portion 212, the other end-side optical connector 202 is positioned rearward by the spring 228 and in this position, is preferably not to protrude from an outer surface of the housing 203.

Therefore, it is possible to avoid the optical connector main body 211 being damaged when an operation is performed in order to attach or detach the relay optical connection unit 210 to or from the counterpart substrate 251.

The optical connector main body 211 may adopt a structure in which a distal end portion does not protrude from the housing 203 during all processes. In this case, fitting to the receptacle optical connector 252 is performed inside the housing 203.

As illustrated in FIG. 17, the operation portion 212 and the optical connector main body 211 are separate bodies, and the operation portion 212 is formed cylindrically.

As illustrated in FIG. 15, a distal end 228a of a spring 228 can be engaged with a step portion 212b formed at an inner surface of the insertion hole 212a.

The operation portion 212 is gripped and operated by a worker, thereby enabling the optical connector main body 211 to move forward and rearward.

Concave and convex portions 212c for a non-slip operation are formed on an outer peripheral surface of a distal end portion of the operation portion 212. This can facilitate work when a worker operates the other end-side optical connector 202 by gripping the operation portion 212. For example, the concave and convex portions 212c as illustrated are configured to have a plurality of annular concave portions and a plurality of annular convex portions along a circumferential direction.

The operation portion 212 protrudes outward from the rear surface (one surface) 203b through an insertion hole 234c (see FIG. 13A) formed on the upper plate 234 of the housing 203.

As illustrated in FIGS. 13A and 13B, in this example, there are two other end-side optical connectors 202, and each of them is referred to as the other end-side optical connector 202A and the other end-side optical connector 202B.

The two other end-side optical connectors 202 (202A, 202B) are arranged away from each other in the X-direction.

The number of the other end-side optical connectors 202 is not limited to two, and may be three or more.

Figure 14B:
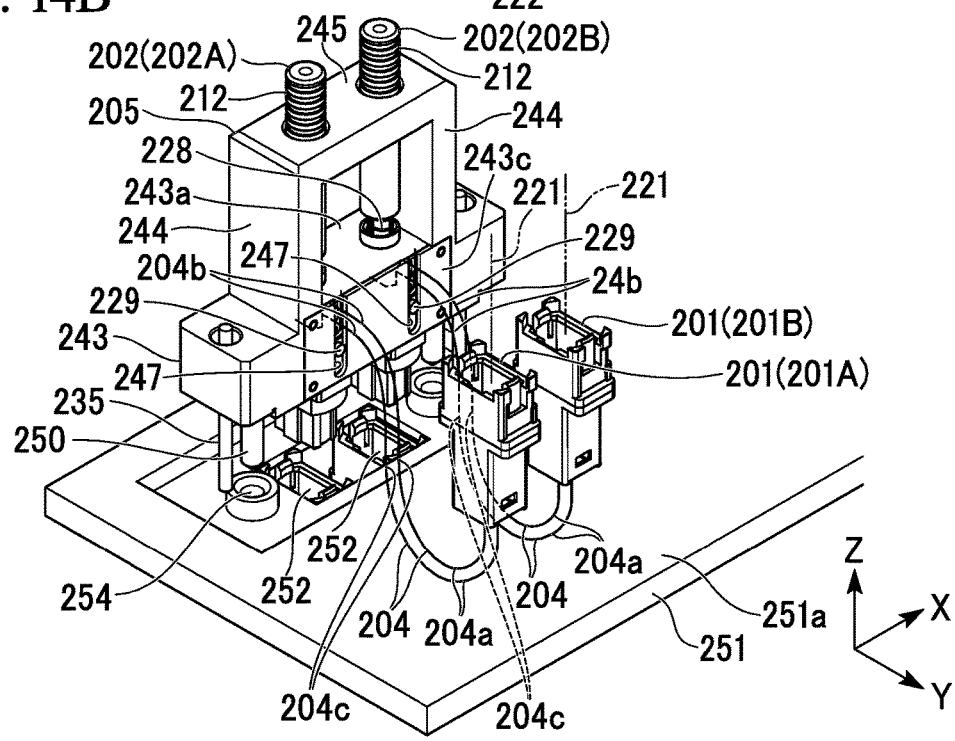
FIG. 14B is a perspective view in a direction different from that in FIG. 14A, which illustrates the internal structure of the relay optical connection unit.

As illustrated in FIGS. 14A and 14B, the movable holding body 205 includes a base portion 243, a pair of side wall portions 244 erected on an upper surface (a rear surface) 243a of the base portion 243, and an upper wall portion 245 provided on end portions of the side wall portions 244.

The base portion 243 has a rectangular parallelepiped shape, and is arranged such that a longitudinal direction thereof is along the X-direction.

In the inner space 241 surrounded by an upper plate 243e of the base portion 243 and side plate portions 243b, 243c which are suspended from both lateral edges of the upper plate 243e, an upper portion of the optical connector main body 211 of the other end-side optical connectors 202 (202A, 202B) is accommodated.

Since the optical connector main body 211 inside the inner space 241 is biased upward by the spring 228, the rear member 225 is positioned inside the inner space 241 in a state where the rear member 225 is pressed toward the upper plate 243e.

In one side plate portion 243b of the base portion 243, an oval-shape fitting concave portions 246 extending in a height direction (i.e., the Z-direction) are formed. In the other side plate portion 243c, a fitting concave portions 247 extending in the height direction (i.e., the Z-direction) are formed.

Dimensions of the engagement concave portions 246, 247 in a height direction are larger than dimensions of the engagement convex portion 229 of the coupling 214 in the forward and rearward direction. This enables the other end-side optical connector 202 to relatively move forward and rearward with respect to the movable holding body 205 in a state where the engagement convex portion 229 enters the engagement concave portions 246, 247.

As illustrated in FIG. 15, at each of both end portions of the base portion 243, positioning holes 248 are formed. The positioning holes 248 are formed so as to penetrate the base portion 243 along the height direction (i.e., the Z-direction).

In the positioning hole 248, the positioning bar 235 formed inside the housing 203 and along the height direction of the housing 203 can be inserted.

In the base portion 243, the fitting holes 249, 249 are formed slightly inward from the respective positioning holes 248, 248. A pair of the fitting holes 249, 249 is disposed away from each other in the X-direction.

Base end portions of guide bars (movable holding body positioning portions) 250 which position the movable holding body 205 with respect to the counterpart substrate 251 are fitted to the fitting holes 249, 249. The guide bar 250 protrudes downward (forward) from a lower surface 243d of the base portion 243.

As illustrated in FIGS. 14A and 14B, the guide bar 250 is inserted to the guide hole 254 formed at the counterpart substrate 251, and thereby, a lateral movement of the movable holding body 205 can be regulated.

The positioning bar 235 is vertically arranged with respect to the bottom plate 231 and fixed to the housing 203.

The movable holding body 205 is movable in directions close to and away from the receptacle optical connectors 252 while collectively holding two other end-side optical connectors 202 (202A, 202B), and is movable in a direction of being inserted into and removed from the receptacle optical connectors (i.e., the upward and downward direction).

The pair of side wall portions 244 is formed away from each other in the X-direction.

At upper wall portion 245, through holes 245a to which the operation portions 212 are inserted are formed (see FIG. 15).

As illustrated in FIGS. 14A and 14B, the one end-side optical connector 201 is for example, an optical connector receptacle, an optical connector adaptor, and the like.

The one end-side optical connector 201 as an illustrated example is the optical connector receptacle. A pair of latches 260 is formed in a cylindrical main body portion 259 having an insertion port 258 into which an optical connector (for example, MPO-type optical connector, not shown) of one end-side optical path 221 is inserted. A latch convex portion 260a protruding inward is formed on an inner surface of a distal end portion of the latch 260.

The one end-side optical connectors 201 are provided on the upper plate 234 such that the insertion port 258 opens outward (upward).

In this example, there are two one end-side optical connectors 201, and each of them is referred to as the one end-side optical connector 201A and the one end-side optical connector 201B.

The two one-end-side optical connectors 201 (201A, 201B) are arranged away from each other in the X-direction.

The number of the one end-side optical connectors 201 is not limited to two, and may be three or more.

In this example, the one end-side optical connectors 201 are located away from the other end-side optical connectors 202 and the movable holding body 205 in the Y-direction.

Two one-end-side optical connectors 201 (201A, 201B) are located away from each other in the X-direction, and two other-end-side optical connectors 202 (202A, 202B) are also located away from each other in the X-direction.

Therefore, the positions of the one end-side optical connectors 201 and the positions of the other end-side optical connectors 202 are different from each other in any combinations in plan view.

Therefore, it is possible to ensure a sufficient space for wiring of the relay optical fiber 204 around the respective optical connectors 201 and 202. Accordingly, even if the height dimension of the housing 203 is small, an excessive force is not applied to the relay optical fiber 204. Thus, it is possible to miniaturize the relay optical connection unit 210.

The relay optical fiber 204 is for example, an optical fiber wire or an optical fiber ribbon.

In the relay optical fiber 204, one terminal is provided at at least one of the plurality of one end-side optical connectors 201, and the other terminal is provided at at least one of the plurality of the other end-side optical connectors 202. Accordingly, one end-side optical connectors 201 and the other end-side optical connectors 202 are optically connected to each other inside the housing 203.

Depending on an intended use, the relay optical fiber 204 can connect any desired one end-side optical connector 201 and any desired other end-side optical connector 202 to each other.

For example, one or two of two one-end-side optical connectors 201 can be connected to one or two of two other end-side optical connectors 202 via the relay optical fiber 204.

In FIG. 12A, two of the one end-side optical connectors 201 are both connected to the two other end-side optical connectors 202 via the relay optical fiber 204.

As illustrated in FIGS. 12B and 14B, since the other end-side optical connector 202 is movable with respect to the receptacle optical connector 252, the relay optical fiber 204 is preferably wired in approximately S-shape.

Specifically, the relay optical fiber 204 preferably has an S-shape including one end-side curve portion 204a which is a portion between a position connected to the one end-side optical connector 201 and an intermediate point (inflection point) 204c and the other end-side curve portion 204b which is a portion between the intermediate point 204c and a position connected to the other end-side optical connectors 202.

The one end-side curve portion 204a is curved so as to convex forward (i.e., in a downward direction in FIG. 14B), and the other end-side curve portion 204b is curved so as to convex in a direction which is different from a convex direction of the one end-side curve portion 204a. The curve portions 204a, 204b have appropriately arc-like shape, and curvature thereof is set so as not to affect optical characteristics of the relay optical fiber 204.

The relay optical fiber 204 is wired in an S-shape including the curve portions 204a and 204b, and the curve portions 204a and 204b provide sufficient extra lengths. Therefore, even when the other end-side optical connectors 202 moves in the forward and rearward direction, the addition of local bending to the relay optical fiber 204 can be avoided.

The relay optical fiber 204 is wired through the engagement concave portion 247 of a base portion 243.

As illustrated in FIG. 14A, the receptacle optical connector 252 is for example, an optical connector receptacle, an optical connector adaptor, and the like.

The receptacle optical connector 252 in the illustrated example is the optical connector receptacle. A pair of latches 260 is formed in a cylindrical main body portion 259 having an insertion port 258 into which an optical connector main body 211 of the other end-side optical connector 202 is inserted. A latch convex portion 260a protruding inward is formed on an inner surface of a distal end portion of the latch 260.

The receptacle optical connector 252 is disposed at a position corresponding to the other end-side optical connector 202. In the illustrated example, two receptacle optical connectors 252 (252A, 252B) arranged in the X-direction are disposed on the positions where the other end-side optical connector 202 (202A, 202B) is fittable.

Next, a usage method of the relay optical connection unit 210 will be described with reference to FIGS. 18A to 20C.
(First Stage)

As illustrated in FIG. 18A, the relay optical connection unit 210 is moved downward (forward), and is installed on the installation surface 251a of the counterpart substrate 251.

At this time, as illustrated in FIGS. 13B and 14A, the fitting concave portion 203c of the housing 203 is fitted to the fitting convex portion 253 of the counterpart substrate 251. This regulates a movement (i.e., a lateral movement) of the relay optical connection unit 210 in the direction along the counterpart substrate 251 (for example, the rightward-leftward direction and the vertical direction to the paper surface in FIG. 18A), and the relay optical connection unit 210 is roughly positioned with respect to the counterpart substrate 251.

By fitting the fitting concave portion 203c to the fitting convex portion 253, the relay optical connection unit 210 is positioned and this is referred to as "a first positioning".

By positioning the first position, the housing 203 is positioned. Thereby, the movable holding body 205 can be placed in a position where the movable holding body 205 can be positioned by the guide bar 250.
(Second Stage)

As illustrated in FIG. 18B, the movable holding body 205 is moved downward to the counterpart substrate 251 (i.e., the receptacle optical connector 252).

At this time, as illustrated in FIGS. 14A and 14B, the guide bar 250 protruding from the movable holding body 205 is inserted to the guide hole 254 of the counterpart substrate 251. Thereby, a lateral movement of the movable holding body 205 and the other end-side optical connector 202 is regulated, and a standing posture of the movable holding body 205 is maintained.

Since the lateral movement of the other end-side optical connector 202 is regulated, the other end-side optical connectors 202 can be arranged at a position where each of the other end-side optical connectors 202 can be fitted to the corresponding receptacle optical connector 252.

By inserting the guide bar 250 to the guide hole 254, the movable holding body 205 and the other end-side optical connector 202 are positioned and this is referred to as "a second positioning".

Since at the movable holding body 205, the plurality of the other end-side optical connectors 202 (202A, 202B) is collectively held, the other end-side optical connectors 202A, 202B also moves downward with the downward movement of the movable holding body 205.

In detail, by moving the movable holding body 205 downward, inner edges of the fitting concave portions 246, 247 of the base portion 243 press the engagement convex portion 229 downward, and an upper surface 243e of the base portion 243 (see FIG. 15) presses the optical connector main body 211 downward. Thereby, the other end-side optical connector 202 moves downward.

The movable holding body 205 moves downward until the other end-side optical connectors 202 (202A, 202B) reach the receptacle optical connectors 252.

In addition, since the positioning bars 235 (the guide portions) formed in the housing 203 are inserted to the positioning hole 248 (see FIG. 15), a lateral movement of the movable holding body 205 is regulated.

Therefore, the other end-side optical connectors 202 are guided to the receptacle optical connector 252 without displacing positions in a plane view.

The other end-side optical connector 202 which contacts with the receptacle optical connector 252 prevents from moving further downward, and a lateral movement thereof is reduced. That is, the movement of the other end-side optical connector 202 is regulated by the receptacle optical connector 252.

Third Stage

As illustrated in FIG. 20A, by moving the other end-side optical connector 202 downward, the distal end portion 211a of the optical connector main body 211 of the other end-side optical connector 202 is inserted into the entrance portion 258a of the insertion port 258 of the receptacle optical connector 252.

At this time, if necessary, the operation portion 212 is gripped to move the optical connector main body 211 forward, and thereby, the distal end portion 211a thereof can be inserted to the entrance portion 258a of the insertion port 258.

When moving the other end-side optical connector 202 forward, all of the other end-side optical connectors 202 may be operated collectively; however, only a part of the other end-side optical connectors 202 may be operated.

In this position, the distal end portion 211a is arranged in the entrance portion 258a of the insertion port 258. Accordingly, a lateral movement of the optical connector main body 211 is regulated. Therefore, a planar view position of the optical connector main body 211 is determined with respect to the receptacle optical connector 252.

The positioning of the optical connector main body 211 with respect to the receptacle optical connector 252 is referred to as "a third positioning".

Fourth Stage

Figure 19A:
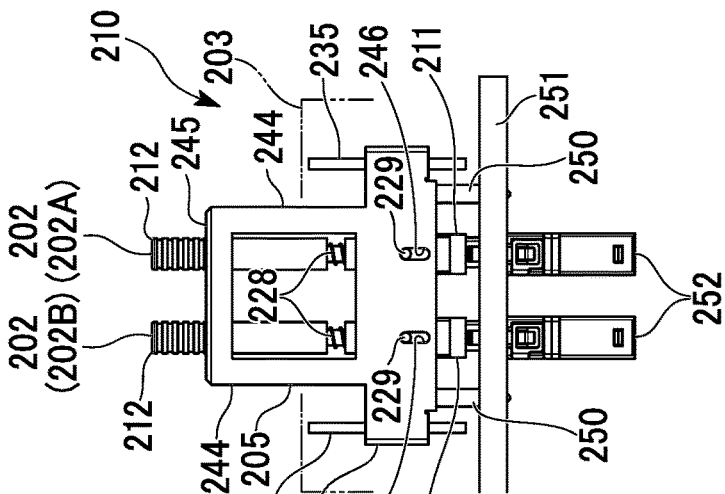
FIG. 19A is a process diagram illustrating a process where the second optical connector is fitted to the receptacle optical connector.

Here, as illustrated in FIGS. 18C and 19A, the other end-side optical connector 202 is pressed downward (forward), and the distal end portion 211a of the optical connector main body 211 is deeply inserted into the insertion port 258 of the receptacle optical connector 252.

As illustrated in FIGS. 14A and 14B, the engagement convex portion 229 of the other end-side optical connector 202 is movable upward and downward with respect to the movable holding body 205 while being inserted to the fitting concave portions 246, 247. Therefore, even if a height position of the movable holding body 205 does not change, the other end-side optical connectors 202 can move forward.

In this example, two other-end-side optical connectors 202 moves forward one by one. That is, in FIG. 18C, only the other end-side optical connector 202A moves forward among two other-end-side optical connectors 202, and then in FIG. 19A, the other end-side optical connector 202B moves forward.

In the example illustrated in FIGS. 18C and 19A, when the other end-side optical connectors 202 move forward, the other end-side optical connectors 202 are operated one by one. However, by moving the movable holding body 205 downward, all the other end-side optical connectors 202 can be operated collectively.

For example, starting with non-fitting state as illustrated in FIG. 20A, after inserting the distal end portion 211a of the optical connector main body 211 into the entrance portion of the insertion port 258 of the receptacle optical connector 252 by moving the movable holding body 205 downward as illustrated in FIG. 20B, the movable holding body 205 moves further downward as illustrated in FIG. 20C.

Thereby, all the other end-side optical connectors 202 can be deeply inserted into the insertion port 258 collectively.

As illustrated in FIG. 21B, the forward movement of the optical connector main body 211 causes the engagement projection 220a of the housing 220 to displace the latch 260 outward (i.e., in a direction in which a distance between the latches 260 increases). The displaced latch 260 regulates the forward movement of the coupling 214.

As illustrated in FIG. 21C, whereas the forward movement of the coupling 214 is regulated, the housing 220 is moved forward. Accordingly, the engagement recess 220b is exposed, the latch 260 is displaced inward, and the latch convex portion 260a engages with the engagement recess 220b.

The inward displacement of the latch 260 releases the regulation of the forward movement of the coupling 214. Accordingly, the coupling 214 is moved forward by an elastic force of a spring (not shown) inside the coupling 214. FIG. 21C illustrates a state where the other end-side optical connector 202 is completely fitted to the receptacle optical connector 252.

At this position, the joining end surface 216a of the ferrule 216 is caused to abut onto a connection end surface 261a inside the receptacle optical connector 252, and a pair of guide pins 261b formed on the connection end surface 261a are respectively inserted into the guide pin hole 216b of the ferrule 216. This causes the ferrule 216 to be very accurately positioned with respect to the receptacle optical connector 252.

The positioning of the other end-side optical connector 202 with respect to the receptacle optical connector 252 is referred to as "a fourth positioning".

The respective other end-side optical connectors 202 can be mutually and independently operated. Accordingly, only one that is required out of the plurality of other end-side optical connectors 202 can be fitted to the receptacle optical connector 252.

(Detachment of Other-End Optical Connector 202 from Receptacle Optical Connector 252)

The other end-side optical connector 202 can be detached from the receptacle optical connector 252 as follows.

Figure 19B:
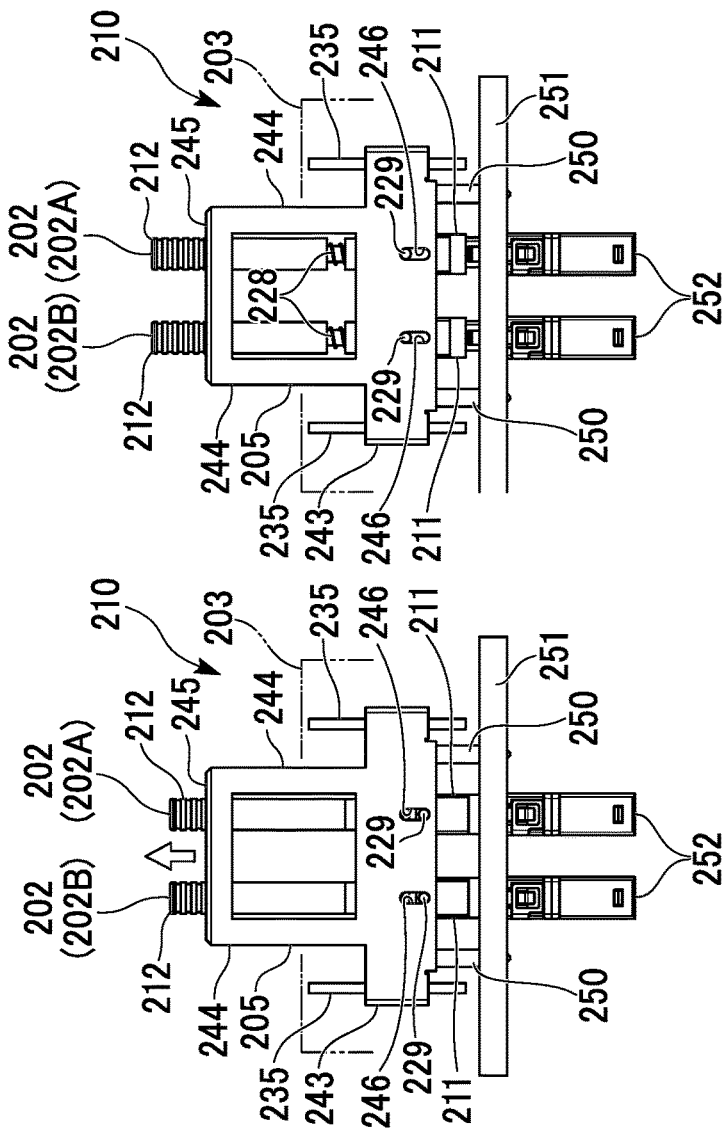
FIG. 19B is a process diagram illustrating a process where the second optical connector is fitted to the receptacle optical connector.

As illustrated in FIG. 19B, if the movable holding body 205 is lifted up, front edges of the engagement concave portions 246 and 247 apply an upward acting force to the engagement convex portion 229 of the coupling 214. In this manner, the coupling 214 of the other end-side optical connector 202 is moved upward.

As illustrated in FIG. 21B, the upward movement of the coupling 214 causes the engagement recess 220b of the housing 220 to be exposed, and brings the latch 260 into an outward displaceable state.

If the coupling 14 is further moved rearward, the engagement projection 220a displaces the latch 260 outward. In this manner, the latch convex portion 260a is disengaged from the engagement recess 220b.

If the operation portion 212 is further pulled upward, the other end-side optical connector 202 is pulled out from the receptacle optical connector 252.

Figure 19C:
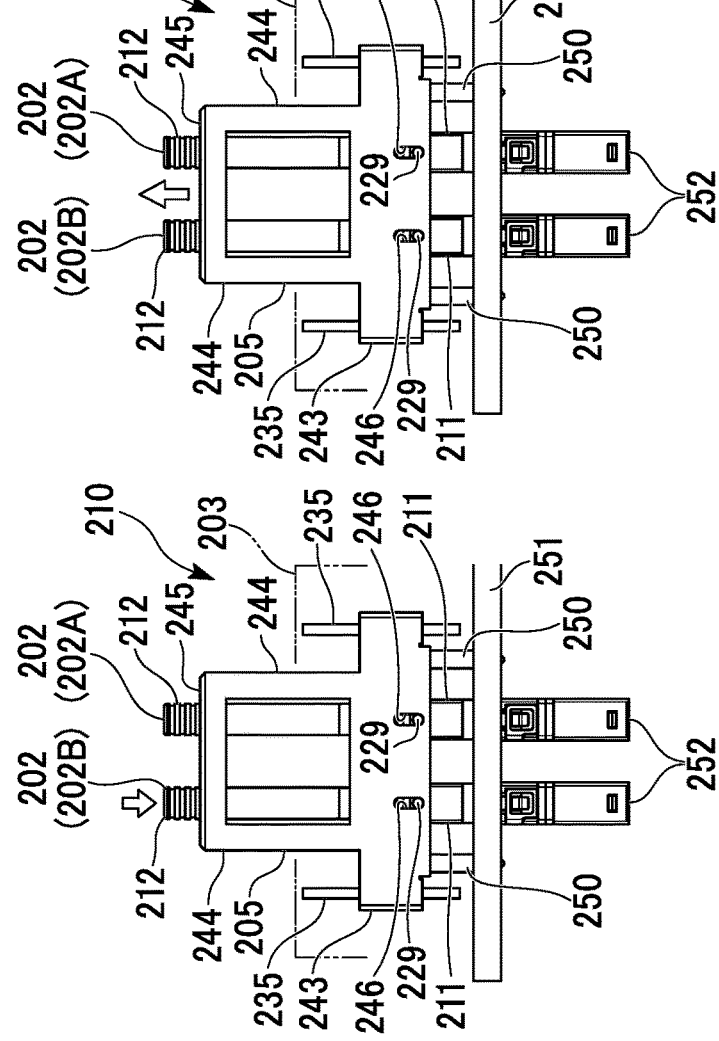
FIG. 19C is a process diagram illustrating a process where the second optical connector is fitted to the receptacle optical connector.

As illustrated in FIG. 19C, restraint from the receptacle optical connector 252 is released, and thereby, the other end-side optical connector 202 is in a state capable of moving upward and downward. Therefore, the other end-side optical connector 202 moves upward by biasing force of the spring 228, and as illustrated in FIG. 18A, the optical connector main body 211 returns to a state being accommodated in the housing 203.

The relay optical connection unit 210 has a structure that in the housing 203, the one end-side optical connector 201 and the other end-side optical connector 202 are connected by the relay optical fiber 204.

Therefore, if there is provided in advance the relay optical connection unit 210 in which optical connectors 201, 202 selected for an intended use are connected to each other, even when complicated optical wiring is needed, it is possible to build the optical wiring which is most suitable to the intended use by an easy operation of installing the relay optical connection unit 210 on the counterpart substrate 251.

Accordingly, it is possible to easily and reliably build the complicated optical wiring using many optical fibers.

In addition, the relay optical connection unit 210 includes the movable holding body 205 which collectively holds the plurality of the other end-side optical connectors 202. Accordingly, a simple operation enables the plurality of the other end-side optical connectors 202 to be collectively inserted into and removed from the receptacle optical connectors 252.

In the relay optical connection unit 210, installation work goes through four stages of positioning. Accordingly, it is possible to reliably and accurately fit the other end-side optical connectors 202 to the receptacle optical connectors 252.

That is, after a position of a housing 203 is roughly determined on the counterpart substrate 251 by fitting a fitting concave portion 203c to a fitting convex portion 253 in the first stage, a position of a movable holding body 205 is determined by a guide bar 250 in the second stage. A position of the other end-side optical connector 202 is determined with respect to the receptacle optical connector 252 in the third stage. Subsequently, in the fourth stage, the other end-side optical connector 202 is operated, thereby going through a process completely and finally determining the position of the other end-side optical connector 202. In this manner, it is possible to guide the other end-side optical connector 202 to the receptacle optical connector 252.

According to this configuration, even when the position of the other end-side optical connector 202 is deviated, the deviation is reliably corrected and the other end-side optical connector 202 is guided to a correct position. In this manner, it is possible to reliably and accurately fit the other end-side optical connector 202 to the receptacle optical connector 252.

Therefore, it is possible to build a highly reliable optical wiring.

Figure 22:
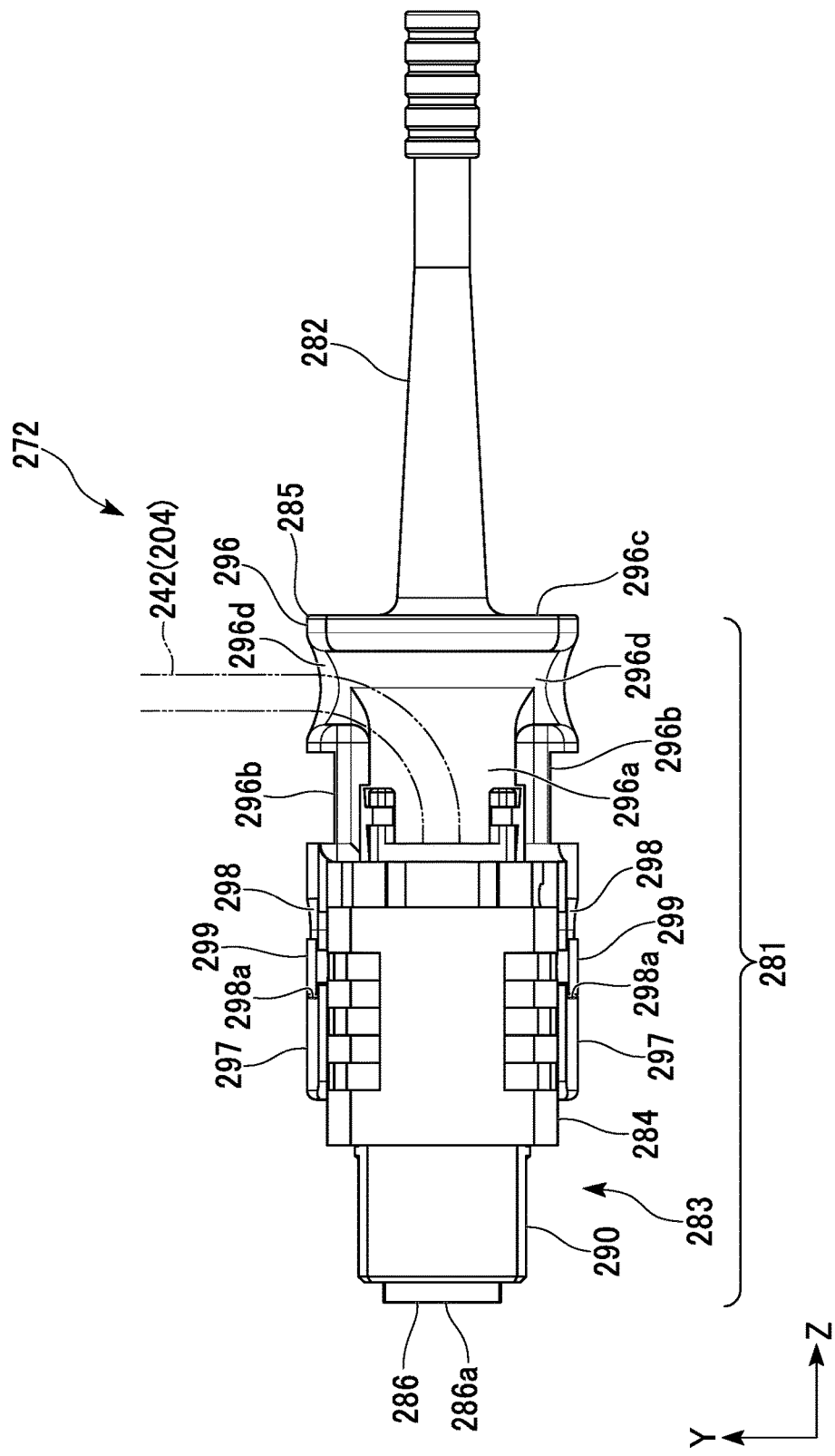
FIG. 22 is plan view illustrating another example of the second optical connector.
Figure 23:
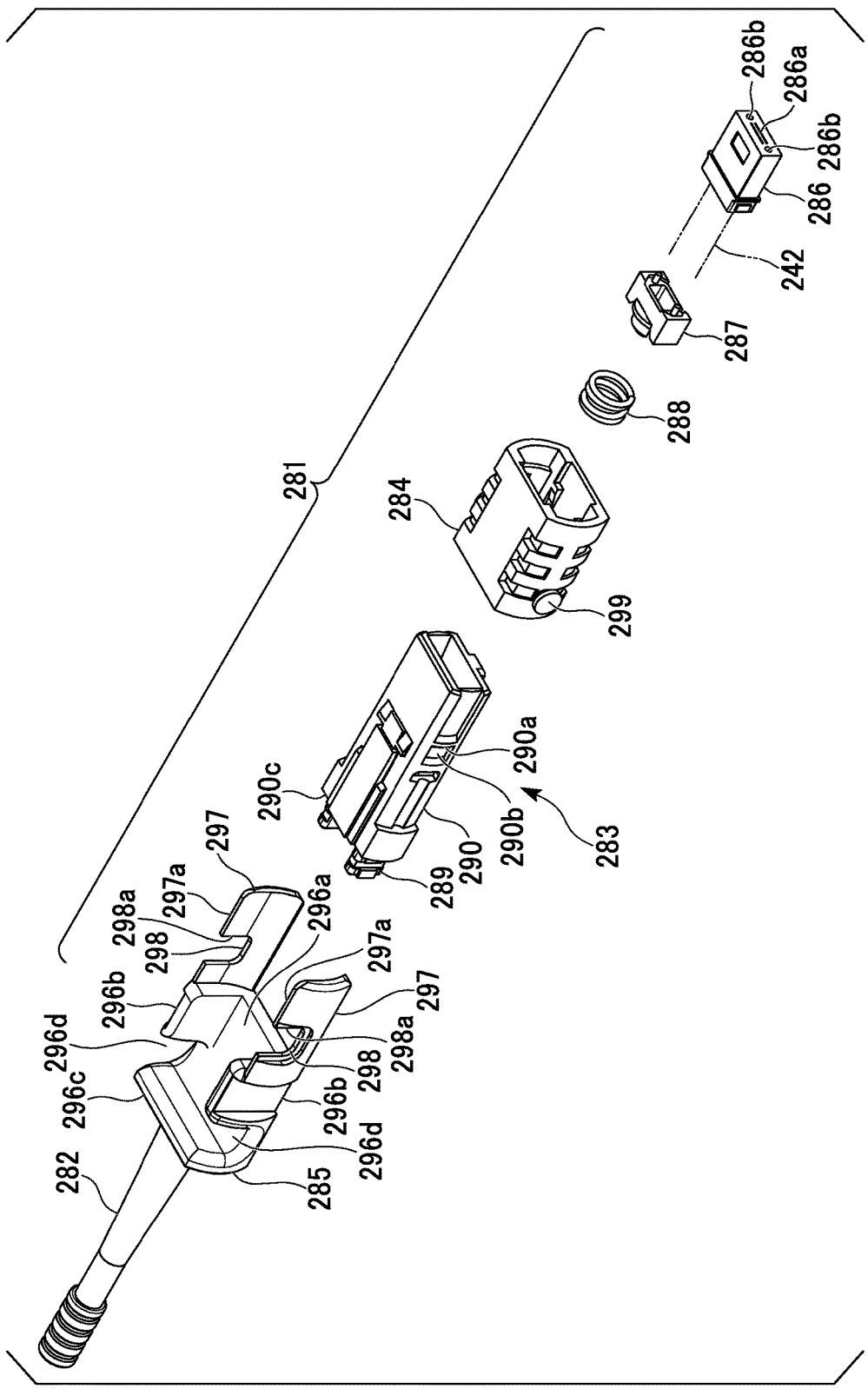
FIG. 23 is an exploded perspective view illustrating the second optical connector in FIG. 22.

FIGS. 22 and 23 show the other end-side optical connector 272 which is another example of the other end-side optical connector. The other end-side optical connector 272 can be used instead of the other end-side optical connector 202.

The other end-side optical connector 272 includes the optical connector main body 281 which is an optical connector plug and an operation portion 282 extending from the optical connector main body 281, and movable in directions close to and away from the receptacle optical connector 252.

The optical connector main body 281 includes a connector main portion 283, a coupling 284 which can move forward and rearward with respect to the connector main portion 283, and a coupling engagement member 285 which is disposed in the rear of the connector main portion 283.

The optical connector main body 281 can adopt a structure of an MPO-type optical connector (F13-type optical connector pursuant to JIS C5982, MPO: Multi-fiber Push On).

The connector main portion 283 includes a ferrule 286 which is attached to a distal end of an optical fiber 242, a spring receiving portion 287 which is disposed on a rear side of the ferrule 286, a spring 18 (for example, a coil spring) which elastically biases the ferrule 16 forward, a contact member 19 with which a rear end of the spring 18 comes into contact, and a cylindrical housing 20 which accommodates these.

For example, the ferrule 286 is a multicore connector such as an MT-type optical connector, and a front surface thereof is a joining end surface 286a. A guide pin hole 286b into which a guide pin (not shown) is inserted is formed in the ferrule 286.

The spring 288 can bias the ferrule 286 forward via the spring receiving portion 287 by receiving a reaction force from the contact member 289.

An engagement projection 290a is formed on an outer side surface of the housing 290. A rear side of the engagement projection 290a serves as an engagement recess 290b with which a latch convex portion 260a of a latch 260 of the receptacle optical connector 252 (to be described later) engages.

The coupling 284 is slidable forward and rearward with respect to the housing 290. If the coupling slides rearward, the latch 260 of the receptacle optical connector 252 can disengage from the housing 290.

An engagement convex portion 299 which can engage with an inner edge of an engagement concave portion 298 is formed on both lateral surfaces of the coupling 284.

The coupling engagement member 285 includes a main body portion 296 and a pair of extension portions 297 extending forward from the main body portion 296. The coupling engagement member 285 is movable forward and rearward with respect to the connector main portion 283 and the coupling 284.

The main body portion 296 includes a bottom plate portion 296a, a lateral plate portion 296b disposed in both lateral edges thereof, and a rear plate portion 296c disposed in a rear edge of the bottom plate portion 296a.

As illustrated in FIG. 22, at each of both the lateral plates 296b, an insertion concave portion (an insertion portion) 296d is formed.

The insertion concave portion 296d can guide the optical fiber 242 (the relay optical fiber 204) in the main body portion 296 outward (i.e., the Y-direction).

The optical fiber 242 (the relay optical fiber 204) faces toward the outside, and thereby, the relay optical fiber 204 can be wired toward the one end-side optical connector 201 with a relatively short path. Therefore, a wiring space of the relay optical fiber 204 inside the housing 203 can be reduced.

The optical fiber 242 (i.e., the relay optical fiber 204) can be guided outward through any two of the insertion concave portions 296d.

The bottom plate portion 296a and the lateral plate portion 296b can press the housing 290 forward by coming into contact with a rear end portion 290c of the housing 290.

The extension portion 297 is formed in a long plate shape, and the engagement concave portion 298 is formed in one lateral edge portion 297a. Dimensions of the engagement concave portion 298 in the longitudinal direction are larger than dimensions of the engagement convex portion 299 of the coupling 284 in the longitudinal direction. This enables the coupling engagement member 285 to relatively move forward and rearward with respect to the coupling 284 in a state where the engagement convex portion 299 enters the engagement concave portion 298.

Next, with reference to FIGS. 21A to 23, it is described that an insertion and removal operation with respect to the receptacle optical connector 252 when the other end-side optical connector 272 is used. Note that the operation using the other end-side optical connector 202 which has been described with reference to FIGS. 18A to 20C is omitted.

First Stage

The relay optical connection unit 210 is installed on the installation surface 251a of the counterpart substrate 251. At this time, the fitting convex portion 205 is fitted to the fitting concave portion 253 of the counterpart substrate 251.

Second Stage

By moving the movable holding body 205 downward (forward) to the counterpart substrate 251 (i.e., the receptacle optical connector 252), the guide bar 250 is inserted into the guide hole 254 of the counterpart substrate 251 to position the movable holding body 205. Therefore, the other end-side optical connectors 272 can be arranged at a position where each of the other end-side optical connectors 202 can be fitted to the corresponding receptacle optical connector 252.

Third Stage

If the other end-side optical connector 272 moves further downward (forward), the distal end portion 281a of the optical connector main body 281 is inserted to the entrance portion of the insertion port 258 of the receptacle optical connector 252.

Fourth Stage

If the other end-side optical connector 272 is further pressed downward (forward), a pressing force thereof is transmitted to the coupling engagement member 285. Then, a front end of the main body portion 296 (for example, a front end of the bottom plate portion 296a and the lateral plate portion 296b) comes into contact with the rear end portion 290c of the housing 290, and presses the housing 290 forward.

Therefore, the optical connector main body 281 moves forward, the distal end portion 281a is deeply inserted into the optical connector 252.

The forward movement of the optical connector main body 281 causes the engagement projection 290a of the housing 290 to displace the latch 260 outward (i.e., a direction in which a distance between the latches 260 increases). The displaced latch 260 regulates the forward movement of the coupling 284.

Whereas the forward movement of the coupling 284 is regulated, the housing 290 is moved forward. Accordingly, the engagement recess 290b is exposed, the latch 260 is displaced inward, and the latch convex portion 260a engages with the engagement recess 290b.

The inward displacement of the latch 260 releases the regulation of the forward movement of the coupling 284. Accordingly, the coupling 284 is moved forward by an elastic force of a spring (not shown) inside the coupling 284.

Therefore, fitting of the receptacle optical connector 252 to the other end-side optical connector 272 is completed.

(Detachment of Other-End Optical Connector 202 from Receptacle Optical Connector 252)

If the operation portion 282 is gripped and pulled rearward, a tensile force is transmitted to the coupling engagement member 285. A front edge 298a of the engagement concave portion 298 formed in the extension portion 297 applies a rearward acting force to the engagement convex portion 299 of the coupling 284. In this manner, the coupling 284 is moved rearward.

The rearward movement of the coupling 284 causes the engagement recess 20b of the housing 20 to be exposed, and brings the latch 60 into an outward displaceable state.

If the coupling 284 is further moved rearward, a spring (not shown) inside the coupling 284 applies a rearward acting force to the optical connector main body 281. The optical connector main body 281 also starts to move rearward, and the engagement projection 290a displaces the latch 260 outward. In this manner, the latch convex portion 260a is disengaged from the engagement recess 290b.

If the operation portion 282 is further pulled rearward, the coupling engagement member 285 moves away from the housing 290, and the other end-side optical connector 202 is pulled out from the receptacle optical connector 252.

Hitherto, the present invention has been described in detail with reference to the exemplary embodiment. However, the present invention is not limited to the above-described exemplary embodiment. Various modifications can be added to the present invention within a scope not departing from the spirit of the present invention.

For example, the housing 203 in the illustrated example has a box shape. However, as long as a structure can protect the relay optical fiber and the like so as not to be affected by an external force, the shape of the housing 203 is not limited to the box shape. For example, the housing 303 may adopt a structure which is configured to have a bottom plate, an upper plate, and a columnar body for connecting both of these, and which can accommodate the relay optical fiber and the other end-side optical connector in a space formed between the bottom plate and the upper plate.

The number of the other end-side optical connectors is not limited to two, and may be any desired number of three or more. Even in this case, the movable holding body is movable while collectively holding at least two of the plurality of the other end-side optical connectors.

Third Exemplary Embodiment

Hereinafter, the present invention will be described with reference to preferred exemplary embodiments.

Figure 24:
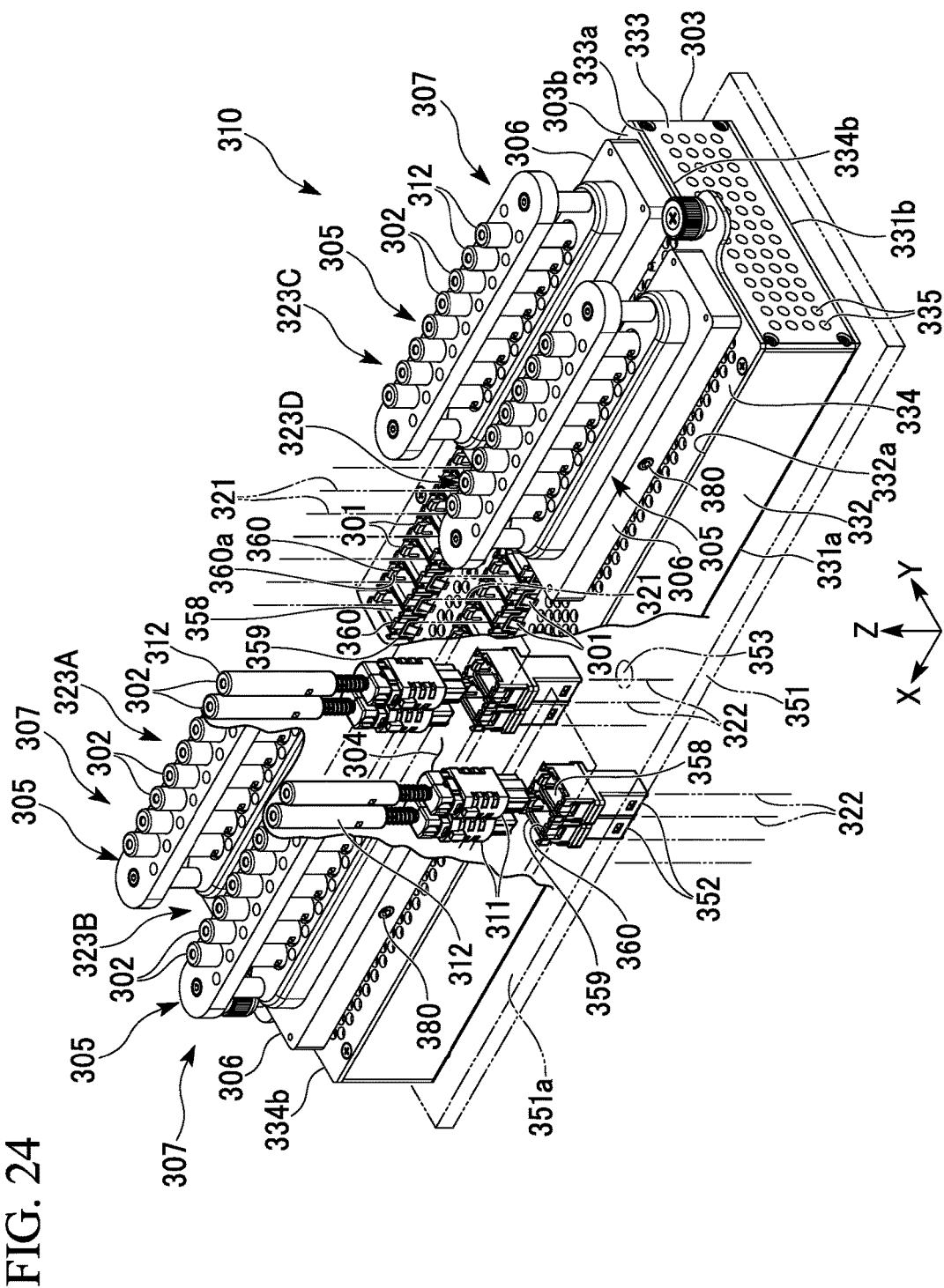
FIG. 24 is a perspective view when a relay optical connection unit according to an exemplary embodiment of the present invention is viewed from obliquely upward.
Figure 26:
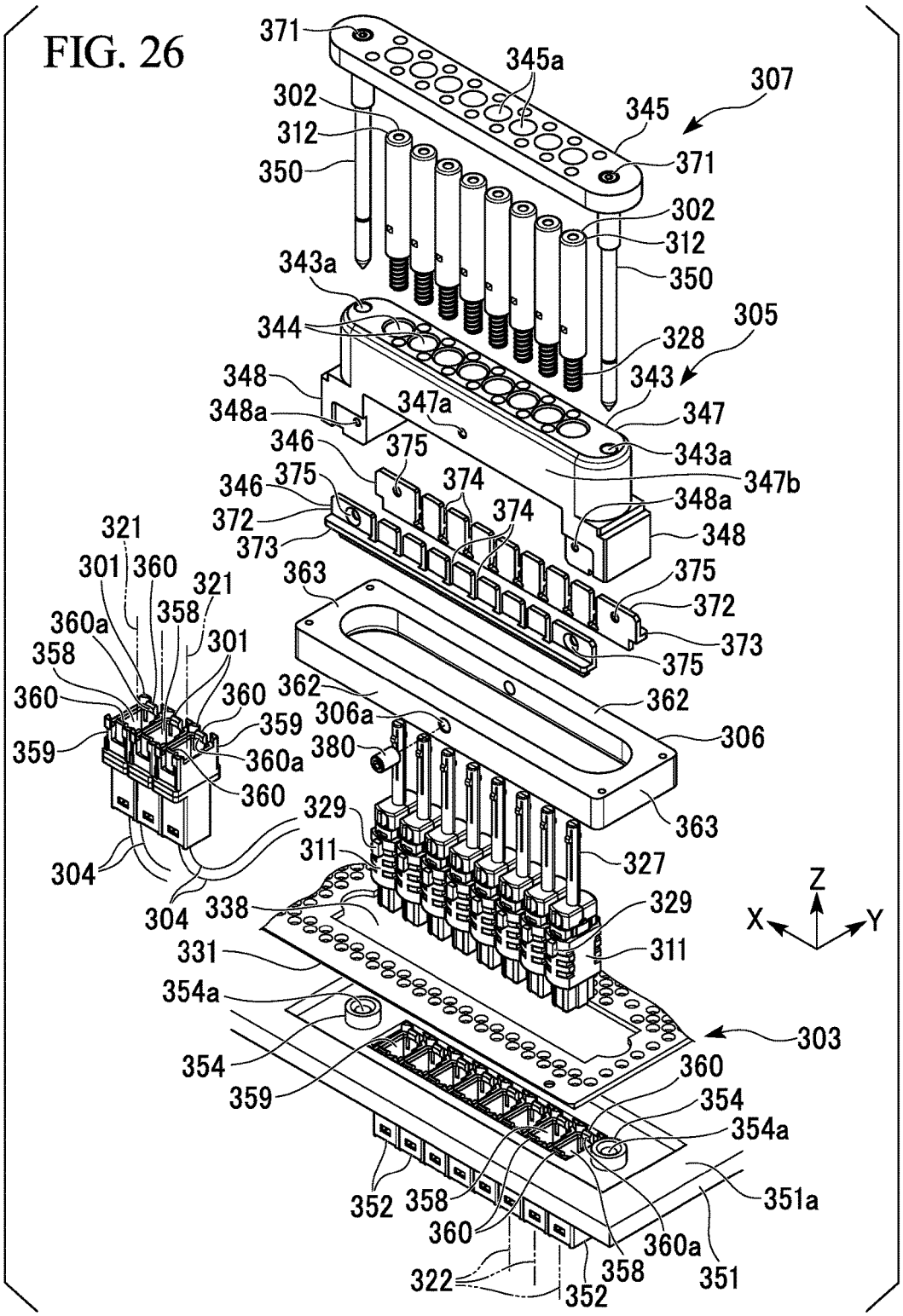
FIG. 26 is an exploded perspective view illustrating an internal structure of the relay optical connection unit in FIG. 24.

FIG. 24 is a perspective view when a relay optical connection unit 310 according to an exemplary embodiment of the present invention is viewed from obliquely upward. FIG. 26 is a perspective view when a relay optical connection unit 310 according to an exemplary embodiment of the present invention is viewed from obliquely downward.

Total Structure

As illustrated in FIGS. 24 and 26, the relay optical connection unit (optical connection box) 310 which is one exemplary embodiment of the present invention includes a plurality of one end-side optical connectors (first optical connectors) 301, a plurality of the other end-side optical connectors (second optical connectors) 302, a relay optical fiber 304 which optically connects these optical connectors 301 and 302, a movable holding body 305 that holds the other end-side optical connectors 302, a housing 303 where the above-described members are provided, and a shielding member 306 provided on the housing 303.

The relay optical connection unit 310 is provided between a plurality of one end-side optical paths (first optical paths) 321 and a plurality of the other end-side optical paths (second optical paths) 322, and performs relay connection therebetween.

Hereinafter, a structure may be described with reference to an XYZ orthogonal coordinate system illustrated in FIG. 24 and the like. An X-direction represents a longitudinal direction of the bottom plate 331 of the housing 303 (see FIG. 25). A Y-direction represents a direction orthogonal to the X-direction within a plane parallel to the bottom plate 331. A Z-direction represents a height direction which is orthogonal to the X-direction and Y-direction.

Hereinafter, a direction in which the other end-side optical connector 302 moves close to a receptacle optical connector 352 of a counterpart substrate (counterpart device) 351 is referred to as a forward direction (or a downward direction), and an opposite direction thereto is referred to as a rearward direction (or an upward direction). The forward direction is an insertion direction and the rearward direction is a removal direction. The insertion direction and the removal direction are sometimes collectively referred to as "an insertion and removal direction". The forward and the rearward directions and the insertion and the removal directions correspond to a Z-direction.

(Housing 303)

As illustrated in FIGS. 24 and 26, the housing 303 is formed in a substantially rectangular parallelepiped box shape. Specifically, the housing 303 has a rectangular bottom plate 331 which faces a counterpart substrate 351, a lateral plate 332 erected on a lateral edge portion 331a which is a long side of the bottom plate 331, an end plate 333 erected on an end edge portion 331b which is a short side of the bottom plate 331, and an upper plate 334 disposed in upper edge portions 332a and 333a of the lateral plate 332 and the end plate 333.

Many vent holes 335 are formed on the housing 303 (for example, the bottom plate 331, the end plate 333, and the upper plate 334).

It is preferable that an inner diameter of the vent hole 335 be 3 mm or less. It is possible to prevent passage of electromagnetic waves by setting the inner diameter of the vent hole 335 to fall within the above-described range. For this reason, it is possible to avoid a case where the electromagnetic waves from the counterpart substrate 351 leak to the exterior and affect the operator. The inner diameter of the vent hole 335 can be for example, 0.5-3 mm.

As illustrated in FIG. 26, an insertion port 338 into which the other end-side optical connector 302 inside the housing 303 is inserted outwardly is formed on the bottom plate 331. In the illustrated example, four insertion ports 338 are formed. These are referred to as first to fourth insertion ports 338A to 338D.

The insertion ports 338A to 338D are respectively formed at positions conforming to first to fourth connector groups 323A to 323D (to be described later) of the other end-side optical connectors 302.

In the illustrated example, each of the insertion ports 338A-338D has an approximately rectangular shape in which a longitudinal direction is along an X-direction in plan view. In the first to the fourth insertion ports 338A-338D, the first to the fourth connector groups 323A-323D can be inserted, respectively.

The fitting convex portion (fitting portion) 339 protruding forward is formed on a front surface 303a of the housing 303. The fitting concave portion 339 can be fitted to a fitting convex portion (fitting structure, not shown) formed on an installation surface 351a of the counterpart substrate 351, and thereby, the housing 303 can be positioned with respect to the counterpart substrate 351.

The housing 303 is made of a conductive material such as a metal (for example, stainless steel or aluminum).

(The Other End-Side Optical Connector 302)

As illustrated in FIGS. 24 and 26, the other end-side optical connector 302 has an optical connector main body 311 which is an optical connector plug (i.e., an optical plug) and an operation portion 312 which extends from the optical connector main body 311, and movable in a direction of being inserted into and removed from with respect to the receptacle optical connectors 352.

Figure 27:
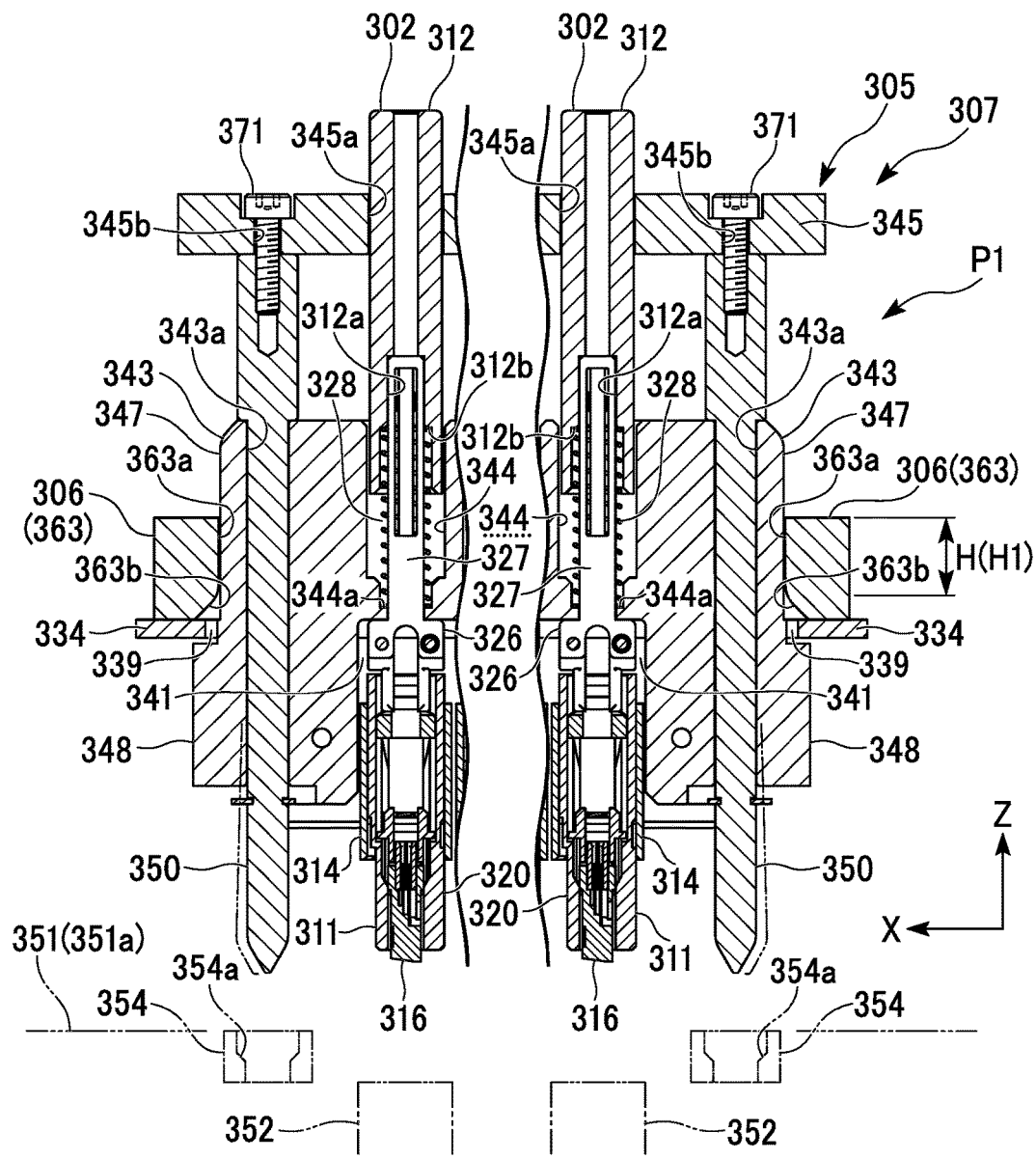
FIG. 27 is a cross-sectional view of an XZ plane which illustrates the second optical connector and a movable holding body.
Figure 28:
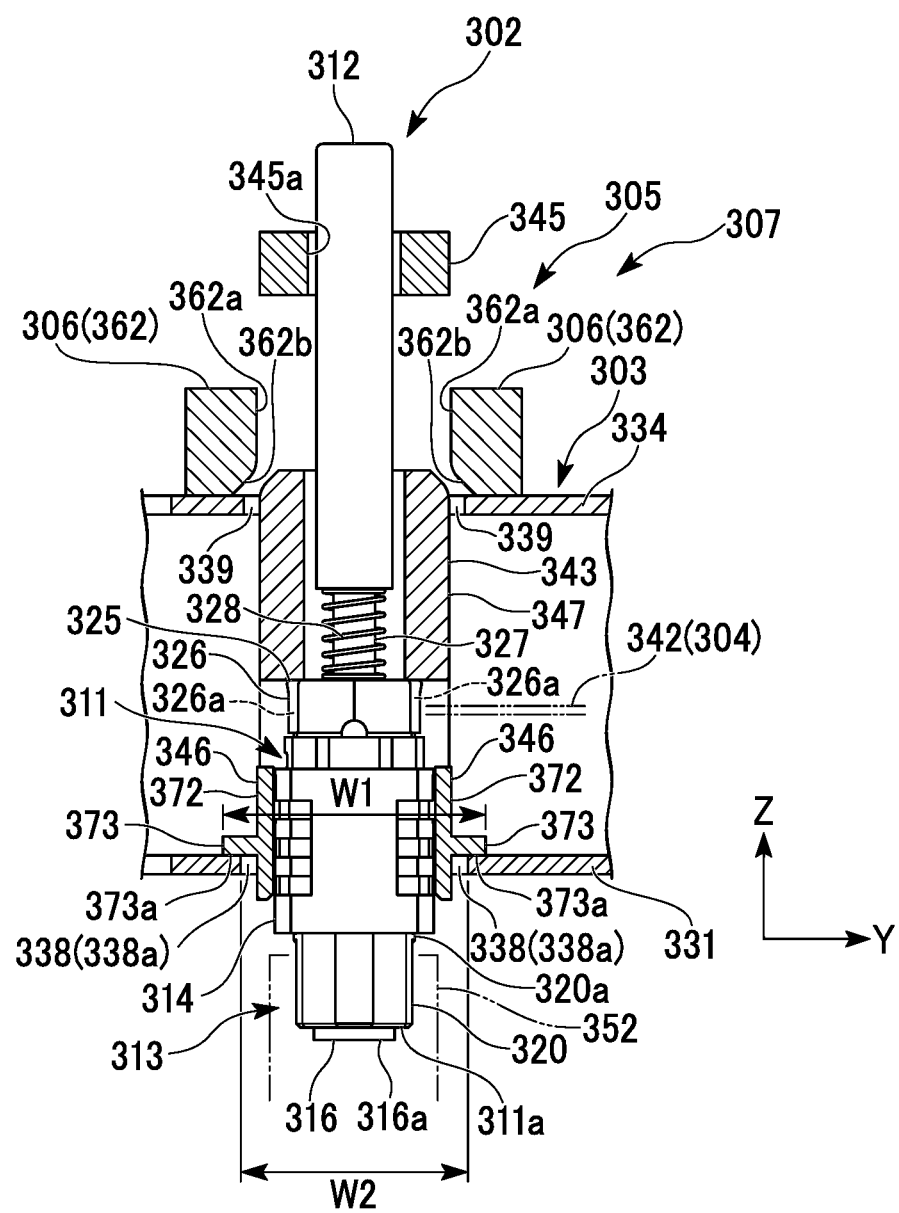
FIG. 28 is a cross-sectional view of an YZ plane which illustrates the second optical connector and the movable holding body.

As illustrated in FIGS. 27 and 28, the optical connector main body 311 includes a main connector portion 313 and a coupling 314 which is movable in the forward and rearward direction with respect to the main connector portion 313.

The optical connector main body 311 can adopt a structure of an MPO-type optical connector (F13-type optical connector pursuant to JIS C5982, MPO: Multi-fiber Push On).

As illustrated in FIG. 28, the connector main portion 313 includes a ferrule 316 which is attached to a distal end of an optical fiber 342, a cylindrical housing 320 which accommodates the ferrule 316, and a rear member 325 provided at a rear portion of the housing 320.

For example, the ferrule 316 is a multicore connector such as an MT-type optical connector, and a front surface thereof is a joining end surface 316a. A guide pin hole (not shown) into which a guide pin (not shown) is inserted is formed in the ferrule 316.

An engagement projection 320a is formed on an outer side surface of the housing 320. A rear side of the engagement projection 320a serves as an engagement recess (not shown) with which a latch convex portion 360a of a latch 360 of the receptacle optical connector 352 engages.

The rear member 325 includes a main body portion 326 including insertion concave portions 326a which opens at both lateral sides of the main body portion 326, and an extension portion 327 extending rearward from the main body portion 326.

The insertion concave portion 326a can guide the optical fiber 342 (i.e., the relay optical fiber 304) in the main body portion 326 outward.

The main body portion 326 is attached to the rear end portion of the housing 320.

As illustrated in FIG. 27, the spring 328 is outwardly fitted to the extension portion 327. An upper portion of the extension portion 327 and an upper portion of the spring 328 are inserted to an insertion hole 312a of the operation portion 312.

A front end (i.e., a lower end) of the spring 328 can be fittable to the step portion 344a at a bottom of an insertion concave portion 344 of the base portion 343, and a rear end (i.e., an upper end) of the spring 328 can be fittable to a step portion 312b at an inner surface of the insertion hole 312a of the operation portion 312. The spring 328 can bias the operation portion 312 upward (rearward) by receiving a reaction force from the step portion 344a of the base portion 343.

The coupling 314 is slidable forward and rearward with respect to the housing 320. If the coupling slides rearward, the latch 360 of the receptacle optical connector 352 can disengage from the housing 320.

An engagement convex portion 329 (see FIG. 26) which can engage with an inner edge of an engagement concave portion 374 of the electromagnetic wave shielding portion 346 of the movable holding body 305 is formed on both outer lateral surfaces of the coupling 314.

The operation portion 312 and the optical connector main body 311 are separate bodies, and the operation portion 312 is formed cylindrically. The operation portion 312 protrudes outward from a rear surface (one surface) 303b of the exterior body 303.

The other end-side optical connector 302 can move in the forward and rearward direction. It is preferable that the movement in the forward and rearward direction enables the other end-side optical connector 302 to appear and disappear from the front surface (other surface) 303a of the housing 303. That is, the optical connector main body 311 preferably does not protrude from the housing 303 at least when the other end-side optical connector 302 located at the rearmost position. And when the other end-side optical connector 352 moves forward, they preferably protrudes forward from the front surface 303a of the housing 303 through the insertion port 338.

Figure 25:
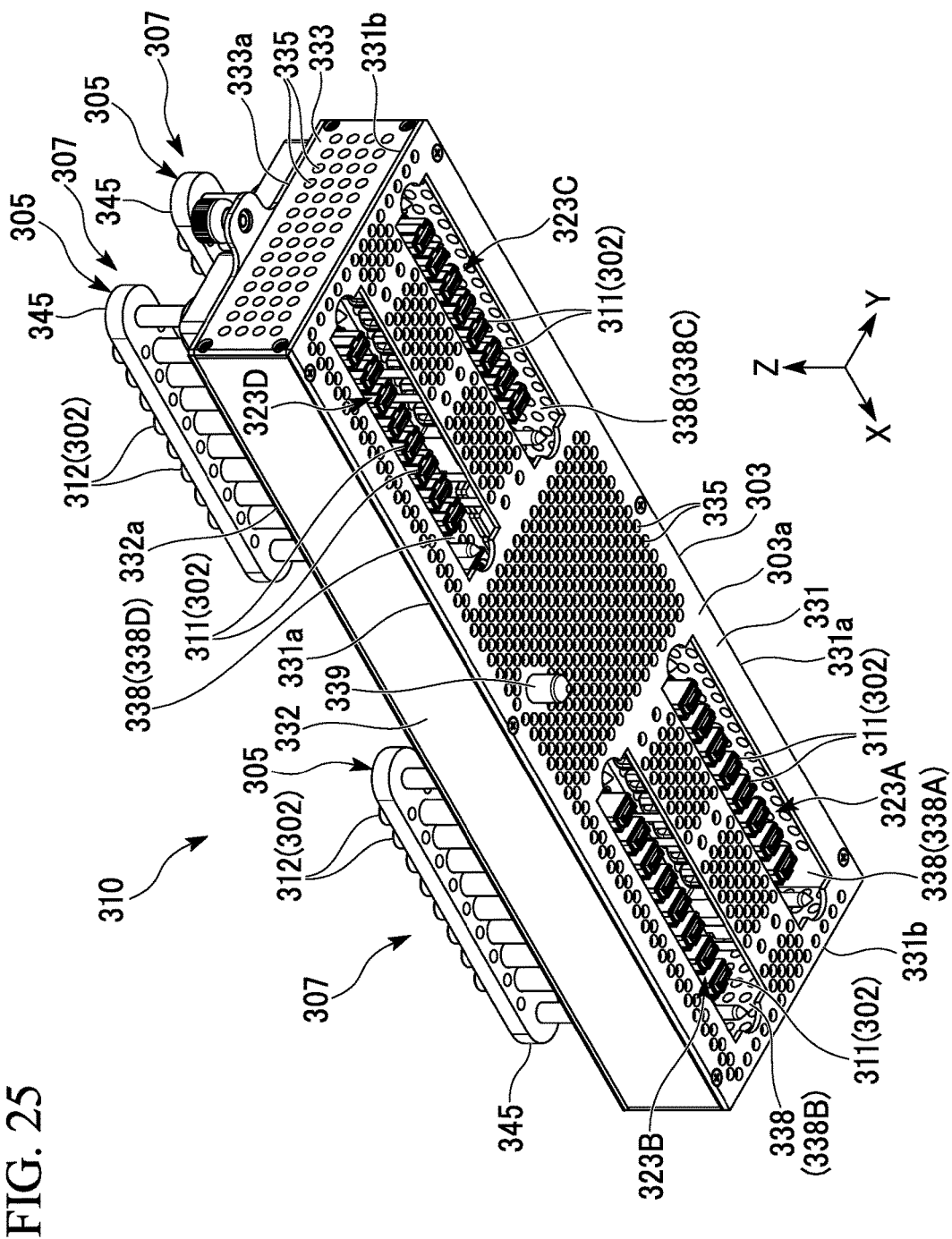
FIG. 25 is a perspective view when the relay optical connection unit in FIG. 24 is viewed from obliquely downward.

As illustrated in FIGS. 24 and 25, the other end-side optical connectors 302 are divided into a plurality of connector groups, and are disposed inside the housing 303.

In this example, four connector groups configured to have a plurality of the other end-side optical connectors 302 are disposed. These connector groups are referred to as first to fourth connector groups 323A to 323D. The connector groups 323A to 323D are configured to have eight other end-side optical connectors 302 which are respectively arrayed in one row along the longitudinal direction (X-direction) of the housing 303.

(The One End-Side Optical Connector 301)

As illustrated in FIGS. 24 and 26, the one end-side optical connector 301 is for example, an optical receptacle, an optical adaptor, and the like.

The one end-side optical connector 301 in the illustrated example is an optical receptacle. A pair of latches 360 is formed in a cylindrical main body portion 359 having an insertion port 358 into which an optical connector (for example, MPO-type optical connector, not shown) of one end-side optical path 321 is inserted. A latch convex portion 360a protruding inward is formed on an inner surface of a distal end portion of the latch 360.

One end-side optical connectors 301 are disposed on the upper plate 334 with a posture where the insertion ports 358 opens outward (upward). The one end-side optical connectors 301 can be connected to optical connectors (not shown) provided at a terminal of one end-side optical paths 321.

In one end-side optical connector 301, a planar view position (i.e., a position viewed from the insertion and removal direction, i.e., the Z-direction) is different from that of the other end-side optical connector 302.

Figure 31:
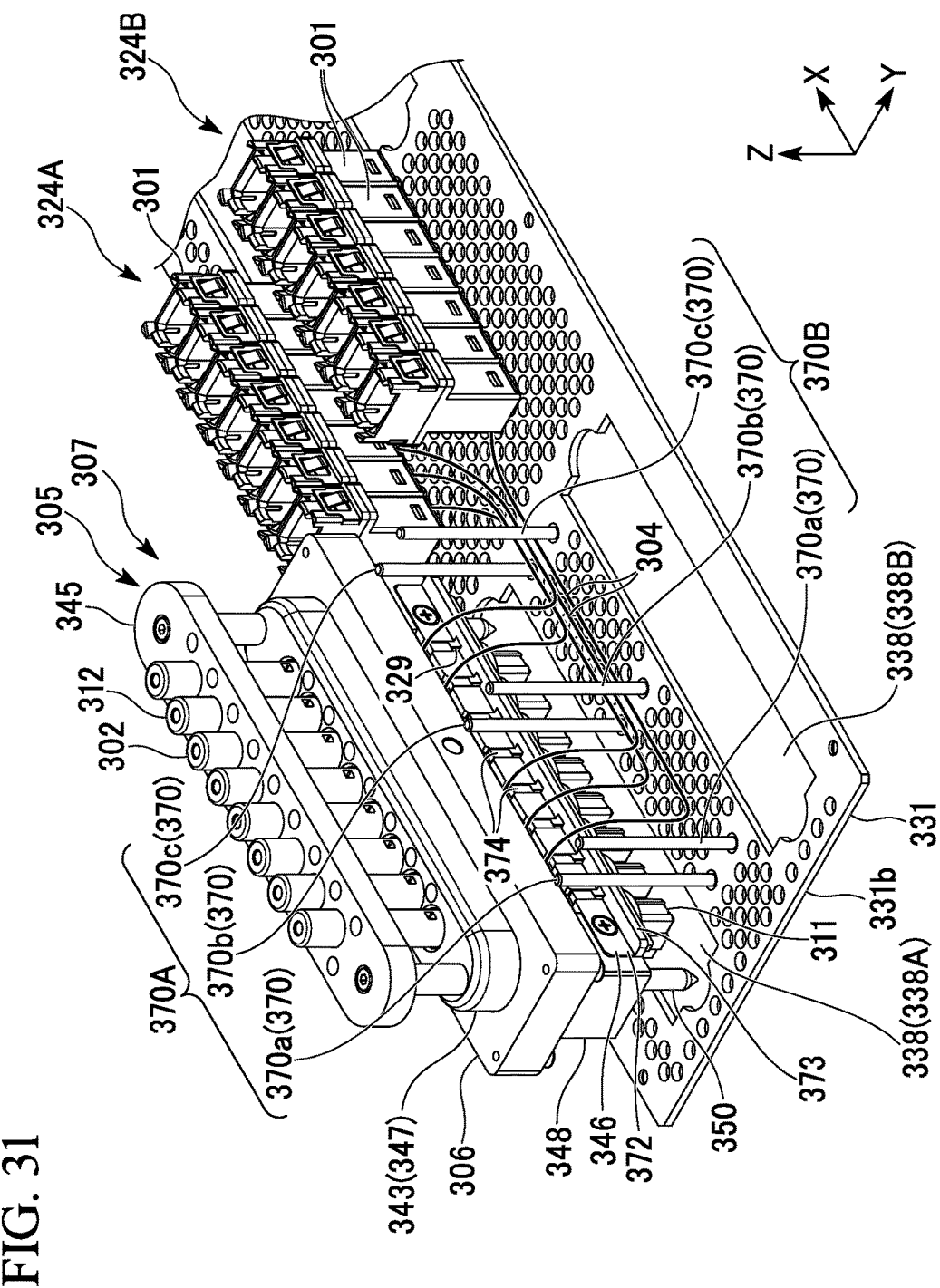
FIG. 31 is a perspective view illustrating the first optical connector, the second optical connector, and a relay optical fiber which connects both of these.

As illustrated in FIGS. 24 and 31, the one end-side optical connectors 301 are divided into a plurality of connector groups, and are disposed on an upper plate 334.

In this example, as illustrated in FIG. 31, two connector groups configured to have a plurality of the one end-side optical connectors 301 are disposed. These connector groups are referred to as the first connector group 324A and the second connector group 324B.

The connector groups 324A, 324B are configured to have seven one end-side optical connectors 301 which are respectively arrayed in one row along the longitudinal direction (X-direction) of the housing 303. The connector groups 324A and 324B are disposed away from each other in the lateral direction (Y-direction) of the housing 303.

A position of the connector groups 324A and 324B in the X-direction can be located closer to the center compared with the connector groups 323A to 323D of the other end-side optical connectors 302.

(Relay Optical Fiber 304)

The relay optical fiber 304 is for example, an optical fiber wire or an optical fiber ribbon.

In the relay optical fiber 304, one terminal is provided at at least one of the plurality of one end-side optical connectors 301, and the other terminal is provided at at least one of the plurality of the other end-side optical connectors 302. By the relay optical fiber 304, the one end-side optical connectors 301 and the other end-side optical connectors 302 are optically connected to each other inside the housing 303.

Depending on an intended use, the relay optical fiber 304 can connect any desired one end-side optical connector 301 and any desired other end-side optical connector 302 to each other.

As illustrated in FIG. 26, the relay optical fiber 304 preferably has sufficient extra lengths. Therefore, even when the other end-side optical connectors 302 move in the forward and rearward direction, the addition of local bending to the relay optical fiber 304 can be avoided.

(Movable Holding Body 305)

As illustrated in FIGS. 26 to 28, the movable holding body 305 includes a base portion 343, guide bars (movable holding body positioning portions) 350, 350 which respectively extend upward and downward from the base portion 343, an upper plate portion 345 which has plate shape and bridges between upper end portions of the guide bars 350, 350, and electromagnetic wave shielding portions 346, 346, each of which is provided on both lateral surfaces of the base portion 343.

The movable holding body 305 is provided at each of the connector groups of the other end-side optical connector 302. In the illustrated example, one movable holding body 305 is used at each of four connector groups 323A to 323D.

As illustrated in FIG. 26, the base portion 343 is made of a conductive material such as a metal (for example, stainless steel or aluminum), and includes the base-portion main body 347 and the end wall portions 348, 348 formed so as to protrude downward from each of both the end portions of the base-portion main body 347.

The base-portion main body 347 is formed in a block shape (for example, a rectangular parallelepiped shape).

As illustrated in FIG. 27, on an upper portion of the base-portion main body 347, an insertion concave portion 344 is provided to which the operation portion 312 is inserted. The insertion concave portion 344 is a concave portion which opens at an upper surface side of the base-portion main body 347.

On a lower portion of the base-portion main body 347, an accommodation portion 341 is provided which accommodates an upper portion of the optical connector main body 311 of the other end-side optical connector 302. The accommodation portion 341 is a concave portion which opens at a lower surface side of the base-portion main body 347.

At each of both end portions of the base-portion main body 347, insertion holes 343a where the guide bars 350 penetrate are formed. The insertion holes 343a are formed so as to penetrate the base-portion main body 347 and end wall portions 348 along a height direction (Z-direction).

At a center of the outer side surface of the base-portion main body 347 in a longitudinal direction (X-direction), the fitting hole (fitting concave portion) 347a is formed where the ball 383 of the ball plunger 380 fits The base portion 343 is arranged such that a longitudinal direction of the base-portion main body 347 is along the X-direction.

An upper portion of the guide bar 350 protrudes upward from an upper surface of the base-portion main body 347, and a lower portion thereof protrudes downward (forward) from a lower surface of the end wall portions 348 to fix the guide bar 350 to the base portion 343.

The guide bar 350 is inserted to the guide hole 354a of the guide member 354 formed on the counterpart substrate 351 to regulate a movement of the movable holding body 305 in a direction within an X-Y plane, and thereby, the movable holding body 305 can be positioned with respect to the counterpart substrate 351.

As illustrated in FIG. 26, the upper plate portion 345 is formed as a long plate shape, and it is preferable that a width thereof (i.e., dimension of the Y-direction) is greater than an outer diameter of the operation portion 312 of the other end-side optical connector 302. Therefore, the upper plate portion 345 can be easily gripped, and an insertion and removal operation of the other end-side optical connector 302 is easily performed.

In the upper plate portion 345, a plurality of insertion holes 345a to which the operation portions 312 are inserted is formed.

As illustrated in FIG. 27, the upper plate portion 345 is fixed (here, fastened by a screw) at an upper end of the guide bar 350 by a fixing tool 371 which is inserted to the insertion hole 345b formed at both end portions of the upper plate portion 345.

(Electromagnetic Wave Shielding Member 346)

As illustrated in FIG. 26, the electromagnetic wave shielding member 346 includes a main plate portion (main portion) 372 extending in a longitudinal direction of the base-portion main body 347, and a shielding plate (shielding body) 373 protruding outward from an outer surface of the main plate portion 372. The electromagnetic wave shielding member 346 is made of a material which has high electromagnetic wave shielding ability, preferably a conductive material such as a metal (for example, stainless steel or aluminum) or a carbon-based material.

The main plate portion 372 is a plate body having an approximately rectangular shape and along an X-Z plane, and being attached to a side surface of the base portion 343 such that a longitudinal direction of the main plate portion 372 is along the X-direction. The main plate portion 372 has a length which approximately covers the whole length of the base portion 343.

In the main plate portion 372, a plurality of the fitting concave portions 374 is formed away from each other in the longitudinal direction (X-direction). The fitting concave portions 374 has a slit shape which is formed from upper edges of the main plate portion 372 to downward.

The fitting concave portion 374 is formed such that when the engagement convex portion 329 of the coupling 314 is arranged inside the fitting concave portion 374, the other end-side optical connector 302 is movable with respect to the movable holding body 305 in an extending direction of the fitting concave portion 374 (i.e., the upward and downward direction).

In the main plate portion 372, the engagement convex portion 329 can be fitted to an inner edge (i.e., a lower edge) of the fitting concave portion 374, and an upward acting force is applied to the engagement convex portion 329. In this manner, the coupling 314 can be operated.

At positions closer to both the end portions of the main plate portion 372, the insertion hole 375 is formed where a fixing tool (not shown) is inserted. The fixing tool inserted to the insertion hole 375 is fixed to a fixing hole 348a at an outer side surface of the end wall portions 348. Thereby, the main plate portion 372 is attached to the base-portion main body 347.

As illustrated in FIGS. 26 and 28, the shielding plate 373 is formed so as to protrude outward (i.e., in the Y-direction) from an outer surface of the main plate portion 372. The shielding plate 373 is a plate body having an approximately rectangular shape and along an X-Y plane, and is formed such that it approximately covers the whole length of main plate portion 372. The protruding width of the shielding plate 373 from an outer surface of the main plate portion 372 is constant over a whole length thereof.

As illustrated in FIG. 28, the shielding plate 373 has a shape such that when the other end-side optical connector 302 is inserted into the insertion port portion 338 and connected to the receptacle optical connector 352, at least a part of a gap 338a between a circumferential edge of the insertion port portion 338 and the other end-side optical connector 302 is covered when viewed from an insertion and removal direction (Z-direction) of the other end-side optical connector 302.

In the illustrated example, a distance W1 in a width direction (Y-direction) between the protruding ends of the shielding plate 373 of a pair of the electromagnetic waves 346 is greater than a dimension W2 in a width direction (Y-direction) of the insertion port portion 338 to which the other end-side optical connector 302 is inserted.

In this example, the other end-side optical connectors 302 are connected to the receptacle optical connectors 352. The lower portion of the main plate portion 372 is inserted to the insertion port portion 338. The lower surface 373a of the shielding plate 373 contacts with an upper surface 331a of the bottom plate 331. Thereby, the shielding plate 373 closes and stops the gap 338a between a circumferential edge of the insertion port portion 338 and the outer surface of the other end-side optical connector 302 (i.e., an outer surface of the coupling 314).

Therefore, electromagnetic waves from the counterpart substrate 351 can be prevented from intruding into the housing 303 through the insertion port portion 338.

In the illustrated example, a distance W1 in a width direction of the shielding plate 373 is greater than dimension W2 of a width direction (Y-direction) of the insertion port portion 338. However, the shielding plate 373 may have a shape which covers at least a part of the gap 338a when viewed from the Z-direction, and the distance W1 in a width direction of the shielding plate 373 may be the same as the dimension W2 of a width direction (Y-direction) of the insertion port portion 338, or may be smaller than the dimension W2.

In addition, if the shielding plate 373 has a shape which covers at least a part of the gap 338a when viewed from the Z-direction, the other end-side optical connector 302 may be located away from the bottom plate 331 when the other end-side optical connector 302 is connected to the receptacle optical connector 352.

The shielding plate 373 may have a shape which covers a whole area of the gap 338a (when viewed from the Z-direction), or may have a shape which covers a part of the gap 338a.

When the shielding plate 373 has a shape which covers a part of the gap 338a, a distance between the circumferential edge of the insertion port portion 338 and an outer surface of the other end-side optical connector 302 in an area which is not covered with the shielding plate 373 is desired to be small, for example, preferably 3 mm or less.

The electromagnetic wave shielding portion 346 can be uniformly formed with the base portion 343.

The movable holding body 305 is movable in directions close to and away from the receptacle optical connectors 352 while collectively holding the plurality of other end-side optical connectors 302, and is movable in a direction of being inserted into and removed from the receptacle optical connectors (i.e., the upward and downward direction in FIG. 26). The movable holding body 305 as illustrated holds eight other end-side optical connectors 302.

The movable holding body 305 and the other end-side optical connectors 302 being hold by the movable holding body 305 are referred to as a movable connector unit 307.

(Shielding Member 306)

As illustrated in FIGS. 24 and 26 to 28, the shielding member 306 is formed to have a frame shape surrounding the movable connector unit 307. In the illustrated example, one shielding member 306 is provided at every four movable connector units 307. The shielding member 306 is arranged at an upper surface 334a of an upper plate 334 of the housing 303 (i.e., an outer surface opposite to the receptacle optical connector 352 side of the housing 303).

The shielding member 306 in the illustrated example has a rectangular frame shape including a pair of long side portions 362, 362 and a pair of short side portions 363, 363, and is arranged such that a longitudinal direction thereof is along the X-direction.

The shielding member 306 is made of a material which has high electromagnetic wave shielding ability, preferably a conductive material such as a metal (for example, stainless steel or aluminum).

As illustrated in FIG. 28, inner surfaces of the long-side portions 362, 362 have an upper inner surface 362a along the X-Z plane and a lower inner surface 362b formed sequentially with the upper inner surface 362a. The lower inner surface 362b slopes in a direction such that the diameter thereof enlarges as the lower inner surface 362b lowers.

Therefore, an inner diameter of the shielding member 306 in the Y-direction (i.e., a distance between inner surfaces opposite to each other) is substantially constant in the upward and downward direction at the upper inner surface 362a, and at the lower inner surface 362b, the inner diameter thereof is greater that an inner diameter of the upper inner surface 362a. An inner diameter of the lower inner surface 362b in the Y-direction becomes greater at a lower portion.

As illustrated in FIG. 27, an inner surface of each of the short side portions 363, 363 includes an upper inner surface 363a along an upward and downward direction (Z-direction) and a lower inner surface 363b formed in succession of the upper inner surface 363a. The lower inner surface 363b inclines along a direction so as to increase the diameter of the shielding member 306.

Therefore, an inner diameter in the X-direction of the shielding member 306 (i.e., a distance between inner surfaces facing each other) is approximately constant in the upward and downward direction at the upper inner surface 363a, and is greater than an inner diameter of the upper inner surface 363a at the lower inner surface 363b. An inner diameter of the lower inner surface 363b in the X-direction becomes greater at a lower portion.

The shielding member 306 is an opposing member where the upper inner surfaces 362a, 363a face the movable holding body 305.

As illustrated in FIGS. 26 and 29A, at the long-side portion 362, an attachment hole 306a is formed where the ball plunger 380 is attached.

The attachment hole 306a is formed so as to penetrate the long-side portion 362 along the Y-direction at a center portion of the long-side portion 362, and a female screw 306b is formed at an inner surface of the attachment hole 306a.

As illustrated in FIGS. 27 and 29A, the upper inner surfaces 362a, 363a are at a position closer to (or in contact with) an outer surface of the base-portion main body 347 of the movable holding body 305, and face the outer surface.

Therefore, tilting of the movable connector unit 307 is regulated by the shielding member 306.

For example, in the state illustrated in FIG. 29A, when the movable connector unit 307 is tilted leftward, a left outer side surface 347b of the base-portion main body 347 contacts with an upper edge of the left upper inner surface 362a and a right outer side surface 347b contacts with a lower edge of the right upper inner surface 362a. At such contact positions (i.e., tilting regulation positions), further leftward tilting is regulated.

When the movable connector unit 307 is tilted rightward, a right outer side surface 347b of the base-portion main body 347 contacts with an upper edge of the right upper inner surface 362a and a left outer side surface 347b contacts with a lower edge of the right upper inner surface 362a. At such contact positions (i.e., tilting regulation positions), further rightward tilting is regulated.

By providing the shielding member 306 at a side of the upper surface 334a of an upper plate 334, the movable connector unit 307 can be held at a high position by the ball plunger 380. Therefore, a wide range of movement in the upward and downward direction of the movable connector unit 307 can be ensured.

In addition, by providing the shielding member 306, a wide range of movement of the movable connector unit 307 can be ensured without increasing the height dimension of the housing 303. Therefore, it is effective for downsizing the housing 303.

(Ball Plunger 380)

As illustrated in FIG. 29A, on the shielding member 306, a ball plunger 380 is provided that regulates a forward movement of the movable holding body 305, when the other end-side optical connector 302 is located away from the receptacle optical connectors 352.

The ball plunger 380 is configured by a cylindrical main body 382, the ball 383 accommodated inside the main body 382, and a coil spring (biasing member) 384 which biases the ball 383 in a direction toward a distal end of the main body 382.

The main body 382 is formed cylindrically, and at an outer surface thereof, a male screw 382a is formed. The accommodation portion 381 is an inner space of the main body 382 and has a circular cross-section. The main body 382 is screwed and fixed to the female screw 306b of an inner surface of the attachment hole 306a of the shielding member 306.

The ball 383 is made of, for example, a metal such as stainless or a resin.

The ball 383 is accommodated in the accommodation portion 381 of the main body 382 in a state being capable of moving in a central axis direction of the main body 382. By the movement in the direction thereof, a protruding amount from the opening edge portion 382b at a tip of the main body 382 can be adjusted.

In the example of FIG. 29A, as illustrated in a solid line, a position of the ball 383 can be switched over between a forward position where a portion of the ball 383 largely protrudes forward from the opening edge portion 382b at the edge and a rearward position where a protruding amount of the ball 383 is small as illustrated in a virtual line. At a rearward position, the ball 383 may protrude slightly from the opening edge portion 382b or may not protrude from the opening edge portion 382b. Here, rightward of FIG. 29A is referred to as a forward direction, and a leftward thereof is referred to as rearward direction.

An inner diameter of an inner surface of the opening edge portion 382b is smaller than an outer diameter of the ball 383; therefore, the opening edge portion 382b can prevent the ball 383 from falling down.

The coil spring 384 is accommodated in the accommodation portion 381 and can bias the ball 383 toward a distal end direction by receiving a reaction force from the bottom plate 382c.

At a rear surface of the main body 382, a tool locking hole 385 is formed. The tool locking hole 385 has a shape such that a tool such as a hexagonal wrench can be inserted. The ball plunger 380 is rotated around a central axis of the main body 382 using the tool, and a position of the ball plunger 380 in the longitudinal direction can be adjusted.

As illustrated in FIG. 29A, the movable connector unit 307 is placed at a relatively upper position, and in a state that the ball 383 of the ball plunger 380 is fitted to the fitting hole 347a, the downward movement of the movable holding body 305 is regulated by the ball 383.

Therefore, it can be avoided that the movable connector unit 307 is mistakenly moved forward (downward) and the other end-side optical connectors 302 protrude from the front surface 303a of the housing 303, thereby, the movable connector unit 307 interferes with the counterpart substrate 351.

On the other hand, as illustrated in FIG. 29B, when a downward force is added to the movable connector unit 307, the movable holding body 305 moves downward and the ball 383 is discharged from the fitting hole 347a to release a movement regulation.

Therefore, the movement regulation can be released by a simple operation, and the movable connector unit 307 can be in a state being capable of moving forward.

As illustrated in FIGS. 24 and 26, on the counterpart substrate 351 where the relay optical connection unit 310 is provided, receptacle optical connectors 352 are provided. The receptacle optical connectors 352 are provided at a terminal of the other end-side optical paths 322.

As illustrated in FIG. 26, the receptacle optical connector 352 is for example, an optical receptacle, an optical adaptor, and the like.

The receptacle optical connector 352 in the illustrated example is an optical receptacle. A pair of latches 360 is formed in a cylindrical main body portion 359 having an insertion port 358 into which the optical connector main body 311 of the other end-side optical connector 302 is inserted. A latch convex portion 360a protruding inward is formed on an inner surface of a distal end portion of the latch 360.

The receptacle optical connector 352 is provided at a position corresponding to the other end-side optical connector 302. The receptacle optical connectors 352 configures, for example, four connector groups corresponding to the connector groups 323A to 323D (see FIG. 24) of the other end-side optical connectors 302. Each of the connector groups are configured to have such as eight receptacle optical connectors 352 which are respectively arrayed in one row along the X-direction.

(Optical Fiber Guide Bar 370)

As illustrated in FIG. 31, on the bottom plate 331 of the housing 303, a plurality of optical fiber guide bars 370 is formed so as to protrude upward.

At least two of the optical fiber guide bars 370 are disposed away from each other in the Y-direction.

In the illustrated example, the optical fiber guide bars 370 are divided into two guide bar groups and provided at the bottom plate 331. These groups are referred to as the first guide bar group 370A and the second guide bar group 370B.

The guide bar groups 370A, 370B are configured to have a plurality of optical-fiber guide bars 370 (370a to 370c) (in the illustrated example, the number is three) which are arrayed in one row along the X-direction.

The guide bar groups 370A and 370B are formed so as to be away from each other in the Y-direction.

The first guide bars 370a, 370a of the guide bar groups 370A, 370B are arranged in line in the Y-direction. Similarly, the second guide bars 370b, 370b are arranged in line in the Y-direction. The third guide bars 370c, 370c are arranged in line in the Y-direction.

The guide bar groups 370A, 370B are provided at the bottom plate 331 which is a portion between the insertion port portion 338A and the insertion port portion 338B. Although not shown, the guide bar groups 370A, 370B are also provided at the bottom plate 331 which is a portion between the insertion port portion 338C and the insertion port portion 338D.

A plurality of the relay optical fibers 304 that connect the one end-side optical connectors 301 and the other end-side optical connectors 302 is wired between the guide bar group 370A and the guide bar group 370B.

Since the optical fiber guide bar 370 regulates a movement of the relay optical fiber 304 in a width direction (Y-direction), it is possible to prevent an extruded wiring in an above-described direction of the relay optical fiber 304. Therefore, the addition of an external force to the relay optical fiber 304 can be prevented, and it is possible to avoid optical characteristics of the relay optical fiber 304 being affected by the external force.

In the illustrated example, the number of the guide bars which configures one guide bar group is three; however, the number is not limited to this, and can be one or two, or may be four or more.

(Method of Using Relay Optical Connection Unit 310)

Next, a method of using the relay optical connection unit 310 will be described.

(First Stage)

As illustrated in FIG. 24, the relay optical connection unit 310 is installed on the installation surface 351a of the counterpart substrate 351.

At this time, the fitting convex portion 339 (see FIG. 25) is fitted to the fitting concave portion of the counterpart substrate 351. This regulates a movement of the relay optical connection unit 310 in the direction along the counterpart substrate 351, and the relay optical connection unit 310 is roughly positioned with respect to the counterpart substrate 351.

By fitting the fitting concave portion 310 to the fitting convex portion 339, the relay optical connection unit 310 is positioned and this is referred to as "a first positioning".

As illustrated in FIG. 29A, at this stage, the movable connector unit 307 is placed at a high position, and the other end-side optical connectors 302 are further away from the receptacle optical connectors 352.

In this figure, the ball 383 of the ball plunger 380 greatly protrude from an opening edge portion 382b, and fits to a fitting hole 437a of the base-portion main body 347 of the movable holding body 305. In this state, by the ball 383 of the fitting hole 347a, the downward movement of the movable connector unit 307 is regulated.

Therefore, it can be avoided that the movable connector unit 307 is mistakenly moved forward (downward) and the other end-side optical connectors 302 protrude from the front surface 303a of the housing 303, thereby, the movable connector unit 307 interferes with the counterpart substrate 351.

A position of the movable connector unit 307 when the ball 383 of the ball plunger 380 is fitted to the fitting hole 347a of the movable holding body 305 is referred to as "a first position P1".

As illustrated in FIGS. 27 and 29A, regarding the upper inner surfaces 362a and 363a, the height (referred to as the facing height) of an area facing the outer surface of the base-portion main body 347 of the movable holding body 305 is described as H. The facing height H is the dimension in the Z-direction of an area where the upper inner surfaces 362a and 363a and the outer surface of the base-portion main body 347 face each other.

In the first position P1, since the movable connector unit 307 is at a relatively high position, in the upper inner surfaces 362a and 363a of the shielding member 306, the entire height range thereof faces an outer surface of the base-portion main body 347 of the movable holding body 305. Therefore, the facing height H becomes "H1" which equals the height of the upper inner surfaces 362a and 363a.

In the first position P1, as described below, the tilting of the movable connector unit 307 is regulated by the inner surface of the shielding member 306.

In FIG. 29A (i.e., a cross-sectional view along the Y-Z plane), the movable connector unit 307 has a posture such that an outer surface of the base-portion main body 347 is along the upward and downward direction (the Z-direction) (referred to as "a default posture"). In the default posture, an outer side surface 347b of the base-portion main body 347 is along the X-Z plane.

As the default posture is a starting posture, when the movable connector unit 307 is tilted leftward in the Y-Z plane, a left outer side surface 347b of the base-portion main body 347 contacts with an upper edge of the left upper inner surface 362a and a right outer side surface 347b contacts with a lower edge of the right upper inner surface 362a. At such contact positions (i.e., tilting regulation positions), further leftward tilting is regulated.

When the movable connector unit 307 is tilted rightward, a right outer side surface 347b of the base-portion main body 347 contacts with an upper edge of the right upper inner surface 362a and a left outer side surface 347b contacts with a lower edge of the right upper inner surface 362a. At such contact positions (i.e., tilting regulation positions), further rightward tilting is regulated.

Also in FIG. 27 (i.e., a cross-sectional view along the X-Z plane), when the movable connector unit 307 is tilted leftward in the X-Z plane, a left outer side surface of the base-portion main body 347 contacts with an upper edge of the left upper inner surface 363a and a right outer side surface of the base-portion main body 347 contacts with a lower edge of the right upper inner surface 363a. At such contact positions (i.e., tilting regulation positions), further leftward tilting is regulated.

When the movable connector unit 307 is tilted rightward, a right outer side surface of the base-portion main body 347 contacts with an upper edge of the right upper inner surface 363a and a left outer side surface of the base-portion main body 347 contacts with a lower edge of the right upper inner surface 363a. At such contact positions (i.e., tilting regulation positions), further rightward tilting is regulated.

A tilt angle of the movable connector unit 307 from the default posture to the tilting regulation position has a value corresponding to the facing height H between the movable connector unit 307 and the upper inner surfaces 362a, 363a.

In the first position P1 (or a position close to the first position P1) as illustrated in FIG. 27 and FIG. 29A, the movable connector unit 307 faces inner surfaces (i.e., the upper inner surfaces 362a, 363a) of the shielding member 306 with a large facing height H1. Therefore, the tilt angle of the movable connector unit 307 from the default posture to the tilting regulation position becomes small.

As illustrated in FIG. 27, the movable connector unit 307 moves forward (downward) toward the counterpart substrate 351, and the guide bar 350 moves forward (downward) toward the guide hole 354a of the cylindrical guide member 354 provided at the counterpart substrate 351.

In the movable connector unit 307 at the first position P1 (or a position close to the first position P1), since tilting is regulated, the guide bar 350 can be easily and reliably guided to the guide hole 354a.

At the first position P1, the other end-side optical connector 302 preferably does not protrude from the bottom plate 331 of the housing 303. Therefore, it is possible to avoid the optical connector main body 311 being damaged.

(Second Stage)

As illustrated in FIG. 29B, the movable holding body 305 moves forward (downward) toward the counterpart substrate 351, and as illustrated in FIG. 27, the optical connector main body 311 is pressed downward by a top surface and the like of the accommodation portion 341 of the base portion 343, and the other end-side optical connector 302 moves downward together with the movable holding body 305.

By the downward movement of the movable connector unit 307, when the guide bar 350 reaches the guide hole 354a (see FIG. 27), a lateral movement of the movable connector unit 307 is regulated to some extent. And the other end-side optical connectors 302 can be arranged at a position where each of the other end-side optical connectors 302 can be fitted to the receptacle optical connector 352.

By inserting the guide bar 350 to the guide hole 354a, the movable connector unit 307 is positioned and this is referred to as "a second positioning".

Therefore, the other end-side optical connectors 302 can be reliably guided to the receptacle optical connectors 352.

The movable connector unit 307 in FIG. 29B is at a position lower than the first position P1, and the ball 383 of the ball plunger 380 is away from the fitting hole 347a. Therefore, a movement regulation by the ball plunger 380 is released. In this position, the optical connector main body 311 has not yet been positioned by the receptacle optical connector 352. The position of the movable connector unit 307 is referred to as "the second position P2".

As described above, a tilt angle of the movable connector unit 307 from the default posture to the tilting regulation position has a value corresponding to the facing height H between the movable connector unit 307 and the upper inner surfaces 362a and 363a.

In the second position P2, since the movable holding body 305 is at a relatively low position, a portion (i.e., an upper portion) of the upper inner surfaces 362a, 363a does not face an outer surface (i.e., an outer surface along the Z-direction) of the base-portion main body 347. Therefore, the facing height H becomes "H2" which is smaller than H1 of FIG. 29A.

Therefore, in the second position P2 illustrated in FIG. 29B, the tilt angle of the movable connector unit 307 from the default posture to the tilting regulation position becomes large, and the movable connector unit 307 is largely tiltable compared to a state of being the first position P1 illustrated in FIG. 29A.

Therefore, it becomes easy to align the other end-side optical connector 302 with the receptacle optical connector 352. For example, even when a position of the receptacle optical connector 352 is deviated from a designed position, it is easy to align the other end-side optical connector 302.

In the second position P2, in the tilt angle of the movable connector unit 307, the tilting in the Y-Z plane illustrated in FIG. 29A and FIG. 29A as well as the tilting in the X-Z plane illustrated in FIG. 27 become large compared to the state of being the first position P1. Therefore, it becomes easier to align the other end-side optical connector 302 with the receptacle optical connector 352.

By the movement in a height direction (Z-direction), the movable connector unit 307 can be switched over between the first position P1 and the second position P2.

(Third Stage)

As illustrated in FIGS. 26 and 28, by moving the other end-side optical connector 302 downward, the distal end portion 311a of the optical connector main body 311 of the other end-side optical connector 302 is inserted into the entrance portion of the insertion port 358 of the receptacle optical connector 352.

At this time, if necessary, the operation portion 312 is gripped to move the optical connector main body 311 forward, and thereby, the distal end portion 311a thereof can be inserted to the entrance portion of the insertion port 358.

When moving the other end-side optical connector 302 forward, all of the other end-side optical connectors 302 may be operated collectively; however, only a part of the other end-side optical connectors 302 may be operated.

In this position, the distal end portion 311a is arranged in the entrance portion of the insertion port 358. Accordingly, a lateral movement of the optical connector main body 311 is regulated. Therefore, a planar view position of the optical connector main body 311 is determined with respect to the receptacle optical connector 352.

In this state, the facing height H becomes zero, and the movable connector unit 307 is not regulated by the upper inner surfaces 362a and 363a. Therefore, even when a position of the receptacle optical connector 352 is deviated, the movable connector unit 307 can move in line with the deviation. Therefore, it is easy to align the optical connector main body 311 with the receptacle optical connector 352.

The positioning of the optical connector main body 311 with respect to the receptacle optical connector 352 is referred to as "a third positioning".

(Fourth Step)

As illustrated in FIGS. 26 and 28, the other end-side optical connector 302 is pressed downward (forward), and the distal end portion 311a of the optical connector main body 311 is deeply inserted into the insertion port 358 of the receptacle optical connector 352.

At this time, the plurality of the other end-side optical connectors 302 may be collectively moved forward by the operation of the movable holding body 305, and only a portion of the other end-side optical connectors 302 may be moved forward.

The forward movement of the optical connector main body 311 causes the engagement projection 320a (see FIG. 28) of the housing 320 to displace the latch 360 outward (i.e., in a direction in which a distance between the latches 360 increases). The displaced latch 360 regulates the forward movement of the coupling 314.

Whereas the forward movement of the coupling 314 is regulated, the housing 320 is moved forward. Accordingly, the engagement recess (not shown) of the housing 320 is exposed, and the latch convex portion 360a engages with the engagement recess.

As illustrated in FIG. 28, at this position, the joining end surface 316a of the ferrule 316 is caused to abut onto a connection end surface (not shown) inside the receptacle optical connector 352, and a pair of guide pins (not shown) formed on the connection end surface (not shown) are respectively inserted into the guide pin hole (not shown) of the ferrule 316. This causes the ferrule 316 to be very accurately positioned with respect to the receptacle optical connector 352.

The positioning of the other end-side optical connector 302 with respect to the receptacle optical connector 352 is referred to as "a fourth positioning".

In this state, the shielding plate 373 of the electromagnetic wave shielding portion 346 closes and stops the gap 338a of the insertion port portion 338. Therefore, electromagnetic waves from the counterpart substrate 351 can be prevented from intruding into the housing 303 through the insertion port portion 338. For this reason, it is possible to avoid a case where the electromagnetic waves leak to the exterior and affect the operator.

The respective other end-side optical connectors 302 can be mutually and independently operated. Accordingly, only one that is required out of the plurality of other end-side optical connectors 302 can be fitted to the receptacle optical connector 352.

(Detachment of Other-End Optical Connector 302 from Receptacle Optical Connector 352)

As illustrated in FIG. 26, if the upper plate portion 345 is gripped to lift up the movable holding body 305, front edges of the engagement concave portion 374 apply an upward acting force to the engagement convex portion 329 of the coupling 314. In this manner, the coupling 314 of the other end-side optical connector 302 is moved upward.

The upward movement of the coupling 314 causes the engagement recess (not shown) of the housing 320 to be exposed, and brings the latch 360 into an outward displaceable state.

If the coupling 314 is further moved upward, the engagement projection 320a displaces the latch 360 outward. In this manner, the latch convex portion 360a is disengaged from the engagement recess (not shown).

When pulling the movable holding body 305 further upward, the other end-side optical connector 302 is pulled out from the receptacle optical connector 352.

In the relay optical connection unit 310, the housing 303 has the shielding member 306 which faces both surfaces of the movable holding body 305 and regulates tilting of the movable holding body 305.

The movable connector unit 307 is configured so that the tilting is regulated by the shielding member 306 when the movable holding body 307 is located at the first position P1 or at a position closer to the first position P1. Therefore, the guide bar 350 can be easily aligned with the guide hole 354a. Accordingly, it is possible to reliably align the guide bar 350 with the guide hole 354a.

In addition, at the second position P2, the facing height H becomes smaller than the facing height H at the first position P1. Accordingly, the tiltable angle of the movable holding body 305 becomes larger than the tiltable angle of the first position P1.

Therefore, it becomes easy to align the other end-side optical connector 302 with the receptacle optical connector 352. For example, even when a position of the receptacle optical connector 352 is deviated from a designed position, it is easy to align the other end-side optical connector 302.

Therefore, it is possible to easily and reliably connect the plurality of the other end-side optical connectors 302 to the receptacle optical connectors 352 of the counterpart device 351.

The relay optical connection unit 310 has a structure that in the housing 303, the one end-side optical connector 301 and the other end-side optical connector 302 are connected by the relay optical fiber 304. Therefore, even when complicated optical wiring is needed, it is possible to build the optical wiring which is most suitable to the intended use by an easy operation of installing the relay optical connection unit 310 on the counterpart substrate 351. Accordingly, it is possible to easily and reliably build complicated optical wiring using many optical fibers.

In addition, the relay optical connection unit 310 includes the movable holding body 305 which collectively holds the plurality of the other end-side optical connectors 302. Accordingly, a simple operation enables the plurality of the other end-side optical connectors 302 to be collectively inserted into and removed from the receptacle optical connectors 352.

In the relay optical connection unit 310, installation work goes through four stages of positioning. Accordingly, it is possible to reliably and accurately fit the other end-side optical connectors 302 to the receptacle optical connectors 352.

That is, after a position of a housing 303 is roughly determined on the counterpart substrate 351 by fitting the fitting concave portion to the fitting convex portion 339 in the first stage, a position of the movable holding body 305 is determined by a guide bar 350 in the second stage. A position of the other end-side optical connector 302 is determined with respect to the receptacle optical connector 352 in the third stage. Subsequently, in the fourth stage, the other end-side optical connector 302 is operated, thereby going through a process completely and finally determining the position of the other end-side optical connector 302. In this manner, it is possible to guide the other end-side optical connector 302 to the receptacle optical connector 352.

According to this configuration, even when the position of the other end-side optical connector 302 is deviated, the deviation is reliably corrected and the other end-side optical connector 302 is guided to a correct position. In this manner, it is possible to reliably and accurately fit the other end-side optical connector 302 to the receptacle optical connector 352. Therefore, it is possible to build a highly reliable optical wiring.

(The Forward Stopper)

Figure 32:
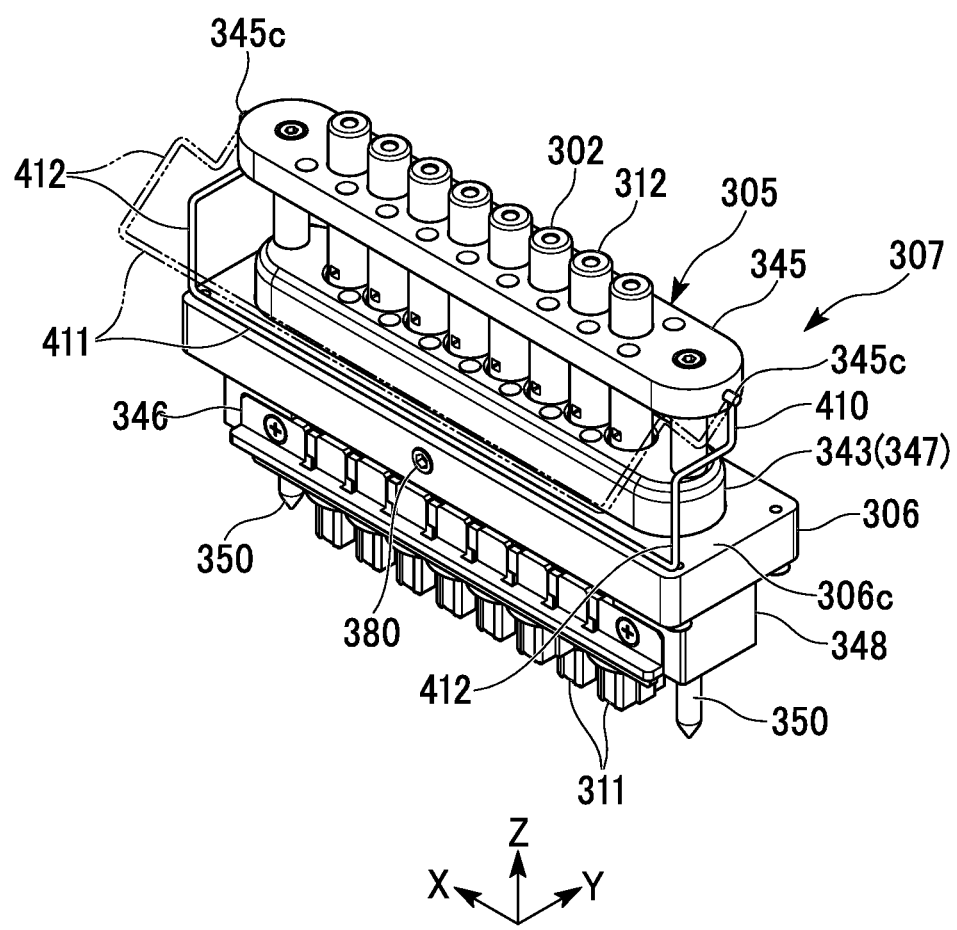
FIG. 32 is a perspective view illustrating a stopper for a movable holding body.

As illustrated in FIG. 32, in the movable holding body 305, when the movable connector unit 307 is at the first position P1, a forward stopper 410 which regulates the movable holding body 305 moving forward.

The forward stopper 410 includes a contact portion 411 which can contact with an upper surface 306c of the shielding member 306, and coupling portions 412, 412 respectively extend from both the end portions of the contact portion 411.

The contact portion 411 is formed along the longitudinal direction of the upper plate portion 345. The coupling portion 412 is coupled rotatably to a hinge joint portion 345c provided at both end portions of the upper plate portion 345.

In the forward stopper 410, by the rotation centered at the hinge joint portion 345c, as illustrated in a solid line in FIG. 32, the contact portion 411 can be switched over between a position regulating the forward movement where the contact portion 411 contacts with the upper surface 306c of the shielding member 306 and as illustrated in a virtual line, a regulation releasing position where the contact portion 411 is discharged from the shielding member 306.

At a position regulating the forward movement, since the forward stopper 410 contact with the shielding member 306, the forward movement (i.e., the downward movement) of the movable connector unit 307 is regulated.

Therefore, it can be avoided that the movable connector unit 307 is mistakenly moves forward (downward) and the other end-side optical connectors 302 protrude from the front surface 303a of the housing 303, thereby, the movable connector unit 307 interferes with the counterpart substrate 351.

By arranging the forward stopper 410 at the regulation releasing position, and the movable connector unit 307 can be in a state being capable of moving forward.

The forward stopper 410 may be provided instead of the ball plunger 380 or may be used with the ball plunger 580.

(The Connector Discharge Tool 390)

The connector discharge tool 390 illustrated in FIG. 30A to FIG. 30C is a tool for removing the receptacle optical connector 52 from the movable connector unit 7.

As illustrated in FIGS. 30A and 30B, the connector discharge tool 390 includes a unit operation portion 391 which adds a force in a pulling-out direction to the movable connector unit 7 and the exterior member 392.

The unit operation portion 391 includes an inner-side gripping portion 393 having a semi-cylindrical shape, the end plate portions 394, 394 which are respectively suspended from the edge portions of the inner-side gripping portion 393, a coupling plate portion 395 which is suspended from a center portion in a longitudinal direction of the inner-side gripping portion 393, an intermediate plate portion 396 provided at a lower end of the end plate portions 394, 394 and the coupling plate portion 395, side plate portions 397, 397 which are respectively suspended from both the lateral edge portions 396a, 396a of the intermediate plate portion 396, and fitting convex portions 398, 398 formed at lower edge portions 397a, 397a of the side plate portions 397, 397.

As illustrated in FIG. 30B, the intermediate plate portion 396 has for example, a rectangular plate shape, and is formed along a longitudinal direction of the inner-side gripping portion 393.

The side plate portions 397, 397 have for example, a rectangular plate shape, and are formed over the entire length of the lateral-edge portions 396a, 396a of the intermediate plate portion 396.

A gap distance between the side plate portions 397, 397 is greater than a width (i.e., dimension of the Y-direction) of the upper plate portion 345 of the movable holding body 305. Therefore, in the space between the side plate portions 397, 397, the upper plate portion 345 can be accommodated.

The fitting convex portions 398, 398 are for example, convex portions having a rectangular cross-section, and are formed at inner surfaces of the lower edge portions 397a, 397a of the side plate portions 397, 397 so as to protrude inward. The fitting convex portions 398, 398 extend in a longitudinal direction of the lower edge portions 397a, 397a.

The fitting convex portions 398, 398 are formed at a position facing each other and protrude in a direction approaching each other. A distance between protruding ends is smaller than a width (i.e., dimension of the Y-direction) of the upper plate portion 345 the movable holding body 305. Therefore, along with the upward movement of the unit operation portion 391, the fitting convex portion 398 contacts with a lower surface of the upper plate portion 345 and is capable of pressing the upper plate portion 345 upward.

As illustrated in FIGS. 30A and 30B, the exterior member 392 includes an outer-side gripping portion 400 having a semi-cylindrical shape, end plate portions 401, 401 which are suspended from both end portions of the outer-side gripping portion 400, coupling portions 402, 402 which are respectively suspended from a center portion in a longitudinal direction of side edge portions 400a, 400a of the outer-side gripping portion 400, and side plate portions 403, 403 which are suspended from lower edge portions of the coupling portions 402 of the end plate portion 401.

The side plate portion 403 has a rectangular plate shape and is formed along a longitudinal direction of the outer-side gripping portion 400.

A gap distance between the side plate portions 403 and 403 is smaller than a width (i.e., dimension of the Z-direction) of the shielding member 306. Therefore, the lower edge portions 403a and 403a of both the lateral plate portions 403 and 403 can contact with an upper surface of the shielding member 306.

The exterior member 392 can accommodate the unit operation portion 391 in an inner space 392a thereof.

Next, an example of a method of using the connector discharge tool 390 will be described.

As illustrated in FIG. 30B, the connector discharge tool 390 is arranged on the movable connector unit 307 with a state where the other end-side optical connector 302 is fitted to the receptacle optical connector 352.

The lower edge portions 403a, 403a of the side plate portions 403, 403 of the exterior member 392 contact with an upper surface of the shielding member 306.

A worker grips the inner-side gripping portion 393 of the unit operation portion 391 and the outer-side gripping portion 400 of the exterior member 392, and then when the inner-side gripping portion 393 is pressed upward, the unit operation portion 391 moves upward. In line with the operation, the fitting convex portion 398 presses the upper plate portion 345 of the movable holding body 305 upward.

An upward force is applied to the engagement convex portion 329 (see FIG. 26) by the electromagnetic wave shielding portion 346 of the movable holding body 305. Thereby, the coupling 314 moves upward.

Accordingly, the latch 360 (see FIG. 26) of the receptacle optical connector 352 can be displaced outward, and the latch convex portion 360a is disengaged from the engagement recess (not shown) of the housing 320

As illustrated in FIG. 30C, the unit operation portion 391 is further moved upward, and the other end-side optical connector 302 is pulled out from the receptacle optical connector 352.

Hitherto, the present invention has been described in detail with reference to the exemplary embodiment. However, the present invention is not limited to the above-described exemplary embodiment. Various modifications can be added to the present invention within a scope not departing from the spirit of the present invention.

For example, the housing 303 in the illustrated example has a box shape. However, as long as a structure can protect the relay optical fiber and the like so as not to be affected by an external force, the shape of the housing is not limited to the box shape. For example, the housing 303 may adopt a structure which is configured to have a bottom plate, an upper plate, and a columnar body for connecting both of these, and which can accommodate the relay optical fiber and the other end-side optical connector in a space formed between the bottom plate and the upper plate.

In the illustrated example, the electromagnetic wave shielding portion 346 is configured by the main plate portion 372 and the shielding plate 373 formed on the outer surface of the main plate portion 372; however, the electromagnetic wave shielding portion may be configured only by the shielding plate.

As illustrated in FIG. 28, the shielding plate 373 is formed so as to protrude in a direction (Y-direction) which intersects with the insertion and removal direction (Z-direction) of the other end-side optical connector 302 with 90°. However, if the shielding plate 373 has a shape which covers at least a portion of the gap between a circumferential edge of the insertion port portion and the other end-side optical connector when viewed from the Z-direction, the protruding direction thereof does not need to be perpendicular to the insertion and removal direction of the other end-side optical connector. For example, the protruding direction may be a direction which intersects with an angle of more than 0° and less than 90° with respect to the insertion and removal direction.

In the illustrated example, the ball plunger 380 is provided at only one of the long-side portion 362 of two of the long-side portions 362 of the shielding member 306; however, the ball plunger 380 may be provided at both long-side portions 362. In this case, the fitting hole 347a is formed at both sides of the base portion 343. Accordingly, by the ball plunger 380, the movement of the movable holding body 305 is regulated from both sides.

In the illustrated example, although the ball plunger 380 is provided at the shielding member 306, the ball plunger 380 may be provided at the housing 303.

As illustrated in FIGS. 27 and 29A, in the illustrated example, regarding tilting in two planes which are different from each other (i.e., in an X-Z plane and a Y-Z plane), the tiltable angle of the movable holding body 305 at the second position P2 becomes larger than the tiltable angle at the first position P2. In the present application, it is not limited to the above, and regarding tilting in three planes which are different from each other, the tiltable angle of the movable holding body at the second position may be larger than the tiltable angle at the first position.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An optical connection box that connects a plurality of second optical paths to a plurality of first optical paths, the optical connection box comprising:
   a plurality of first optical connector plugs, each first optical connector plug being connected to a corresponding one of the first optical paths;
   a plurality of second optical connector plugs, each second optical connector plug being connected to a corresponding one of the second optical paths;
   a movable holding body that collectively holds the plurality of second optical connector plugs;
   a plurality of relay optical fibers in which any one of the plurality of first optical connector plugs is disposed in a one-side first terminal and any one of the plurality of second optical connectors is disposed in an other-side terminal; and
   an exterior body in which the plurality of first optical connector plugs, the plurality of second optical connector plugs, the movable holding body, and the plurality of relay optical fibers are disposed,
   wherein each of the plurality of second optical connector plugs is removably connected to each of a plurality of receptacle optical connector plugs disposed in each terminal of the plurality of second optical paths, wherein the movable holding body is configured to be movable in directions toward and away from the plurality of receptacle optical connectors while collectively holding the plurality of second optical connector plugs, and is configured to be movable so as to be either inserted or removed from a second unit, wherein the movable holding body comprises a movable holding body positioning portion which performs positioning with respect to the second unit in which the receptacle optical connectors are disposed, wherein the movable holding body is configured to be positioned by the movable holding body positioning portion so that each of the plurality of second optical connector plugs is arranged at a position of a corresponding receptacle optical connector, and wherein each of the plurality of second optical connector plugs held by the movable holding body is configured to be movable by an operation of an operation body disposed in an optical connector main body, so as to be either inserted or removed from the corresponding receptacle optical connector.

2. The optical connection box according to claim 1, wherein a plurality of openings are provided in the optical connection box.

3. The optical connection box according to claim 2, wherein an inner diameter of each opening is 0.5-3 mm.

4. The optical connection box according to claim 1,
wherein the exterior body comprises an exterior body positioning portion which performs positioning with respect to the second unit in which the plurality of receptacle optical connectors are disposed, and
wherein the movable holding body is positioned by a connection box fitting portion, and thereby the movable holding body is arranged at a position which can be determined by the movable holding body positioning portion of the movable holding body.

5. The optical connection box according to claim 1, wherein installation positions are different from each other in any combination of the plurality of first optical connector plugs and the plurality of second optical connector plugs, when viewed in a direction of insertion into and removal from the plurality of second optical connector plugs.

6. The optical connection box according to claim 1,
wherein the plurality of second optical connector plugs are respectively biased in a direction away from the receptacle optical connectors between the states of being inserted and removed, and do not protrude from an outer surface of the optical connection box in a state where each of the plurality of second optical connector plugs is not fitted to the corresponding receptacle optical connector and are not operable by the operation body.

7. The optical connection box according to claim 1, wherein the plurality of second optical connector plugs are mutually and independently movable toward and away from the receptacle optical connectors.

8. The optical connection box according to claim 1, further comprising:
wherein each first optical connector plugs is a receptacle optical connector where an optical connector plug disposed in a terminal of the first optical path is inserted and removed, and is fixed to the exterior body.

9. The optical connection box according to claim 1, further comprising:
a facing member that faces two surfaces of the movable holding body and regulates tilting of the movable holding body,
wherein the movable holding body moves in directions toward and away from the receptacle optical connectors, and thereby, the movable holding body can be switched over between a first position and a second position closer to the receptacle optical connectors than the first position, and
wherein at the second position, a dimension in the moving directions of a region in which the movable holding body faces the facing member is smaller than a dimension thereof at the first position, and a tiltable angle of the movable holding body is greater than a tiltable angle at the first position.

10. The optical connection box according to claim 9:
wherein the facing member is disposed on an outer surface side which is opposite to the receptacle optical connectors of the housing.

11. The optical connection box according to claim 1, further comprising:
a ball plunger that regulates a movement of the movable holding body in a direction close to the receptacle optical connectors, when the second optical connectors are located away from the receptacle optical connectors,
wherein the ball plunger includes a cylindrical main body, a ball which is accommodated inside the main body so as to be movable in a central axis direction of the main body, and a biasing member which biases the ball in a direction toward a distal end of the main body,
wherein the ball is configured so that a protruding amount from an opening edge portion of the main body can be adjusted by the movement in the central axis direction of the main body, and
wherein an engagement recess with which the ball protruding from the opening edge portion is engageable is formed in the movable holding body.

12. The optical connection box according to claim 1:
wherein the exterior body has a bottom plate which faces a substrate, and the bottom plate has insertion ports into which the second optical connectors are inserted when connected to the receptacle optical connectors,
wherein the movable holding body comprises an electromagnetic wave shielding portion which shields an electromagnetic wave from a counterpart device, and
wherein the electromagnetic wave shielding portion is formed of a conductive material, and when the second optical connectors are inserted into the insertion ports and are connected to the receptacle optical connectors, the electromagnetic wave shielding portion is formed so as to cover at least a portion of a gap between a peripheral edge of the insertion port and the second optical connector, when viewed in directions where the second optical connector plugs are inserted and removed.

13. The optical connection box according to claim 1, wherein at least a pair of optical fiber guide bars is formed to protrude inside the optical connection box, and
wherein the relay optical fibers are wired between the pair of optical fiber guide bars.

* * * * *